(12) United States Patent
Sonoda et al.

(10) Patent No.: US 10,669,959 B2
(45) Date of Patent: Jun. 2, 2020

(54) CONTROL DEVICE, SYSTEM, CONTROL METHOD, POWER CONTROL DEVICE, GAS TURBINE, AND POWER CONTROL METHOD

(71) Applicant: MITSUBISHI HITACHI POWER SYSTEMS, LTD., Kanagawa (JP)

(72) Inventors: Takashi Sonoda, Tokyo (JP); Akihiko Saito, Tokyo (JP); Yoshifumi Iwasaki, Kanagawa (JP); Ryuji Takenaka, Kanagawa (JP); Kozo Toyama, Kanagawa (JP); Koji Takaoka, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 275 days.

(21) Appl. No.: 15/504,121

(22) PCT Filed: Jun. 16, 2015

(86) PCT No.: PCT/JP2015/067246
§ 371 (c)(1),
(2) Date: Feb. 15, 2017

(87) PCT Pub. No.: WO2016/035416
PCT Pub. Date: Mar. 10, 2016

(65) Prior Publication Data
US 2017/0254282 A1    Sep. 7, 2017

(30) Foreign Application Priority Data

Sep. 2, 2014  (JP) ................................ 2014-178247
Sep. 18, 2014 (JP) ................................ 2014-190486

(51) Int. Cl.
*F02C 9/54*   (2006.01)
*F02C 9/20*   (2006.01)
(Continued)

(52) U.S. Cl.
CPC .............. *F02D 41/024* (2013.01); *F02C 9/20* (2013.01); *F02C 9/22* (2013.01); *F02C 9/28* (2013.01);
(Continued)

(58) Field of Classification Search
CPC ...... F02C 9/16; F02C 9/20; F02C 9/26; F02C 9/28; F02C 9/32; F02C 9/54;
(Continued)

(56) References Cited

U.S. PATENT DOCUMENTS 6,338,240 B1    1/2002 Endo et al.
7,422,414 B2 *  9/2008 Fujii ........................ F02C 9/20
                                                       415/1

(Continued)

FOREIGN PATENT DOCUMENTS

JP    61-182425    8/1986
JP    8-42360      2/1996
(Continued)

OTHER PUBLICATIONS

Written Opinion of the International Searching Authority dated Sep. 15, 2015 in corresponding (PCT) International Application No. PCT/JP2015/067246.
(Continued)

*Primary Examiner* — Steven M Sutherland
*Assistant Examiner* — James P McGlynn
(74) *Attorney, Agent, or Firm* — Wenderoth, Lind & Ponack, L.L.P.

(57) ABSTRACT

Provided is a control device of a gas turbine including a compressor, a combustor, and a turbine. The control device executes load control of allowing an operation control point for operation control of a gas turbine to vary in response to a load of the gas turbine. The operation of the gas turbine is controlled on the basis of a rated temperature adjustment
(Continued)

line for temperature adjustment control of a flue gas temperature at a predetermined load to a rated flue gas temperature at which performance of the gas turbine becomes rated performance, a preceding setting line for setting of the flue gas temperature at the predetermined load to a preceding flue gas temperature that becomes lower in precedence to the rated flue gas temperature, and a limit temperature adjustment line for temperature adjustment control.

6 Claims, 22 Drawing Sheets

(51) Int. Cl.
    *F02C 9/28*            (2006.01)
    *F02C 3/04*            (2006.01)
    *F02D 41/02*          (2006.01)
    *F02C 9/22*            (2006.01)
    *F02D 41/00*          (2006.01)
    *F02D 41/30*          (2006.01)
    *F02D 43/04*          (2006.01)
    *F02D 13/02*          (2006.01)

(52) U.S. Cl.
CPC ............ *F02C 9/54* (2013.01); *F02D 41/0002* (2013.01); *F02D 41/30* (2013.01); *F02D 43/04* (2013.01); *F02C 3/04* (2013.01); *F02D 13/0223* (2013.01); *F02D 2041/0265* (2013.01); *F02D 2200/02* (2013.01); *F02D 2200/04* (2013.01); *F02D 2200/0406* (2013.01); *F02D 2200/0414* (2013.01); *F02D 2200/0802* (2013.01); *F05D 2270/112* (2013.01)

(58) Field of Classification Search
CPC ............. F23N 2025/10; F23N 2025/21; F05D 2270/112; F05D 2270/303
See application file for complete search history.

(56) References Cited

U.S. PATENT DOCUMENTS

| | | | | |
|---|---|---|---|---|
| 8,713,946 | B2* | 5/2014 | Botarelli | F02C 9/00 60/39.23 |
| 8,826,670 | B2* | 9/2014 | Hoffmann | F02C 9/22 415/146 |
| 2002/0033014 | A1 | 3/2002 | Endo et al. | |
| 2005/0204745 | A1* | 9/2005 | Hirayama | F02C 9/28 60/773 |
| 2009/0150040 | A1* | 6/2009 | Rofka | F02C 9/54 701/100 |
| 2010/0198419 | A1* | 8/2010 | Sonoda | F01D 17/16 700/290 |
| 2016/0169115 | A1* | 6/2016 | Dolmansley | F02C 7/228 60/776 |

FOREIGN PATENT DOCUMENTS

| | | |
|---|---|---|
| JP | 2000-205563 | 7/2000 |
| JP | 2001-200730 | 7/2001 |
| JP | 2002-330541 | 11/2002 |
| JP | 2002-330542 | 11/2002 |
| JP | 2003-206749 | 7/2003 |
| JP | 2007-40171 | 2/2007 |
| JP | 2008-64014 | 3/2008 |
| JP | 2008-75578 | 4/2008 |

OTHER PUBLICATIONS

International Search Report dated Sep. 15, 2015 in International (PCT) Application No. PCT/JP2015/067246.

* cited by examiner

CONTROL DEVICE, SYSTEM, CONTROL METHOD, POWER CONTROL DEVICE, GAS TURBINE, AND POWER CONTROL METHOD

FIELD

The present invention relates to a control device of a system such as a gas turbine that executes temperature adjustment control, a system, a control method, a power control device, a gas turbine, and a power control method.

BACKGROUND

A typical gas turbine includes a compressor, a combustor, and a turbine. In addition, air that is introduced from an air-intake port is compressed into high-temperature and high-pressure compressed air by a compressor. In the combustor, fuel is supplied to the compressed air and is combusted to obtain a high-temperature and high-pressure combustion gas (operation fluid). The turbine is operated by the combustion gas to drive a power generator that is connected to the turbine. The combustion gas, which is used to drive the turbine, is discharged as a flue gas on an exhaust side of the turbine.

A control device that controls the gas turbine adjusts the amount of air introduced to the compressor, a supply amount of fuel, and the like to execute temperature adjustment control of controlling an operation of the gas turbine so that a turbine inlet temperature of the turbine to which the combustion gas is introduced does not exceed an upper limit temperature that is set in advance. The reason for the execution is as follows. The higher the turbine inlet temperature is, the further the performance (work efficiency) of the gas turbine is enhanced. On the other hand, when the turbine inlet temperature is excessively high, it is difficult for a high-temperature component in the vicinity of the turbine inlet to endure a thermal load. Specifically, in the temperature adjustment control, the operation of the gas turbine is controlled so that the temperature of the flue gas discharged from the turbine does not exceed a temperature adjustment line that is the upper limit temperature of the flue gas temperature which is defined in correspondence with a gas turbine state quantity such as a load (power generator output) or a pressure ratio of a gas turbine, and the like. Here, the temperature adjustment line is defined by a mathematical function in which the greater the load of the gas turbine is, the lower the upper limit temperature of the flue gas temperature is, and the smaller the load of the gas turbine is, the higher upper limit temperature of the flue gas temperature is.

Examples of the gas turbine control device that executes the temperature adjustment control includes a control device that is described in Japanese Patent Publication No. 2008-75578 and Japanese Patent Publication No. 2007-40171. In a gas turbine operation control device described in Japanese Patent Publication No. 2008-75578, as the amount of load variation during a load increase of the gas turbine is great, an opening degree of an inlet guide vane, which is provided on an intake side of the compressor, is corrected to an open direction. In addition, in a gas turbine inlet guide vane control device described in Japanese Patent Publication No. 2007-40171 includes a flue gas temperature control unit. In the flue gas temperature control unit, a preceding IGV opening degree is set on the basis of an opening degree schedule of the inlet guide vane (IGV) which is obtained in advance. In addition, when the flue gas temperature is likely to exceed a limiting value during an operation, the preceding IGV opening degree is automatically subjected to a feedback correction to increase the IGV opening degree.

In addition, with regard to the gas turbine control device, an operation and maintenance schedule supporting system of a power generation facility is disclosed in Japanese Patent Publication No. 2002-330541 and Japanese Patent Publication No. 2002-330542. In the system in Patent Literature 3 and Patent Literature Japanese Patent Publication No. 2002-330541 and Japanese Patent Publication No. 2002-330542, plant data that is acquired is used to calculate a remaining operational lifespan of a power generation unit, and the remaining operational lifespan of the power generation unit which is calculated and a remaining operational lifespan of another power generation unit are compared with each other to change operation conditions of the power generation unit to realize high economic efficiency.

Technical Problem

However, in the gas turbine, an operation in correspondence with a load is performed. Specifically, a full load operation and a partial load operation are performed. Typically, in the case of performing the full load operation, the temperature adjustment control is executed so that the turbine inlet temperature reaches the vicinity of the upper limit temperature for exhibition of the performance of the gas turbine. In the temperature adjustment control, specifically, the operation of the gas turbine is controlled so that the flue gas temperature in the full load operation reaches the vicinity of a temperature adjustment line.

On the other hand, in the partial load operation, the temperature adjustment control is not executed so as to secure responsiveness of a gas turbine output with respect to a load variation. That is, the gas turbine is subjected to load control at a flue gas temperature lower than the upper limit temperature of the temperature adjustment line so that the flue gas temperature is not be limited by the upper limit temperature of the temperature adjustment line.

In recent years, even in the partial load operation, the temperature adjustment control may be executed so that the turbine inlet temperature reaches the vicinity of the upper limit temperature so as to improve the performance of the gas turbine. Specifically, in the temperature adjustment control, the operation of the gas turbine is controlled so that the flue gas temperature in the partial load operation reaches the vicinity of the temperature adjustment line.

However, in the partial load operation, in a case where the temperature adjustment control is executed so that the flue gas temperature reaches the vicinity of the temperature adjustment line, when a load of the gas turbine varies, there is a possibility that the flue gas temperature is limited by the temperature adjustment line. Accordingly, in the gas turbine, it may be difficult to adjust a gas turbine output in correspondence with the load variation.

In addition, in the partial load operation, in a case where the temperature adjustment control is executed so that the flue gas temperature reaches the vicinity of the temperature adjustment line, an intake amount of air that is introduced from an air-intake port may decrease due to disturbance such as the load variation. In this case, since the flue gas temperature rises, a so-called load reduction in which the load of the gas turbine decreases occurs in the temperature adjustment control. That is, in the temperature adjustment line, as the load of the gas turbine decreases, the upper limit temperature of the flue gas temperature becomes higher. Accordingly, in the temperature adjustment control, when the flue gas temperature rises, the load of the gas turbine is made to decrease so as to raise the upper limit temperature of the flue gas temperature. At this time, the intake amount of air is adjusted with the opening degree of the inlet guide vane, and the opening degree of the inlet guide vane is set on the basis of a gas turbine output. Accordingly, in the temperature adjustment control, when the load of the gas turbine decreases and the gas turbine output decreases, control of reducing the opening degree of the inlet guide vane is performed to reduce the intake amount of air.

According to this control, the flue gas temperature rises again, and thus the load of the gas turbine subsequently lowers.

In addition, the performance of the gas turbine and the responsiveness of the gas turbine output with respect to the load variation has a trade-off relationship. That is, if the temperature adjustment control is executed to enhance the performance of the gas turbine, the gas turbine is subjected to an operation in conformity to the temperature adjustment line, and the operation is limited by the temperature adjustment line. Accordingly, it is difficult to realize immediate response of the gas turbine output in conformity to the load variation (particularly, during load raising). On the other hand, when executing load control at a flue gas temperature lower than the upper limit temperature of the temperature adjustment line so as to enhance the responsiveness of the gas turbine, it is difficult to raise the turbine inlet temperature in the gas turbine, and thus it is difficult to enhance operation efficiency. In this manner, the following trade-off relationship exists in the gas turbine. That is, when enhancing the operation efficiency, the responsiveness deteriorates, and when enhancing the responsiveness, the operation efficiency deteriorates.

The gas turbine may be required to perform a responsiveness-emphasizing operation and an operation efficiency-emphasizing operation in correspondence with an operation environment. Examples of the responsiveness-emphasizing operation environment include an operation environment in which a base power source is unstable, specifically, an operation environment in which a ratio of renewable energy is great. In this case, the load variation is likely to occur, and thus the gas turbine is required to have high responsiveness in accordance with the load variation. In contrast, examples of the operation efficiency-emphasizing operation environment include an operation environment that is requested as a base power source. In this case, the load variation is less likely to occur, and thus the gas turbine is required to have high operation efficiency.

However, in the gas turbine, the operation efficiency and the responsiveness in the partial load operation are uniquely determined. That is, the gas turbine does not have a configuration in which the operation efficiency and the responsiveness are adjusted, and thus it is difficult for an operator to easily adjust or change the operation efficiency and the responsiveness.

Here, a system described in Japanese Patent Publication No. 2002-330541 and Japanese Patent Publication No. 2002-330542 is configured to change operation conditions to realize high economic efficiency, and does not change the operation efficiency and the responsiveness of the gas turbine in correspondence with a use environment of the gas turbine.

SUMMARY

Here, an object of the invention is to provide a control device, a system, and a control method which are capable of suitably executing temperature adjustment control in a load variation while improving the performance of a system such as a gas turbine in a partial load operation.

Another object of the invention is to provide a power control device, a gas turbine, and a power control method which are capable of adjusting the performance and the responsiveness of the gas turbine in a simple manner.

Solution to Problem

According to one aspect of the invention, there is provided a control device of a system in which intake-air is compressed into compressed air by a compressor, fuel supplied from a combustor and the compressed air are mixed and the resultant mixture is combusted to generate a combustion gas, and a turbine is operated by the combustion gas that is generated. The control device executes load control of allowing an operation control point for operation control of the system to vary in response to a load of the system, and the operation of the system is controlled on the basis of, a rated temperature adjustment line for temperature adjustment control of a flue gas temperature at a predetermined load to a rated flue gas temperature at which performance of the system becomes rated performance, a preceding setting line for setting of the flue gas temperature at the predetermined load to a preceding flue gas temperature that becomes lower in precedence to the rated flue gas temperature, and a limit temperature adjustment line for temperature adjustment control so that the flue gas temperature at the predetermined load does not exceed a limit flue gas temperature that is higher than the rated flue gas temperature.

According to another aspect of the invention, there is provided a control method of a system in which intake-air is compressed into compressed air by a compressor, fuel that is supplied and the compressed air are mixed and the resultant mixture is combusted to generate a combustion gas, and a turbine is operated by the combustion gas that is generated. The method includes executing load control of allowing an operation control point for operation control of the system to vary in response to a load of the system, and controlling the operation of the system on the basis of a rated temperature adjustment line for temperature adjustment control of a flue gas temperature at a predetermined load to a rated flue gas temperature at which performance of the system becomes rated performance, a preceding setting line for setting of the flue gas temperature at the predetermined load to a preceding flue gas temperature that becomes lower in precedence to the rated flue gas temperature, and a limit temperature adjustment line for temperature adjustment control so that the flue gas temperature at the predetermined load does not exceed a limit flue gas temperature that is higher than the rated flue gas temperature.

According to this configuration, it is possible to allow an operation control point of a system to vary on the basis of the rated temperature adjustment line, the preceding setting line, and the limit temperature adjustment line. At this time, a high flue gas temperature side may be set as the limit temperature adjustment line and a low flue gas temperature side may be set as the preceding setting line with the rated temperature adjustment line interposed therebetween. Accordingly, even in a case where the operation control point exists on the rated temperature adjustment line and the operation control point is allowed to vary due to a load variation from the state, it is possible to allow the operation control point to vary without load reduction due to hanging of the flue gas temperature on the limit temperature adjustment line. In addition, during a load variation, it is possible to transition the operation control point to the preceding setting line, and thus the flue gas temperature is further less likely to hang on the limit temperature adjustment line. As a result, it is possible to easily allow the operation control point to vary. In this manner, in a partial load operation, even in a case where the operation control point exists on the rated temperature adjustment line, it is possible to easily execute the temperature adjustment control with respect to the load variation, and the partial load operation can be performed on the rated temperature adjustment line. Accordingly, it is possible to operate a system with the rated performance in the partial load operation. Furthermore, the rated performance is performance in which work efficiency (operation efficiency) of the gas turbine is optimized when a system such as a gas turbine is in a predetermined load, that is, performance when a turbine inlet temperature reaches the upper limit temperature. In addition, with regard to the system, application can be made to a gas engine system and the like other than the gas turbine that performs power generation.

Further, it is preferable that, during a load variation in which the load varies, the operation control point is transitioned to the preceding setting line to allow the operation control point to vary in conformity to the preceding setting line, and when the load reaches a target load that is targeted, the operation control point is transitioned to the rated temperature adjustment line.

According to this configuration, when the operation control point is transitioned to the preceding setting line during the load variation, the flue gas temperature is not limited to the limit temperature adjustment line, and it is possible to allow the operation control point to vary in response to the load variation. In addition, in the case of transitioning the operation control point from the preceding setting line to the rated temperature adjustment line, in the limit temperature adjustment line, the flue gas temperature is higher in comparison to the rated temperature adjustment line. Accordingly, the flue gas temperature is not limited to the limit temperature adjustment line, and it is possible to transition the operation control point to the rated temperature adjustment line.

Further, it is preferable that, during load raising in which the load rises, the operation control point is allowed to vary so that the flue gas temperature becomes lower than the preceding flue gas temperature of the preceding setting line, and when the load reaches a target load that is targeted, the operation control point is transitioned to the rated temperature adjustment line.

According to this configuration, in a case where the amount of the load variation is great, the limit flue gas temperature of the limit temperature adjustment line quickly lowers in accordance with load raising. At this time, in a case where the flue gas temperature at the operation control point slowly lowers, the flue gas temperature at the operation control point is limited to the limit flue gas temperature, and thus it is difficult to allow the operation control point to vary. Accordingly, in a case where the amount of the load variation is great during the load raising, it is possible to allow the operation control point to vary so as to be lower than the preceding flue gas temperature of the preceding setting line. Accordingly, the flue gas temperature is not limited to the limit temperature adjustment line, and it is possible to allow the operation control point to suitably vary. Furthermore, examples of a case where the amount of load variation is great include a case where the gas turbine is subjected to a rapid-activation operation or a case where a frequency of a power generator varies, for example, in a case where an application is made to the gas turbine as the system.

Further, it is preferable, in the case of performing load lowering in which the load lowers from a temperature adjustment control state in which the flue gas temperature becomes the rated flue gas temperature of the rated temperature adjustment line, the limit flue gas temperature of the limit temperature adjustment line is changed to be the rated flue gas temperature of the rated temperature adjustment line, and the operation control point is transitioned from the rated temperature adjustment line to the preceding setting line.

According to this configuration, in the case of lowering a load from a temperature adjustment control state in which the flue gas temperature becomes the rated flue gas temperature, it is possible to limit the flue gas temperature at the operation control point not to exceed the rated flue gas temperature by changing the limit temperature adjustment line to be the rated temperature adjustment line. Accordingly, during the load lowering, it is possible to suppress the flue gas temperature from being higher than the rated temperature adjustment line. Furthermore, it is preferable that the limit temperature adjustment line, which is changed to be the rated temperature adjustment line, is returned to a state before changing after the operation control point transitions to the preceding setting line.

Further, it is preferable that the limit flue gas temperature of the limit temperature adjustment line is defined by a function of a pressure ratio of the compressor, the flue gas temperature is a flue gas measurement temperature that is measured by a flue gas thermometer, and during the load raising in which the load rises, in a case where the flue gas measurement temperature is higher than the limit flue gas temperature of the limit temperature adjustment line and satisfies a setting condition that is set in advance, the flue gas measurement temperature is higher than the limit flue gas temperature of the limit temperature adjustment line, and the variation of the operation control point is permitted.

According to this configuration, during load raising, the limit flue gas temperature, which is defined by the function of the pressure ratio of the compressor, of the limit temperature adjustment line lowers as the load increases. At this time, the flue gas measurement temperature at the operation control point lowers slowly in comparison to the limit flue gas temperature. In this case, the flue gas measurement temperature at the operation control point is limited to the limit flue gas temperature, and thus it is difficult to allow the operation control point to vary. Accordingly, when the variation of the operation control point is permitted to a certain degree higher than the limit flue gas temperature under predetermined setting conditions, it is possible to suppress limitation of the variation of the operation control point due to the limit flue gas temperature, and thus it is possible to allow the operation control point to suitably vary.

Further, it is preferable that the limit flue gas temperature of the limit temperature adjustment line is defined by a function of a pressure ratio of the compressor, the flue gas temperature is a flue gas measurement temperature that is measured by a flue gas thermometer, and during the load raising in which the load rises, in a case where the flue gas measurement temperature is higher than the limit flue gas temperature of the limit temperature adjustment line and satisfies a setting condition that is set in advance, the limit flue gas temperature of the limit temperature adjustment line is set to be higher than the flue gas measurement temperature.

According to this configuration, during load raising, the limit flue gas temperature, which is defined by the function of the pressure ratio of the compressor, of the limit temperature adjustment line lowers as the load increases. At this time, the flue gas measurement temperature at the operation control point lowers slowly in comparison to the limit flue gas temperature. In this case, the flue gas measurement temperature at the operation control point is limited to the limit flue gas temperature, and thus it is difficult to allow the operation control point to vary. Accordingly, when the limit flue gas temperature is set to be higher than the flue gas measurement temperature under predetermined setting conditions, it is possible to suppress limitation of the variation of the operation control point due to the limit flue gas temperature, and thus it is possible to allow the operation control point to suitably vary.

Further, it is preferable that the compressor includes an inlet guide vane that is provided on an intake side and is capable of adjusting an opening degree, and the setting condition includes at least one condition among a first condition in which the flue gas temperature does not conform to the rated flue gas temperature of the rated temperature adjustment line, and the operation control point transitions to the preceding setting line, a second condition in which the opening degree of the inlet guide vane is enlarged so that the flue gas temperature becomes lower than the preceding flue gas temperature of the preceding setting line, and a third condition in which a pressure ratio of the compressor increases.

According to this configuration, it is possible to set the setting condition expecting that the flue gas temperature lowers. That is, since the first condition requires that the flue gas temperature become the preceding flue gas temperature, the first condition can be set to require lowering the flue gas temperature. Furthermore, since the second condition requires that the opening degree of the inlet guide vane be enlarged so that the amount of air to be introduced is increased, the second condition can be set to require lowering the flue gas temperature. Furthermore, since the third condition requires that the pressure ratio of the compressor increase so that the amount of air to be introduced is increased, the third condition can be set to require lowering the flue gas temperature.

Further, it is preferable that the compressor includes the inlet guide vane that is provided on the intake side and is capable of adjusting the opening degree, and the operation control point is allowed to vary through adjustment of the opening degree of the inlet guide vane.

According to this configuration, it is possible to allow the operation control point of a system to vary by adjusting the opening degree of the inlet guide vane. That is, during load raising, an intake amount of air that is introduced to the compressor is increased by adjusting, the opening degree of the inlet guide vane to be enlarged, and it is possible to lower the flue gas temperature by an increase in the intake amount of air. In addition, during load lowering, the intake amount of air that is introduced to the compressor is decreased by adjusting the opening degree of the inlet guide vane to be reduced, and it is possible to raise the flue gas temperature by a decrease in the intake amount of air.

A system according to one aspect includes a compressor that compresses intake-air into compressed air, a combustor that supplies fuel to the compressed air and combusts the resultant mixture to generate a combustion gas, a turbine that operates by the combustion gas that is generated, and the control device describe above.

According to this configuration, it is possible to enhance the performance in the partial load operation, and it is possible to suitably execute the temperature adjustment control during a load variation.

According to still another aspect of the invention, there is provided a power control device in which intake-air is compressed into compressed air by a compressor, fuel supplied from a combustor and the compressed air are mixed and the resultant mixture is combusted to generate a combustion gas, and a turbine is operated by the combustion gas that is generated to control power. Output responsiveness with respect to a load variation of the power varies in conjunction with a variation of operation efficiency of the power. The power control device includes a storage unit that stores an operation control parameter value for control of an operation of the power. The storage unit stores the operation control parameter value in correlation with the variation of the operation efficiency and the responsiveness at a predetermined load.

According to still another aspect of the invention, there is provided a power control method in which intake-air is compressed into compressed air by a compressor, fuel supplied from a combustor and the compressed air are mixed and the resultant mixture is combusted to generate a combustion gas, and a turbine is operated by the combustion gas that is generated to control power. The method includes varying output responsiveness with respect to a load variation of the power in conjunction with a variation of operation efficiency of the power, and correlating an operation control parameter value for control of an operation of the power to the variation of the operation efficiency and the responsiveness at a predetermined load.

According to this configuration, it is possible to allow the operation control parameter value to correlate with the variation of the operation efficiency and the responsiveness at a predetermined load. Accordingly, when the operation efficiency and the responsiveness of power are set in correspondence with a use environment, it is possible to set an operation control parameter value in correspondence with the operation efficiency and the responsiveness which are set. That is, in a case where performance in the operation of power is emphasized, it is possible to set an operation control parameter value with which the operation efficiency of power at a predetermined load increases. According to this, for example, it is possible to realize an operation in which performance of a gas turbine combined cycle at the partial load operation is improved. On the other hand, in a case where the responsiveness in the operation of power is emphasized, it is possible to set the operation control parameter value with which the responsiveness of power at a predetermined load increases. Accordingly, for example, in an operation in which performance of the gas turbine combined cycle at the partial load operation decreases, it is possible to execute load control. Furthermore, examples of a case where the responsiveness of power varies in conjunction with a variation of the operation efficiency of power include a case where the operation efficiency at the partial load operation is set to be the maximum (100%), that is, a case where the temperature adjustment control is executed at the partial load operation. In this case, even though the responsiveness is the minimum (0%), that is, the responsiveness with respect to the load variation is poor, but an operation with good combined cycle performance is realized.

Further, it is preferable that the compressor includes an inlet guide vane that is provided on an intake side and is capable of adjusting an opening degree, and the operation control parameter value is set on the basis of an opening degree of the inlet guide vane.

According to this configuration, it is possible to set the operation control parameter value on the basis of the opening degree of the inlet guide vane.

Further, it is preferable that the control device further includes an operation unit including a performance operation unit that is operated to set a ratio of the operation efficiency to the operation efficiency and the responsiveness, and a responsiveness operation unit that is operated to set a ratio of the responsiveness to the operation efficiency and the responsiveness, and the operation control parameter value at a predetermined load is set on the basis of the ratio of the operation efficiency and the responsiveness which are set by the operation unit.

According to this configuration, it is possible to set the operation efficiency and the responsiveness of power to desired values by operating the operation unit, and an operation control parameter value is set in correspondence with the set operation efficiency and the set responsiveness. Accordingly, it is possible to simply set the operation control parameter value in correspondence with the operation efficiency and the responsiveness of power only by operating the operation unit, and thus it is possible to realize a user-friendly configuration. Furthermore, the performance operation unit and the responsiveness operation unit may be provided integrally with each other, or may be provided as individual components.

Further, it is preferable that the operation control parameter value includes a performance parameter value that is a parameter value on the operation efficiency side, and a responsiveness parameter value that is a parameter value that is the responsiveness side, and the power control device further includes a distributor that distributes the performance parameter value and the responsiveness parameter value on the basis of the ratio of the operation efficiency and the responsiveness which are set in the operation unit.

According to this configuration, since the performance parameter value and the responsiveness parameter value are distributed by the distributor on the basis of the ratio of the operation efficiency and the responsiveness which are set by the operation unit, it is possible to optimize the operation control parameter value that is set.

According to still another aspect of the invention, there is provided a gas turbine including: a compressor that compresses intake-air into compressed air; a combustor that supplies fuel to the compressed air and combusts the resultant mixture to generate a combustion gas; a turbine that operates by the combustion gas that is generated; and the power control device described above.

According to this configuration, it is possible to set the operation efficiency and the responsiveness of the gas turbine in correspondence with an operation environment of the gas turbine, and thus it is possible to enhance general-purpose properties.

DESCRIPTION OF EMBODIMENTS

Hereinafter, embodiments according to the invention will be described in detail with reference to the accompanying drawings. Furthermore, the invention is not limited to the embodiments. In addition, constituent elements in the following embodiments include constituent elements which can be easily substituted by a person having ordinary skill in the art or which are substantially the same. In addition, the following constituent elements can be appropriately combined, and in a case where a plurality of embodiments exists, a combination of embodiments is also possible.

First Embodiment

Figure 1:
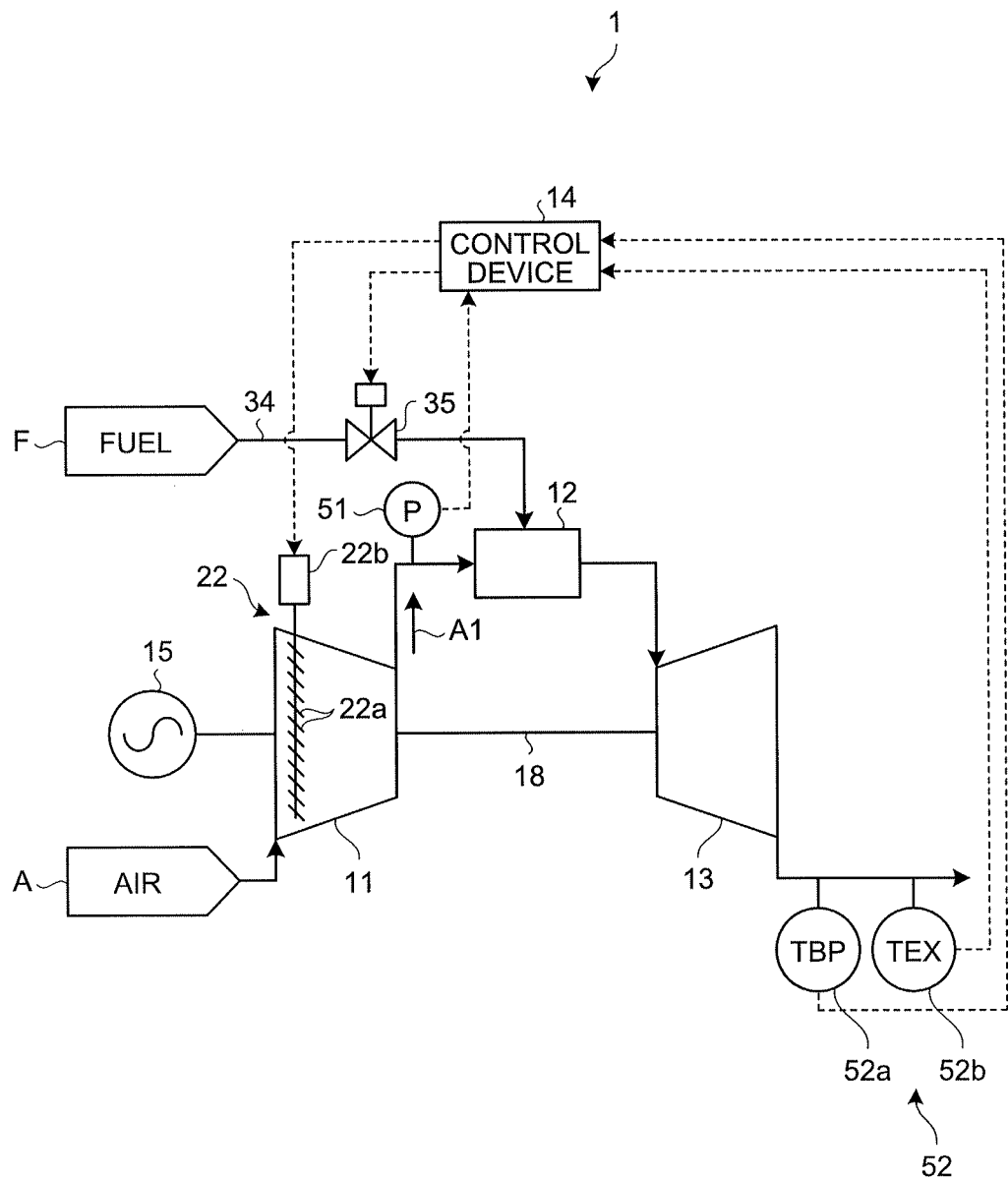
FIG. 1 is a schematic view illustrating a gas turbine of a first embodiment.
Figure 2:
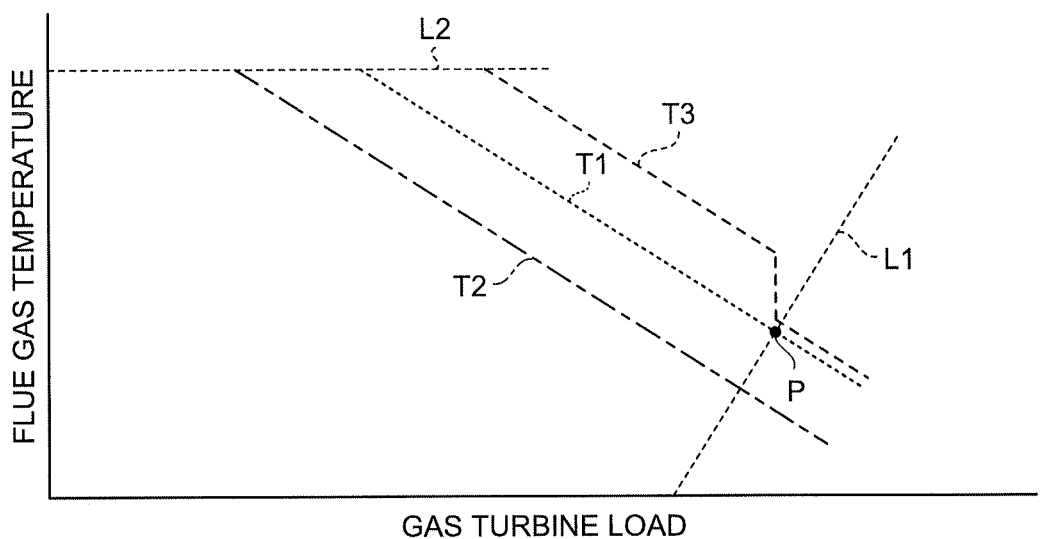
FIG. 2 is a graph illustrating a temperature adjustment line in which a flue gas temperature varies in response to a load of the gas turbine.
Figure 3:
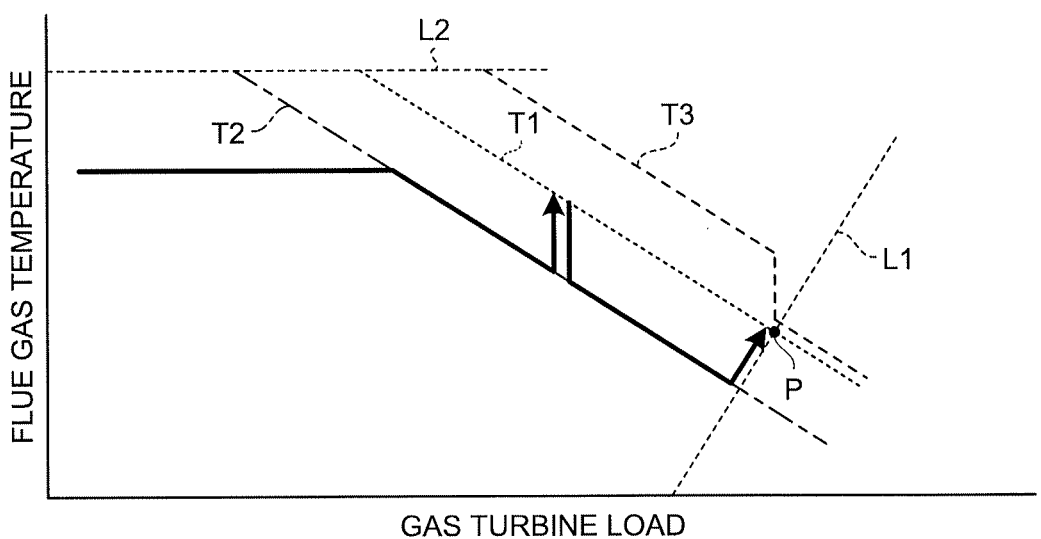
FIG. 3 is a view illustrating an example of temperature adjustment control of a first embodiment.

FIG. 1 is a schematic view illustrating a gas turbine of a first embodiment. FIG. 2 is a graph illustrating a temperature adjustment line in which a flue gas temperature varies in response to a load of the gas turbine. FIG. 3 is a view illustrating the temperature adjustment control of the first embodiment.

As illustrated in FIG. 1, a gas turbine 1 of the first embodiment includes a compressor 11, a combustor 12, and a turbine 13. A rotor 18 is disposed at the central portion of the compressor 11, the combustor 12, and the turbine 13 to pass through the central portion, and the compressor 11 and the turbine 13 are connected to each other in an integrally rotatable manner by the rotor 18. The gas turbine 1 is controlled by a control device 14. In addition, a power generator 15 is connected to the gas turbine 1 to generate electricity.

The compressor 11 compresses air A that is introduced from an air-intake port into compressed air A1. The compressor 11 includes an inlet guide vane (IGV) 22 which adjusts an intake amount of the air A that is introduced from the air-intake port. An opening degree of the inlet guide vane 22 is adjusted to adjust the intake amount of the air A. Specifically, the inlet guide vane 22 includes a plurality of vane main bodies 22a, and an IGV operation unit 22b that changes a vane angle of the plurality of vane main bodies 22a. When the vane angle of the vane main bodies 22a is adjusted by the IGV operation unit 22b, the opening degree of the inlet guide vane 22 is adjusted, thereby adjusting the intake amount of the air A. When the opening degree of the inlet guide vane 22 is enlarged, the intake amount of the air A increases, and a pressure ratio of the compressor 11 increases. On the other hand, when the opening degree of the inlet guide vane 22 is reduced, the intake amount of the air A decreases, and the pressure ratio of the compressor 11 decreases.

The combustor 12 supplies fuel F to the compressed air A1 that is compressed by the compressor 11, mixes the compressed air A1 and the fuel F, and combusts the resultant mixture to generate a combustion gas. The turbine 13 is rotated by the combustion gas that is generated by the combustor 12.

Both ends of the rotor 18 in an axial direction are supported by a bearing section (not illustrated) in a freely rotatable manner, and the rotor 18 is provided to freely rotate around an axial center. In addition, a drive shaft of the power generator 15 is connected to an end of the rotor 18 on a compressor 11 side (a positional arrangement is not particularly limited). The power generator 15 is provided coaxially with the turbine 13, and can generate electricity when the turbine 13 rotates.

Accordingly, the air A introduced from the air-intake port of the compressor 11, passes through the inside of the compressor 11 through the inlet guide vane 22 and is compressed into high-temperature and high-pressure compressed air A1. The fuel F is supplied form the combustor 12 to the compressed air A1, the compressed air A1 and the fuel F are mixed, and the resultant mixture is combusted to generate high-temperature and high-pressure combustion gas. In addition, the high-temperature and high-pressure combustion gas that is generated by the combustor 12 passes through the inside of the turbine 13 to operate (rotate) the turbine 13, thereby rotationally driving the rotor 18. According to the rotational driving, the power generator 15 that is connected to the rotor 18 is driven. According to this, the power generator 15 that is connected to the rotor 18 is rotationally driven to perform power generation. On the other hand, the combustion gas, which is used to drive the turbine 13, is discharged to the air as a flue gas.

An operation of the gas turbine 1 is controlled by the control device 14. Specifically, the control device 14 controls the operation of the gas turbine 1 in correspondence with a load (output of the power generator 15) of the gas turbine 1. Specifically, the control device 14 performs a partial load operation and a full load operation of the gas turbine 1. The full load operation is an operation in which a gas turbine output becomes a rated output. The partial load operation is an operation in which the gas turbine output becomes smaller than the rated output.

In addition, in the partial load operation and the full load operation, the control device 14 adjusts an intake amount of the air A that is introduced to the compressor 11, a fuel supply amount of the fuel F that is supplied from the combustor 12, and the like to execute temperature adjustment control so that a turbine inlet temperature of the turbine 13 to which the combustion gas is introduced does not exceed an upper limit temperature that is set in advance.

The control device 14 controls the IGV operation unit 22b, which operates the inlet guide vane 22 so as to adjust the amount (intake amount) of air that is introduced to the compressor 11. The control device 14 controls the IGV operation unit 22b to change an opening degree of the inlet guide vane 22, thereby adjusting the intake amount of the air A that is introduced to the compressor 11. Specifically, in the full load operation, the control device 14 performs control so that the opening degree of the inlet guide vane 22 becomes a rated opening degree. The rated opening degree is an opening degree when a gas turbine output becomes a rated output. In addition, the control device 14 can perform the control so that the opening degree of the inlet guide vane 22 enters an ultra-open state greater than the rated opening degree. Here, the opening degree of the inlet guide vane 22 is defined by a function of the gas turbine output. Accordingly, the control device 14 sets the opening degree of the inlet guide vane 22 to an opening degree corresponding to the gas turbine output.

In addition, the control device 14 controls a fuel adjustment valve 35, which is provided in a fuel supply line 34 that supplies the fuel F toward the combustor 12, so as to adjust the supply amount of the fuel F. The control device 14 controls the fuel adjustment valve 35 to adjust the supply amount of the fuel F that is supplied (sprayed) to the compressed air A1.

In addition, a pressure gauge 51 and a flue gas thermometer 52 are connected to the control device 14. The pressure gauge 51 is provided in a line through which the compressed air A1 circulates from the compressor 11 toward the combustor 12, specifically, at the inside of a compartment of the combustor 12 to measure a pressure (compartment pressure) of the compressed air A1. The flue gas thermometer 52 includes a blade path thermometer 52a that is provided on an upstream side in a flow direction of a flue gas, and an exhaust section thermometer 52b that is provided downstream of the blade path thermometer 52a. The flue gas thermometer 52 measures a temperature of a flue gas that is discharged from the turbine 13.

In addition, the control device 14 controls the inlet guide vane 22, the fuel adjustment valve 35, and the like on the basis of a measurement result of the measurement instruments 51 and 52, and the like to execute load control of allowing an operation control point for operation control of the gas turbine 1 to vary. In addition, the control device 14 controls the inlet guide vane 22, the fuel injection valve 35, and the like on the basis of a measurement result of the measurement instruments 51 and 52, and the like to execute temperature adjustment control of allowing the operation control point to vary in conformity to the following temperature adjustment line.

Here, in the temperature adjustment control, a rated temperature adjustment line T1, a preceding setting line T2, and a limit temperature adjustment line T3 in FIG. 2 are used. In the graph of FIG. 2, the horizontal axis represents a gas turbine load, and the vertical axis represents a flue gas temperature. Furthermore, the rated temperature adjustment line T1, the preceding setting line T2, and the limit temperature adjustment line T3 are functions which are defined by the flue gas temperature and the pressure ratio of the compressor 11. Accordingly, the control device 14 derives the pressure ratio of the compressor 11 on the basis of a measurement result of the pressure gauge 51, and derives a flue gas temperature (a rated flue gas temperature, a preceding flue gas temperature, a limit flue gas temperature which are described later) from the derived pressure ratio on the basis of the rated temperature adjustment line T1, the preceding setting line T2, and the limit temperature adjustment line T3.

As illustrated in FIG. 2, the rated temperature adjustment line T1, the preceding setting line T2, and the limit temperature adjustment line T3 are constituted by a line in which the flue gas temperature lowers, as a gas turbine load (specifically, a pressure ratio) increases. Hereinafter, the rated temperature adjustment line T1, the preceding setting line T2, and the limit temperature adjustment line T3 will be described in detail.

The rated temperature adjustment line T1 is set to a rated flue gas temperature corresponding to a gas turbine load so that the performance of the gas turbine 1 at a predetermined gas turbine load becomes rated performance. At this time, the rated flue gas temperature of the rated temperature adjustment line T1 is set to a flue gas temperature at which a turbine inlet temperature does not exceed an upper limit temperature that is set in advance. Furthermore, the rated performance is performance in which work efficiency of the gas turbine 1 is optimized when a predetermined load is applied to the gas turbine 1 from the power generator 15. The rated temperature adjustment line T1 is a line in which a flue gas temperature (flue gas measurement temperature) measured by the flue gas thermometer 52 becomes the rated flue gas temperature of the rated temperature adjustment line T1 during correction of the partial load operation or the full load operation. That is, the control device 14 performs feedback control (for example, PI control) of the operation of the gas turbine 1 so that the flue gas measurement temperature becomes the rated flue gas temperature.

Here, an IGV rated angle line L1, in which the inlet guide vane 22 has a rated opening degree, is illustrated in FIG. 2. Accordingly, a gas turbine load at an intersection at which the rated temperature adjustment line T1 and the IGV rated angle line L1 intersect each other is an intersection (rated point P) that becomes the full load of the gas turbine 1, and a gas turbine output corresponding to the gas turbine load of the rated point P is set to a rated output of the gas turbine 1.

The preceding setting line T2 is a line for setting of the flue gas temperature at a predetermined gas turbine load to a preceding flue gas temperature that becomes lower in precedence to the rated flue gas temperature. Accordingly, the preceding flue gas temperature at a predetermined gas turbine load is lower than the rated flue gas temperature. Specifically, the preceding setting line T2 is a line for enlargement of the opening degree of the inlet guide vane 22 in precedence to the rated temperature adjustment line T1. Accordingly, when the operation control point of the gas turbine 1 is allowed to vary in conformity to the preceding setting line T2, the control device 14 controls the inlet guide vane 22 to obtain an opening degree greater than the opening degree of the inlet guide vane 22 that is set on the basis of the rated temperature adjustment line T1.

The limit temperature adjustment line T3 is a line in which the flue gas temperature at a predetermined gas turbine load does not exceed the limit flue gas temperature. That is, the limit flue gas temperature at a predetermined gas turbine load becomes higher than the rated flue gas temperature, and is set to a flue gas temperature that is permissible even though the turbine inlet temperature is higher than the upper limit temperature (even though the turbine inlet temperature is overshot). Accordingly, the control device 14 controls the operation of the gas turbine 1 so that the flue gas temperature (flue gas measurement temperature) measured by the flue gas thermometer 52 does not exceed the limit flue gas temperature. Furthermore, the limit temperature adjustment line T3 is a line in which the limit flue gas temperature is equal to the rated flue gas temperature of the rated temperature adjustment line T1 in the full load operation.

In addition, a flue gas temperature limiting line L2, which becomes a limiting value of the flue gas temperature, is illustrated in FIG. 2. The flue gas temperature limiting line L2 is set to a temperature at which a member disposed on an exhaust side of the turbine 13 can endure a thermal load. The control device 14 controls the operation of the gas turbine 1 so as not to reach the flue gas temperature limiting line L2.

Next, description will be given of an example of temperature adjustment control with reference to FIG. 3. The temperature adjustment control illustrated in FIG. 3 is temperature adjustment control during load raising in which the gas turbine load rises. Specifically, in FIG. 3, load control is performed so that the operation control point of the gas turbine 1 varies in conformity to the preceding setting line T2. Furthermore, with reference to FIG. 3, description will be given of a case where the temperature adjustment control is performed to be on the rated temperature adjustment line T1 during correction of the partial load operation, and then the temperature adjustment control is performed to be on the rated temperature adjustment line T1 during correction of the full load operation.

Here, the operation control point of the gas turbine 1 varies in accordance with the opening degree of the inlet guide vane 22, and the opening degree of the inlet guide vane 22 is set in correspondence with the gas turbine output. In addition, the gas turbine output varies in accordance with the supply amount of the fuel F. Accordingly, the control device 14 adjusts the supply amount of the fuel F of the fuel adjustment valve 35 in accordance with a load variation to allow the gas turbine output to vary, and allows the opening degree of the inlet guide vane 22 to vary in response to the varying gas turbine output to adjust the intake amount of the air A. According to this, the operation control point of the gas turbine 1 is allowed to vary.

Specifically, during load raising, the control device 14 enlarges a valve opening degree of the fuel adjustment valve 35 to increase the supply amount of the fuel F, thereby increasing a gas turbine output. The control device 14 enlarges the opening degree of the inlet guide vane 22 in correspondence with the increasing gas turbine output so as to increase the intake amount of the air A. In the preceding setting line T2, when the intake amount of the air A increases, a pressure ratio of the compressor 11 increases, and thus the preceding flue gas temperature lowers. Accordingly, when the control device 14 increases the gas turbine output, the flue gas temperature (flue gas measurement temperature), which has been lower than the preceding flue gas temperature of the preceding setting line T2, becomes closer to the preceding flue gas temperature.

Then, when the flue gas measurement temperature reaches the preceding flue gas temperature, the control device 14 performs the temperature adjustment control in order for the operation control point of the gas turbine 1 to conform to the preceding setting line T2. In addition, when reaching a predetermined target load at which the partial load operation is performed, the control device 14 transitions the operation control point from the preceding setting line T2 to the rated temperature adjustment line T1. Specifically, when reaching the predetermined target load, the control device 14 performs control of reducing the opening degree of the inlet guide vane 22 to raise the flue gas measurement temperature.

In addition, the control device 14 transitions the operation control point to the rated temperature adjustment line T1, and thus the performance of the gas turbine 1 in the partial load operation becomes the rated performance. At this time, since the limit flue gas temperature of the limit temperature adjustment line T3 becomes higher than the rated flue gas temperature of the rated temperature adjustment line T1, the control device 14 can transition the operation control point to the rated temperature adjustment line T1 without limitation to the limit temperature adjustment line T3. Accordingly, the control device 14 can control the operation of the gas turbine 1 in an operation state in which work efficiency of the gas turbine during the partial load operation is optimized.

In the partial load operation, in the case of performing the full load operation by raising a load from a state in which the operation control point is set to the rated temperature adjustment line T1, first, the control device 14 transitions the operation control point to the preceding setting line T2. Specifically, the control device 14 performs control of enlarging the opening degree of the inlet guide vane 22 to lower the flue gas measurement temperature.

When the operation control point is transitioned to the preceding setting line T2, the control device 14 controls the operation of the gas turbine 1 to increase the gas turbine output. Then, when the opening degree of the inlet guide vane 22 becomes the rated opening degree, the control device 14 transitions the operation control point from the preceding setting line T2 to the rated temperature adjustment line T1. Specifically, when the inlet guide vane 22 is set to the rated opening degree on the preceding setting line T2, the control device 14 enlarges the valve opening degree of the fuel adjustment valve 35 to increase the supply amount of the fuel F, thereby increasing the gas turbine output. In addition, the control device 14 raises the flue gas measurement temperature.

In addition, the control device 14 transitions the operation control point to the rated temperature adjustment line T1, and thus the performance of the gas turbine in the full load operation becomes the rated performance, and the gas turbine output becomes the rated output. Accordingly, the control device 14 can control the operation of the gas turbine 1 in an operation state in which the work efficiency of the gas turbine 1 in the full load operation is optimized.

Furthermore, as is the case with the load raising, when lowering a load, the control device 14 also transitions the operation control point of the gas turbine 1 to the preceding setting line T2 to lower a load. When reaching a target load, the control device 14 transitions the operation control point from the preceding setting line T2 to the rated temperature adjustment line T1.

As described above, according to the first embodiment, it is possible to allow the operation control point of the gas turbine 1 to vary on the basis of the rated temperature adjustment line T1, the preceding setting line T2, and the limit temperature adjustment line T3. At this time, a high flue gas temperature side may be set as the limit temperature adjustment line T3 and a low flue gas temperature side may be set as the preceding setting line T2 with the rated temperature adjustment line T1 interposed therebetween. Accordingly, even in a case where the operation control point exists on the rated temperature adjustment line T1 and the operation control point is allowed to vary due to a load variation from the state, it is possible to allow the operation control point to vary without load reduction due to hanging of the flue gas temperature on the limit temperature adjustment line T3. In addition, during a load variation, it is possible to transition the operation control point to the preceding setting line T2, and thus the flue gas temperature is further less likely to hang on the limit temperature adjustment line T3. As a result, it is possible to easily allow the operation control point to vary. In this manner, in the partial load operation, even in a case where the operation control point exists on the rated temperature adjustment line T1, it is possible to easily execute the temperature adjustment control with respect to the load variation, and the partial load operation can be performed on the rated temperature adjustment line T1. Accordingly, it is possible to operate the gas turbine 1 with the rated performance in the partial load operation. Furthermore, in the first embodiment, with regard to the system, application is made to the gas turbine 1 that performs power generation, but application can be made to a gas engine system and the like.

Second Embodiment

Figure 4:
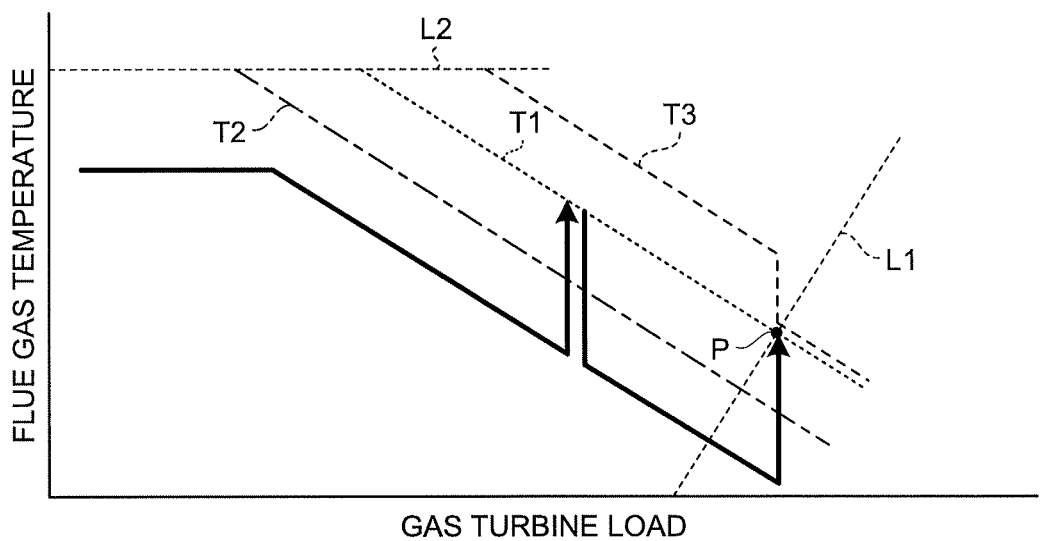
FIG. 4 is a view illustrating an example of the temperature adjustment control of a second embodiment.

Next, a control device 14 according to a second embodiment will be described with reference to FIG. 4. FIG. 4 is a view illustrating an example of temperature adjustment control of the second embodiment. Furthermore, in the second embodiment, description will be given of a portion different from that in the first embodiment to avoid redundant description, and the same reference numeral will be given to a portion having the same configuration as in the first embodiment. In the second embodiment, during load raising, the operation control point of the gas turbine 1 is allowed to vary to a temperature lower than the preceding flue gas temperature of the preceding setting line T2. In the temperature adjustment control of the second embodiment is temperature adjustment control in a case where the amount of load variation is greater in comparison to the first embodiment. Furthermore, examples of a case where the amount of load variation is great include a case where the gas turbine is subjected to a rapid-activation operation or a case where a frequency of a power generator varies.

As illustrated in FIG. 4, as is the case with the first embodiment, in the control device 14 of the second embodiment, the temperature adjustment control is executed by using the rated temperature adjustment line T1, the preceding setting line T2, and the limit temperature adjustment line T3. In FIG. 4, description will be given of a case where the temperature adjustment control is performed to be on the rated temperature adjustment line T1 during correction of the partial load operation, and then the temperature adjustment control is performed to be on the rated temperature adjustment line T1 during correction of the full load operation.

During load raising, the control device 14 enlarges the valve opening degree of the fuel adjustment valve 35 to increase the supply amount of the fuel F, thereby increasing the gas turbine output. The control device 14 enlarges the opening degree of the inlet guide vane 22 in correspondence with the increasing gas turbine output so as to increase the intake amount of the air A. At this time, the control device 14 uses a function set to be an opening degree greater than the opening degree of the inlet guide vane 22 which is set in accordance with the preceding setting line T2, and sets the opening degree of the inlet guide vane 22 on the basis of the gas turbine output. Accordingly, according to the control device 14, an opening degree greater than the opening degree of the inlet guide vane 22 in the preceding setting line T2 is set, and thus the intake amount of the air A, which is introduced to the compressor 11, further increases in comparison to the preceding setting line T2. According to this, the control device 14 can increase the intake amount of the air A to be introduced, and thus it is possible to rapidly lower the flue gas measurement temperature. In addition, the control device 14 displaces the operation control point of the gas turbine 1 to follow the preceding setting line T2 in a state in which the flue gas measurement temperature becomes lower than the preceding flue gas temperature of the preceding setting line T2. At this time, the control device 14 controls the opening degree of the inlet guide vane 22 so that the opening degree of the inlet guide vane 22 can enter an ultra-open state greater than the rated opening degree.

Then, when reaching a predetermined target load at which the partial load operation is performed, the control device 14 transitions the operation control point of the gas turbine to the rated temperature adjustment line T1 from a state of being lower than the preceding flue gas temperature. Specifically, when reaching a predetermined target load, the control device 14 performs control of reducing the opening degree of the inlet guide vane 22 to raise the flue gas measurement temperature. In addition, the control device 14 transitions the operation control point to the rated temperature adjustment line T1, and thus the performance of the gas turbine 1 in the partial load operation becomes the rated performance.

In the partial load operation, in the case of performing the full load operation by raising a load from a state in which the operation control point is set to the rated temperature adjustment line T1, the control device 14 transitions the operation control point to a state of being lower than the preceding flue gas temperature of the preceding setting line T2. Specifically, the control device 14 performs control of enlarging the opening degree of the inlet guide vane 22 to be greater than the opening degree in the preceding setting line T2, thereby increasing the intake amount of the air A to be introduced and rapidly lowering the flue gas measurement temperature.

When the operation control point is transitioned to a state of being lower than the preceding flue gas temperature of the preceding setting line T2, the control device 14 controls the operation of the gas turbine 1 to increase the gas turbine output. Then, when the opening degree of the inlet guide vane 22 reaches the rated opening degree, the control device 14 controls the opening degree of the inlet guide vane 22 to enter an ultra-open state exceeding the rated opening degree, and increases the gas turbine output until the full load operation is performed.

In addition, the control device 14 transitions the operation control point to the rated temperature adjustment line T1, and thus the performance of the gas turbine in the full load operation becomes the rated performance, and the gas turbine output becomes the rated output. Accordingly, the control device 14 can control the operation of the gas turbine 1 in an operation state in which work efficiency of the gas turbine 1 in the full load operation is optimized.

As described above, according to the second embodiment, in a case where the amount of load variation is great, the limit flue gas temperature of the limit temperature adjustment line T3 rapidly lowers in accordance with the load raising. At this time, even when the operation control point is displaced due to the load raising, in a case where the flue gas measurement temperature slowly lowers, the flue gas measurement temperature is limited to the limit flue gas temperature, and thus it is difficult to allow the operation control point to vary. Accordingly, in a case where the amount of load variation during the load raising is great, the operation control point is allowed to vary to a temperature lower than the preceding flue gas temperature of the preceding setting line T2. According to this, the opening degree of the inlet guide vane 22 is enlarged in comparison to the preceding setting line T2 to increase the intake amount of the air A to be introduced. According to this, it is possible to quickly lower the flue gas measurement temperature. As a result, the flue gas measurement temperature is not limited to the limit temperature adjustment line T3, and it is possible to allow the operation control point to suitably vary.

Third Embodiment

Figure 5:
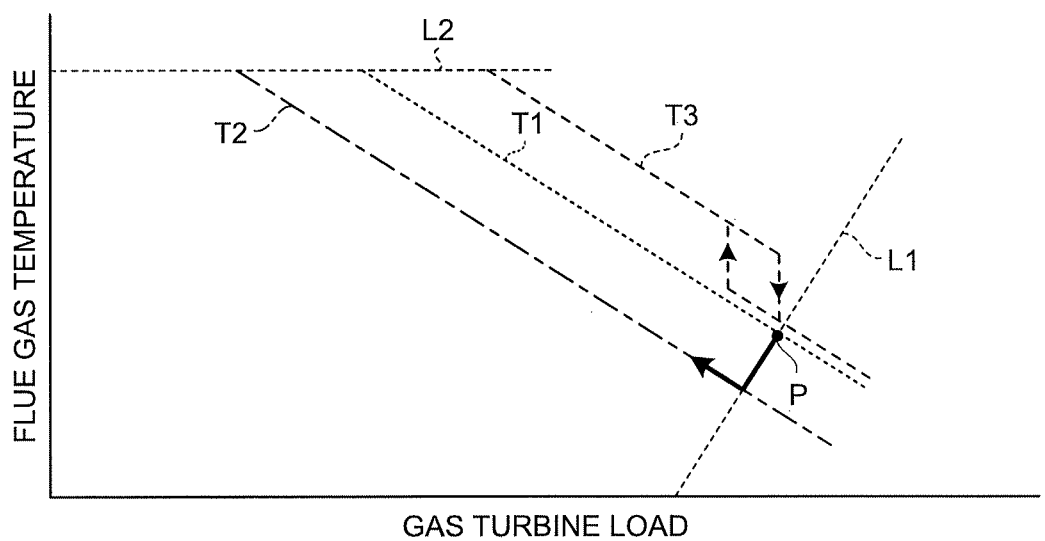
FIG. 5 is a view illustrating an example of the temperature adjustment control of a third embodiment.

Next, description will be given of a control device 14 according to a third embodiment with reference to FIG. 5. FIG. 5 is a view illustrating an example of temperature adjustment control of the third embodiment. Furthermore, in the third embodiment, description will also be given of a portion different from that in first and second embodiments to avoid redundant description, and the same reference numeral will be given to a portion having the same configuration as in first and second embodiments. In the third embodiment, during load lowering, the limit temperature adjustment line T3 is set to follow the rated temperature adjustment line T2.

As illustrated in FIG. 5, in a case where the operation control point of the gas turbine 1 exists on a rated point (the rated temperature adjustment line T2 in the full load operation), during load lowering, the control device 14 changes the limit flue gas temperature of the limit temperature adjustment line T3 to be the rated flue gas temperature of the rated temperature adjustment line T2. Specifically, the opening degree of the inlet guide vane 22 at the limit temperature adjustment line T3 is set to be smaller than the opening degree of the inlet guide vane 22 at the rated temperature adjustment line T2. Accordingly, the control device 14 changes the opening degree of the inlet guide vane 22 at the limit temperature adjustment line T3 to be the opening degree of the inlet guide vane 22 at the rated temperature adjustment line T2. In this state, during load lowering, the control device 14 transitions the operation control point to the preceding setting line T2.

In addition, after transitioning the operation control point to the preceding setting line T2, the control device 14 returns the limit temperature adjustment line T3 to an original state. That is, after transitioning the operation control point to the preceding setting line T2, the control device 14 changes the opening degree of the inlet guide vane 22 in the limit temperature adjustment line T3 to an opening degree that is smaller than the opening degree of the inlet guide vane 22 in the rated temperature adjustment line T2.

As described above, according to the third embodiment, in the case of lowering a load in a state in which the flue gas measurement temperature becomes the rated flue gas temperature, the limit temperature adjustment line T3 is changed to be the rated temperature adjustment line T2. According to this, it is possible to control the operation of the gas turbine 1 so that the flue gas measurement temperature does not exceed the rated flue gas temperature. Accordingly, during load lowering, the control device 14 can suppress the flue gas measurement temperature from being higher than the rated flue gas temperature of the rated temperature adjustment line T2.

Furthermore, in the third embodiment, description has been given of the load lowering from the rated point, but there is no limitation to this configuration. Even when performing load lowering in a state in which the operation control point exists on the rated temperature adjustment line T2 during the partial load operation, the same control as in the third embodiment may be executed.

Fourth Embodiment

Figure 6:
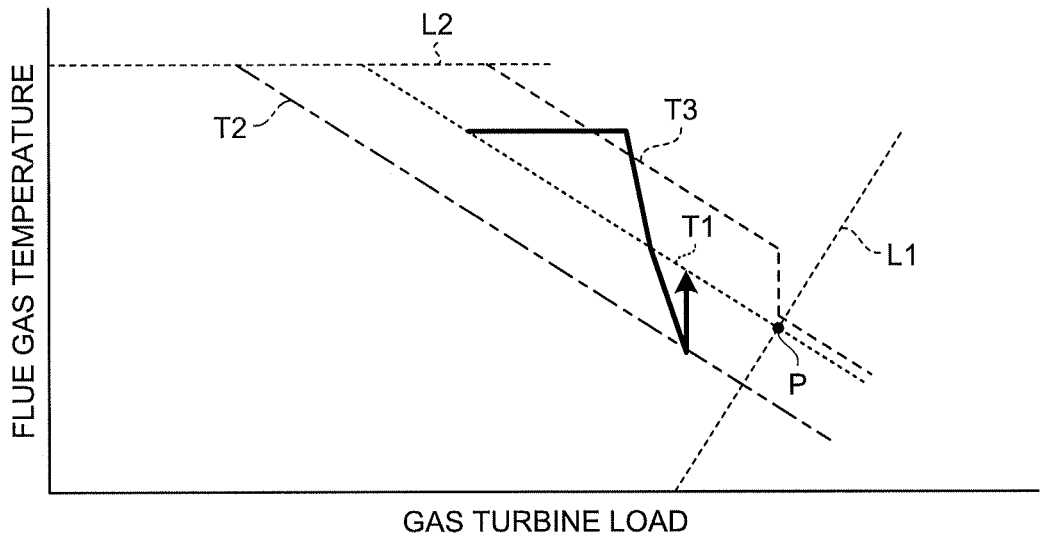
FIG. 6 is a view illustrating an example of the temperature adjustment control of a fourth embodiment.

Next, description will be given of a control device 14 according to a fourth embodiment with reference to FIG. 6. FIG. 6 is a view illustrating an example of temperature adjustment control of the fourth embodiment. Furthermore, in the fourth embodiment, description will also be given of a portion different from that in the first to third embodiments to avoid redundant description, and the same reference numeral will be given to a portion having the same configuration as in the first to third embodiments. In the fourth embodiment, during load raising, in the case of satisfying setting conditions which are set in advance, the operation control point of the gas turbine 1 is permitted to vary beyond the limit temperature adjustment line T3.

As illustrated in FIG. 6, in a case where the operation control point of the gas turbine 1 exists on the rated temperature adjustment line T2, when load raising is performed, the control device 14 lowers the limit flue gas temperature of the limit temperature adjustment line T3 in accordance with the load raising. On the other hand, the flue gas measurement temperature of the gas turbine 1, in which the operation control point varies in accordance with the load raising, may slowly lower. As described in the first embodiment, the limit flue gas temperature of the limit temperature adjustment line T3 is defined by a function of a pressure ratio of the compressor 11. Accordingly, when the pressure ratio is derived by the control device 14 on the basis of a measurement result of the pressure gauge 51, the limit flue gas temperature is derived. On the other hand, the control device 14 measures the flue gas measurement temperature by using the flue gas thermometer 52. Accordingly, responsiveness of the flue gas measurement temperature may be delayed in comparison to the limit flue gas temperature. At this time, to avoid a situation in which the flue gas measurement temperature is limited to the limit flue gas temperature and the variation of the operation control point of the gas turbine 1 is regulated, the control device 14 releases limitation of the flue gas measurement temperature by the limit flue gas temperature of the limit temperature adjustment line T3 in a case where the setting conditions are satisfied during load raising.

Here, the setting conditions will be described. The setting conditions include at least one condition among first to third conditions. The first condition is a condition in which the flue gas measurement temperature does not conform to the rated flue gas temperature of the rated temperature adjustment line T1 and the operation control point transitions to the preceding setting line T2. That is, the first condition is a condition in which the operation of the gas turbine 1 is not subjected to feedback control that is performed in order for the flue gas measurement temperature to be the rated flue gas temperature of the rated temperature adjustment line T1, and the operation control point of the gas turbine 1 is allowed to vary in order for the flue gas measurement temperature to be the preceding flue gas temperature of the preceding setting line T2. The second condition is a condition in which the opening degree of the inlet guide vane 22 is enlarged in order for the flue gas measurement temperature to be lower than the preceding flue gas temperature of the preceding setting line T2. The third condition is a condition in which the pressure ratio of the compressor 11 rises. That is, the third condition is a condition in which the control device 14 detects that the pressure ratio of the compressor 11 rises on the basis of a measurement result that is measured with the pressure gauge 51.

The control device 14 determines whether or not the setting conditions are satisfied during load raising. In a case where it is determined that the setting conditions are satisfied, the control device 14 releases limitation of the flue gas measurement temperature by the limit flue gas temperature of the limit temperature adjustment line T3 to permit the operation control point of the gas turbine 1 to be displaced beyond the limit temperature adjustment line T3. Accordingly, the control device 14 can perform the temperature adjustment control by allowing the operation control point of the gas turbine 1 to vary so that the flue gas measurement temperature exceeds the limit flue gas temperature of the limit temperature adjustment line T3.

As described above, according to the fourth embodiment, in a case where responsiveness of the flue gas measurement temperature is delayed in comparison to the limit flue gas temperature during load raising, the operation control point is permitted to vary beyond the limit temperature adjustment line T3 under setting conditions. According to this, the flue gas measurement temperature is not limited to the limit flue gas temperature, and it is possible to allow the operation control point to suitably vary.

Furthermore, in the fourth embodiment, description has been made simply with reference to the flue gas thermometer 52, but the flue gas thermometer 52 includes the blade path thermometer 52a and the exhaust section thermometer 52b. The response of the blade path thermometer 52a is fast, and the response of the exhaust section thermometer 52b is slow. Accordingly, the temperature adjustment control in the fourth embodiment is useful for the case of measuring the flue gas measurement temperature with the exhaust section thermometer 52b. In addition, in the case of performing the temperature adjustment control by using the blade path thermometer 52a, the operation control point of the gas turbine 1 may be limited not to exceed the limit temperature adjustment line T3.

Fifth Embodiment

Figure 7:
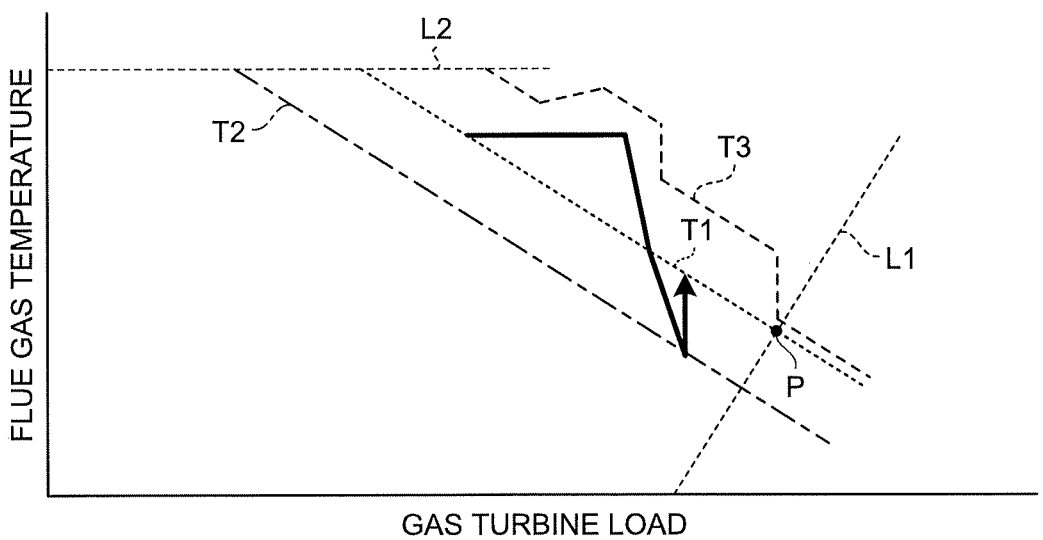
FIG. 7 is a view illustrating an example of the temperature adjustment control of a fifth embodiment.

Next, description will be given of a control device 14 according to a fifth embodiment with reference to FIG. 7. FIG. 7 is a view illustrating an example of temperature adjustment control of the fifth embodiment. Furthermore, in the fifth embodiment, description will be given of a portion different from that of the first to fourth embodiments to avoid redundant description, and the same reference numeral will be given to a portion having the same configuration as in the first to fourth embodiments. In the fifth embodiment, in a case where setting conditions which are set in advance are satisfied during load raising, the limit flue gas temperature of the limit temperature adjustment line T3 is set to be greater than the flue gas measurement temperature.

As illustrated in FIG. 7, in a case where the operation control point of the gas turbine 1 exists on the rated temperature adjustment line T2, when the control device 14 performs load raising, the limit flue gas temperature of the limit temperature adjustment line T3 lowers in accordance with the load raising. At this time, the responsiveness of the flue gas measurement temperature may be delayed in comparison to the limit flue gas temperature. Accordingly, to avoid a situation in which the flue gas measurement temperature is limited to the limit flue gas temperature and the variation of the operation control point of the gas turbine 1 is regulated, in a case where the setting conditions are satisfied during load raising, the control device 14 sets the limit flue gas temperature of the limit temperature adjustment line T3 to be higher than the flue gas measurement temperature in order for the flue gas measurement temperature not to be limited to the limit flue gas temperature. Furthermore, the setting conditions are the same as in the fourth embodiment, and thus description thereof will be omitted.

The control device 14 determines whether or not the setting conditions during load raising are satisfied. In a case where it is determined that the setting conditions are satisfied, the control device 14 sets the limit flue gas temperature of the limit temperature adjustment line T3 to be higher than the flue gas measurement temperature, and displaces the operation control point of the gas turbine 1 not to reach the limit temperature adjustment line T3. Accordingly, the control device 14 can perform the temperature adjustment control by allowing the operation control point of the gas turbine 1 to vary in order for the flue gas measurement temperature not to reach the limit flue gas temperature of the limit temperature adjustment line T3.

As described above, according to the fifth embodiment, in a case where the responsiveness of the flue gas measurement temperature is delayed in comparison to the limit flue gas temperature during load raising, the limit flue gas temperature is set to be higher than the flue gas measurement temperature under the setting conditions. According to this, the flue gas measurement temperature is not limited by the limit flue gas temperature, and it is possible to allow the operation control point to suitably vary.

Sixth Embodiment

Next, description will be given of a gas turbine 110 of a sixth embodiment with reference to FIGS. 8 to 20. Furthermore, in the sixth embodiment, description will be given of a portion that is different from that in the first to fifth embodiments to avoid redundant description, and the same reference numeral will be given to a portion having the same configuration as in the first to fifth embodiments.

Figure 8:
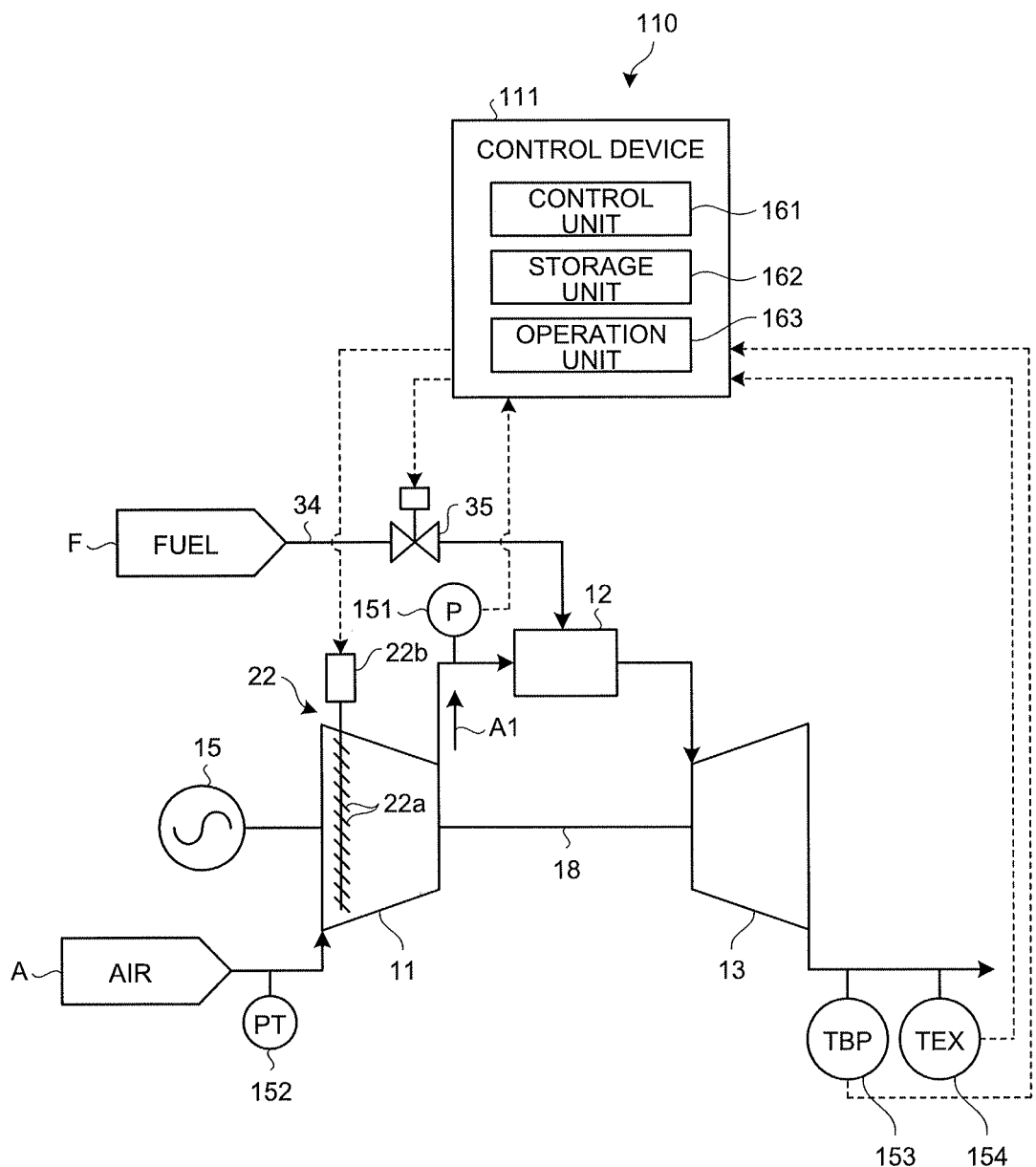
FIG. 8 is a schematic view illustrating a gas turbine of a sixth embodiment.

FIG. 8 is a schematic view illustrating a gas turbine of the sixth embodiment. FIGS. 9(a)-(e) are graphs illustrating gas turbine behavior that responds in correspondence with a variation of a system frequency. FIGS. 10 to 17 are graphs illustrating an example of an operation control parameter value.

As is the case with the first embodiment, a gas turbine 110 of the sixth embodiment illustrated in FIG. 8 includes the compressor 11, the combustor 12, and the turbine 13. Furthermore, description of the compressor 11, the combustor 12, and the turbine 13 will be omitted.

In the gas turbine 110, a compartment pressure gauge 151, an intake state detector 152, a blade path thermometer 153, and a flue gas thermometer 154 are provided. The compartment pressure gauge 151 is provided in a line through which compressed air A1 circulates from the compressor 11 to toward the combustor 12, specifically, at the inside of a compartment of the combustor 12 to measure a pressure (compartment pressure) of the compressed air A1. The intake state detector 152 detects an intake temperature and an intake pressure of air A that is introduced to the compressor 11. The blade path thermometer 153 is provided in a line through which a flue gas discharged from the turbine 13 circulates, measuring a temperature of a flue gas that passes through a blade on the final stage provided on a downstream side in a flow direction of the flue gas of the turbine 13. The flue gas thermometer 154 is provided downstream of the blade path thermometer 153 to measure a temperature of the flue gas. In addition, although not illustrated in the drawing, a power generator output meter configured to detect a load of the gas turbine 110 is provided in the gas turbine 110. In addition, signals measured by the compartment pressure gauge 151, the intake state detector 152, the blade path thermometer 153, and the flue gas thermometer 154, are input to a control device 111.

The control device 111 controls the inlet guide vane 22, the fuel adjustment valve 35, and the like on the basis of measurement results of the compartment pressure gauge 151, the intake state detector 152, the blade path thermometer 153, the flue gas thermometer 154, and the like to control an operation of the gas turbine 110.

As is the case with the first embodiment, the control device 111 performs the partial load operation and the full load operation, and executes the temperature adjustment control.

In addition, as is the case with the first embodiment, the control device 111 executes fuel control to adjust the supply amount of the fuel F.

Figure 9A:
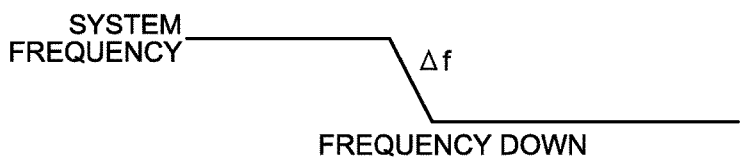
FIG. 9($a$)-($e$) are graphs illustrating gas turbine behavior that responds in correspondence with a variation of a system frequency.
Figure 9B:
Figure 9C:
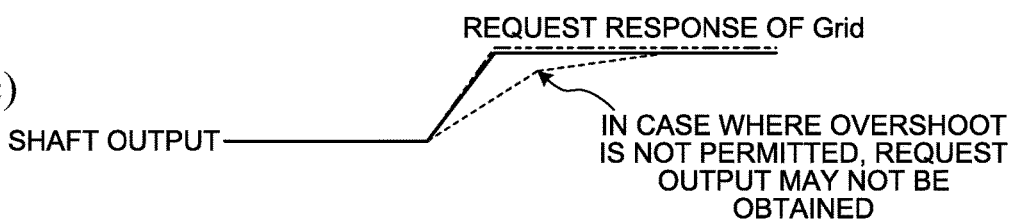

Here, description will be given of an example of a frequency response by the control device 14 when a load varies in the full load operation with reference to FIGS. 9(a)-(e). In the full load operation, when system frequency drop as illustrated in FIG. 9(a) occurs, in a case where the inlet guide vane 22 reaches a rated opening degree region already in a high-load region, it is necessary for the gas turbine 110 to increase the supply amount of the fuel F through the fuel control without a variation of an IGV opening degree as illustrated in FIG. 9(b) so as to increase a shaft output as illustrated in FIG. 9(c). Furthermore, in the case of a combined cycle in which the gas turbine 110 is combined with a steam turbine (not illustrated), the shaft output represents the sum of a gas turbine output (GT output) and a steam turbine output (ST output).

Figure 9D:
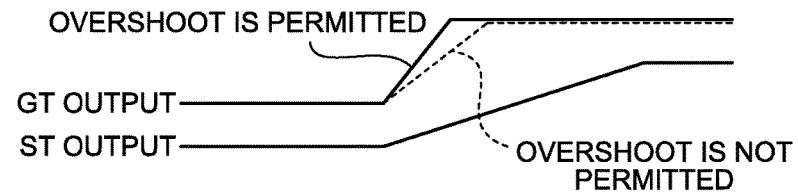
Figure 9E:
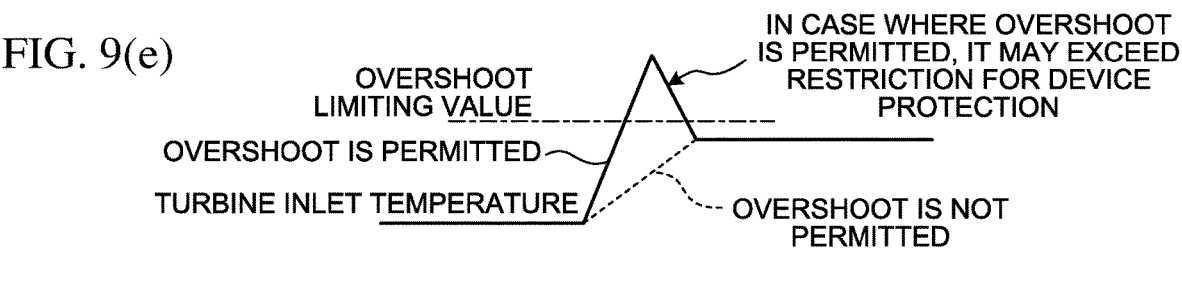

At this time, in a case where the shaft output is set to satisfy a request response of Grid as indicated by a solid line in FIG. 9(c), an increase in the steam turbine output (ST output) is delayed as illustrated in FIG. 9(d), and thus it is necessary for a gas turbine output indicated by a solid line in FIG. 9(d) to be set. The turbine inlet temperature exceeds an upper limit temperature (overshoot limiting value) as illustrated in FIG. 9(e) to obtain the gas turbine output indicated by the solid line in FIG. 9(d). Furthermore, the request response of Grid is responsiveness of a shaft output which is required (defined) in Grid Code. In this manner, in the case of permitting the overshoot of the turbine inlet temperature, it may exceed restriction for device protection.

On the other hand, in a case where the turbine inlet temperature is set not to exceed the upper limit temperature (a case where overshoot is not permitted) as illustrated in FIG. 9(e), the gas turbine output is obtained as indicated by a dot line in FIG. 9(d), and thus there is a possibility that the request response of Grid in the shaft output as indicated by a dot line in FIG. 9(c) may not be satisfied.

Here, the responsiveness of the shaft output is uniquely determined by the request response of the Grid Code, and thus in a case where the overshot of the turbine inlet temperature is permitted, it is difficult to execute the temperature adjustment control.

Accordingly, in the control device 111 of the sixth embodiment, in a case where the gas turbine 110 is subjected to the temperature adjustment control, IGV preceding open control of controlling an IGV opening degree is executed so that the IGV opening degree becomes greater than the opening degree in the temperature adjustment control. In addition, in the IGV preceding open control, when the gas turbine 110 is subjected to the temperature adjustment control in the full load operation, the control device 111 performs control to enter an ultra-open state in which the IGV opening degree is greater than the rated opening degree. Furthermore, although the IGV preceding open control will be described in detail in other embodiments, the control device 111 executes the IGV preceding open control lowers the turbine inlet temperature by setting the intake amount of air introduced to the compressor 11 to a great amount in comparison to a typical operation state. As a result, the flue gas temperature of the gas turbine 110 becomes lower than the upper limit temperature of the temperature adjustment line, and thus it is possible to adjust the gas turbine output.

In this manner, the control device 111 of the first embodiment has a configuration capable of executing the IGV preceding open control so as to enhance the responsiveness of gas turbine output. However, when executing the IGV preceding open control, the turbine inlet temperature lowers, and thus the operation efficiency of the gas turbine 110 deteriorates.

Accordingly, when the control device 111 executes the temperature adjustment control to enhance the performance of the gas turbine 110, the gas turbine 110 is subjected to an operation in conformity to the temperature adjustment line, and the operation in conformity to the temperature adjustment line is limited. Accordingly, it is difficult to realize immediate response of the gas turbine output in conformity to the load variation (particularly, during load raising). On the other hand, when the control device 111 executes load control at a flue gas temperature lower than the upper limit temperature of the temperature adjustment line so as to enhance the responsiveness of the gas turbine 110, it is difficult to raise the turbine inlet temperature in the gas turbine 110, and thus it is difficult to enhance operation efficiency. In this manner, the following trade-off relationship exists in the gas turbine 110. That is, when enhancing the operation efficiency, the responsiveness deteriorates, and when enhancing the responsiveness, the operation efficiency deteriorates.

Accordingly, the control device 111 of the sixth embodiment has a configuration capable of adjusting the operation efficiency and the responsiveness of the gas turbine 110. Specifically, the control device 111 includes a control unit 161, a storage unit 162, and an operation unit 163.

The storage unit 162 stores operation setting data 171 for setting of the operation efficiency and the responsiveness of the gas turbine 110, and a plurality of operation control parameter values 172 that can be correlated to the operation setting data 171.

Figure 10:
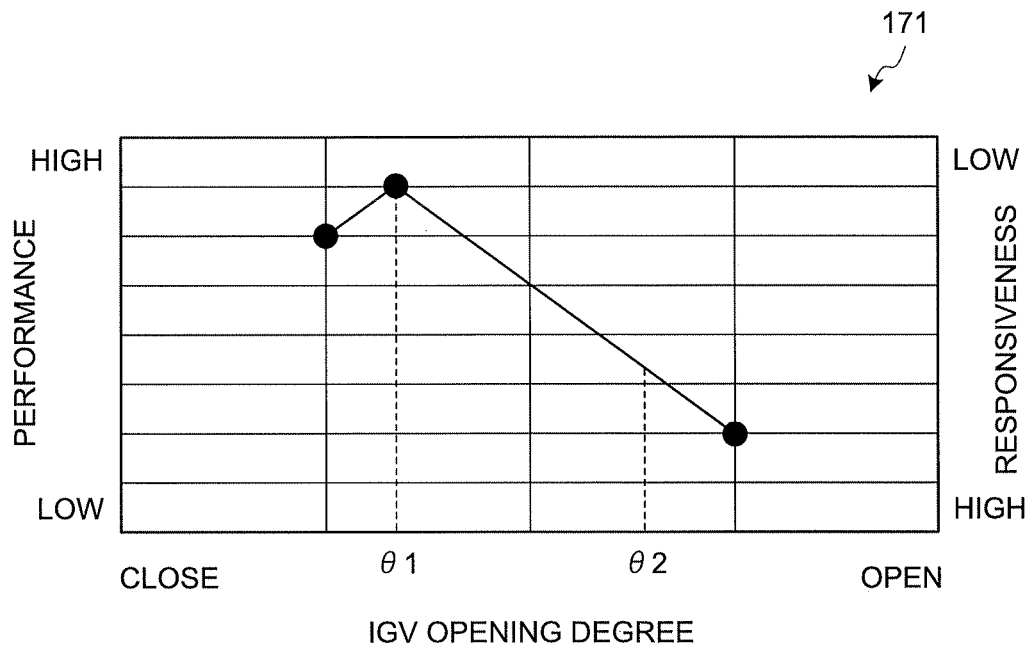
FIG. 10 is a graph illustrating an example of an operation control parameter value.

As illustrated in FIG. 10, the operation setting data 171 in an arbitrary gas turbine output state is a function in which the performance of the gas turbine 110 and the IGV opening degree are correlated to each other. That is, in FIG. 10, the horizontal axis represents the IGV opening degree, and the vertical axis represents the performance of the gas turbine 110. As illustrated in FIG. 10, when the IGV opening degree is the smallest, the gas turbine 110 has high performance. When the IGV opening degree is slightly enlarged, the performance of the gas turbine 110 is the highest. In addition, as the IGV opening degree is enlarged from the IGV opening degree at which the performance of the gas turbine 110 is the highest, the performance of the gas turbine 110 deteriorates. At this time, an IGV opening degree in the vicinity of the IGV opening degree at which the performance of the gas turbine 110 is the highest is set as θ1, and an IGV opening degree at which the performance of the gas turbine 110 deteriorates is set as θ2. In addition, the control device 111 can set the performance of the gas turbine 110 at the IGV opening degree θ1 as performance of 100%. On the other hand, the control device 111 can set the performance of the gas turbine 110 at the IGV opening degree θ2 as performance of 0%. Furthermore, a setting value is not particularly limited to the setting such as 100% and 0%.

Here, as described above, the performance and the operation efficiency of the gas turbine 110 have a trade-off relationship. Accordingly, when the performance of the gas turbine 110 is set to 100%, the control device 111 sets the responsiveness of the gas turbine 110 to 0%. On the other hand, when the performance of the gas turbine 110 is set to 0%, the control device 111 sets the responsiveness of the gas turbine 110 to 100%.

As illustrated in FIGS. 11 to 17, the plurality of operation control parameter values 172 are various kinds of parameters which are set to operate the gas turbine 110. Each of the operation control parameter value 172 is a parameter that varies in response to the IGV opening degree or an atmospheric condition (a pressure, a temperature, and humidity). Accordingly, when the IGV opening degree is set in correspondence with the performance of the gas turbine 110, the operation control parameter value 172 becomes a predetermined parameter value corresponding to the set IGV opening degree. Specifically, examples of the operation control parameter value include a PL ratio (pilot ratio), a fuel temperature, and the like.

Here, the plurality of operation control parameter values 172 are stored during fuel adjustment in the gas turbine 110. Accordingly, the plurality of operation control parameter values 172 have a correlation. In addition, among the plurality of operation control parameter values 172, operation control parameter values of an atmospheric temperature and an atmospheric pressure are corrected, and other operation control parameter values 172 are corrected with the corrected atmospheric temperature and atmospheric pressure set as reference operation control parameter values. According to this, the plurality of operation control parameter values 172 become parameters which can be quantitatively adjusted on the basis of the same reference.

Figure 11:
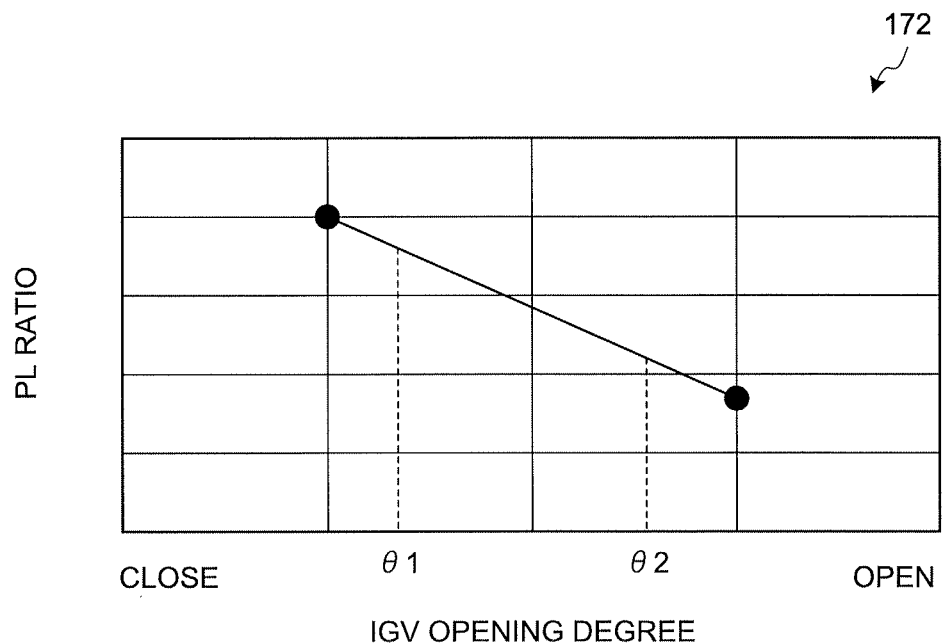
FIG. 11 is a graph illustrating an example of the operation control parameter value.
Figure 12:
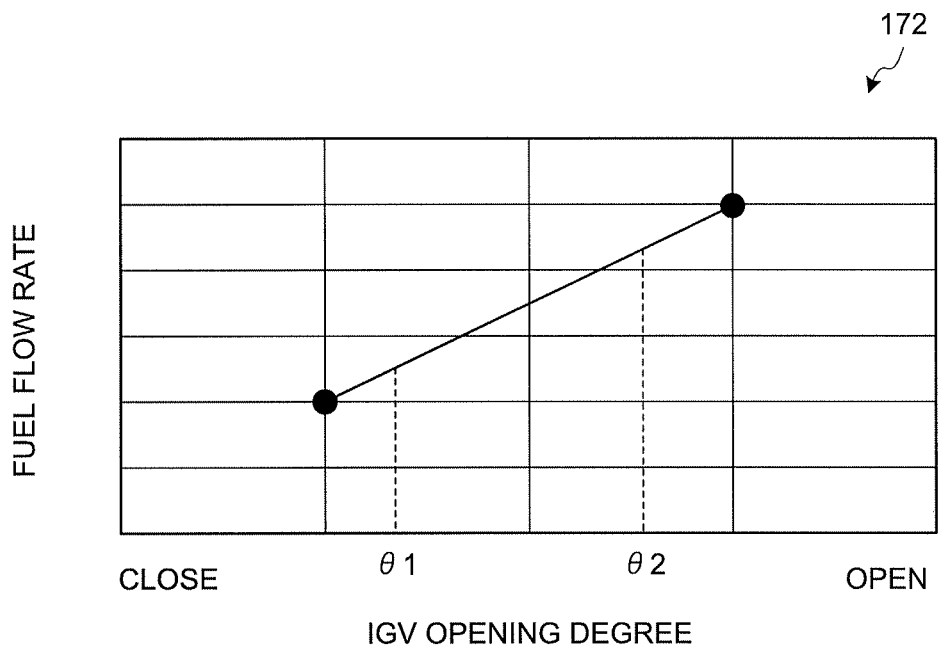
FIG. 12 is a graph illustrating an example of the operation control parameter value.
Figure 13:
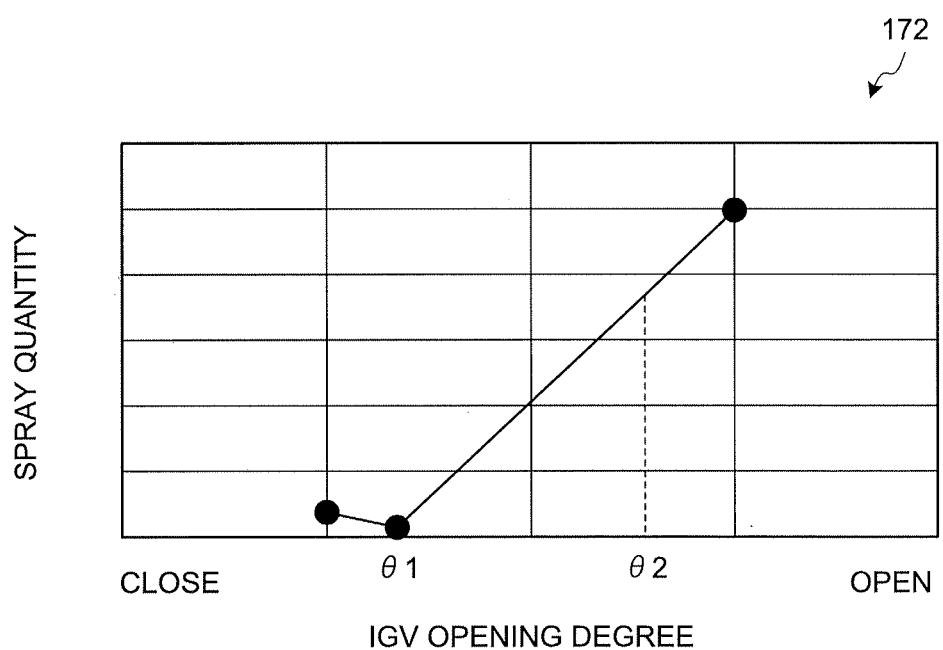
FIG. 13 is a graph illustrating an example of the operation control parameter value.
Figure 14:
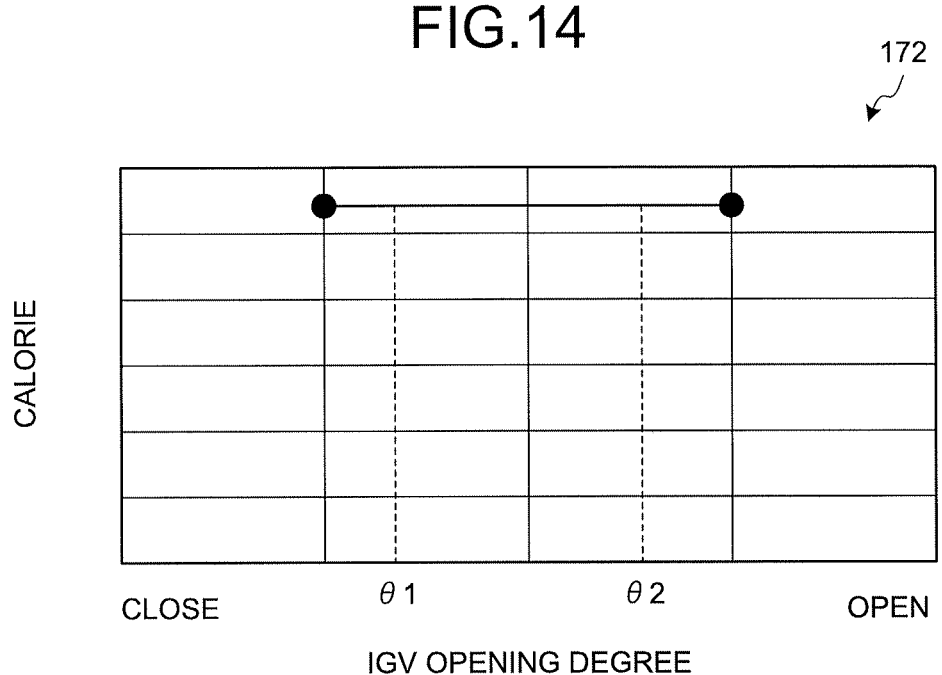
FIG. 14 is a graph illustrating an example of the operation control parameter value.
Figure 15:
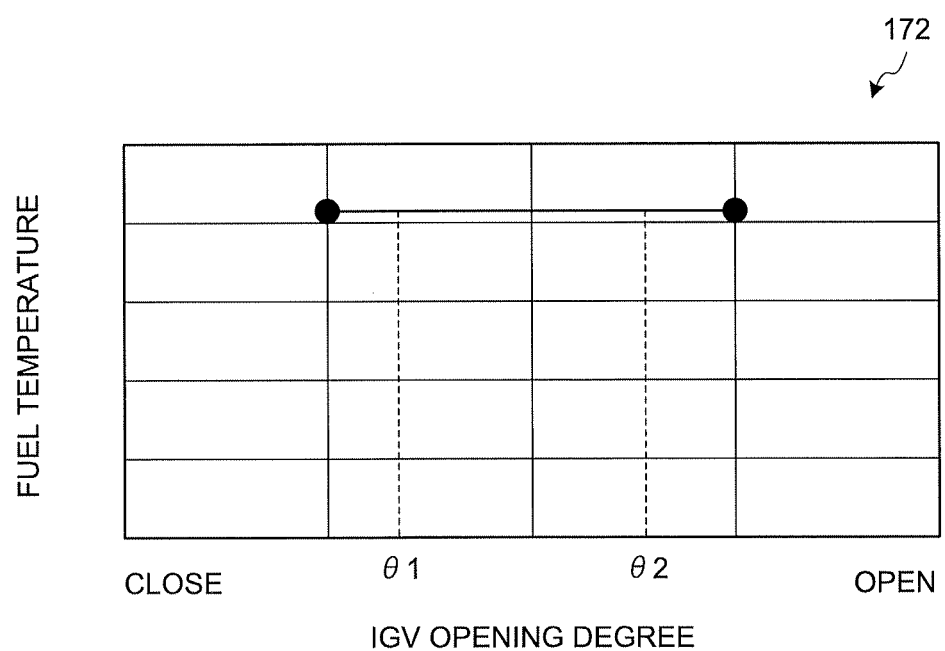
FIG. 15 is a graph illustrating an example of the operation control parameter value.
Figure 16:
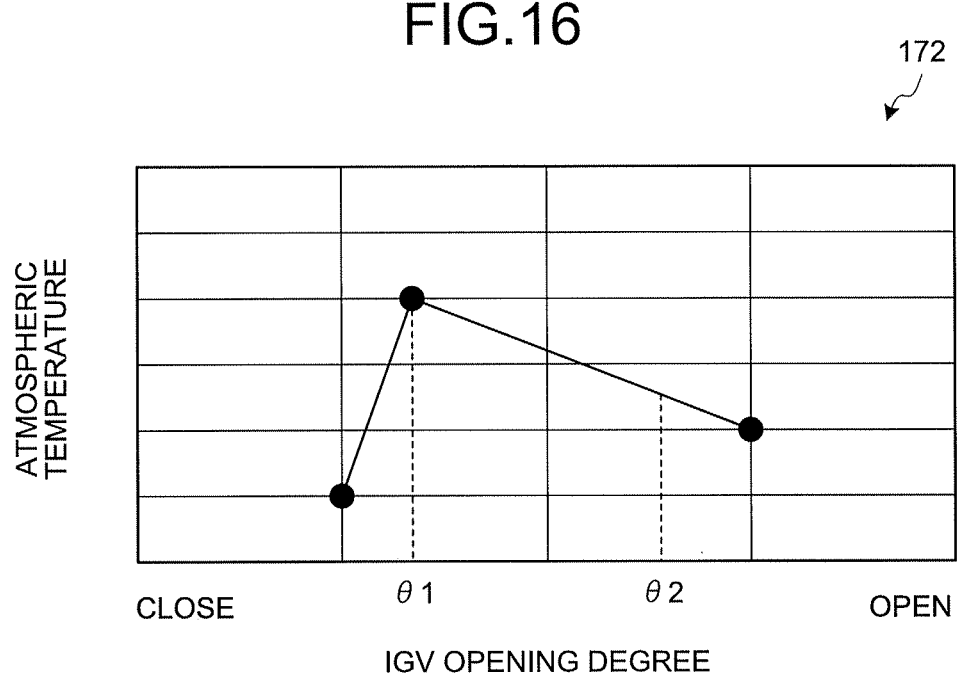
FIG. 16 is a graph illustrating an example of the operation control parameter value.
Figure 17:
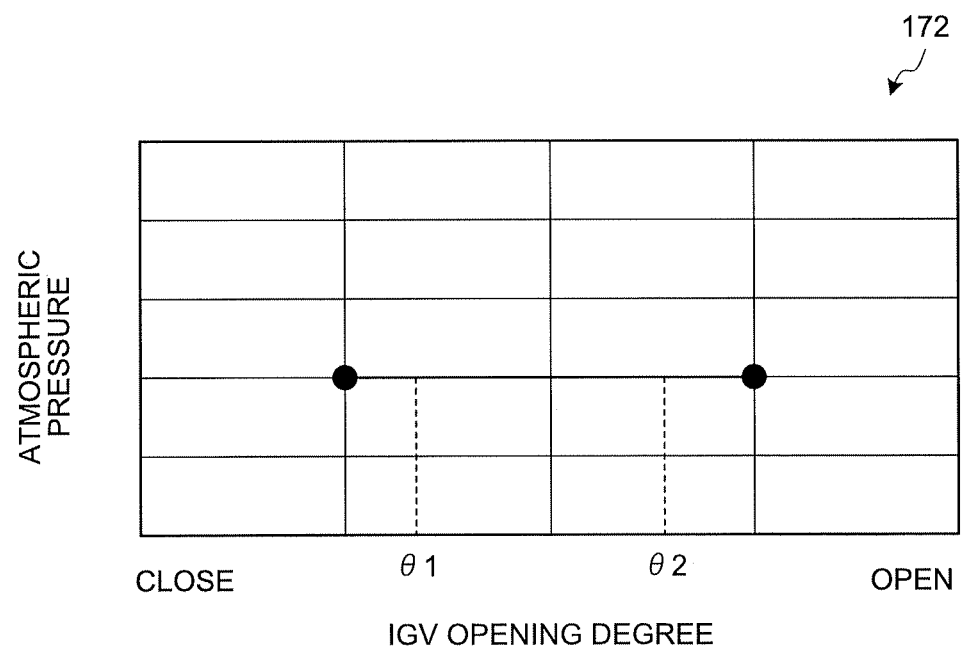
FIG. 17 is a graph illustrating an example of the operation control parameter value.

Specifically, among the plurality of operation control parameter values 172, in the case of an operation control parameter value of the PL ratio in FIG. 11, as the IGV opening degree is enlarged, the PL ratio becomes lower in the same drawing. In an operation control parameter value of a fuel flow rate in FIG. 12, as the IGV opening degree is enlarged, the fuel flow rate increases. In an operation control parameter value of a spray quantity in FIG. 13, when the IGV opening degree is the smallest, the spray quantity becomes small. When the IGV opening degree is slightly enlarged, the spray quantity becomes the smallest, and as the IGV opening degree is enlarged, the spray quantity increases. In an operation control parameter value of calorie in FIG. 14, even when the IGV opening degree is enlarged, the calorie becomes constant. In an operation control parameter value of a fuel temperature in FIG. 15, even when the IGV opening degree is enlarged, the fuel temperature becomes constant. In an operation control parameter value of an atmospheric temperature in FIG. 16, when the IGV opening degree is the smallest, the atmospheric temperature becomes low. When the IGV opening degree is slightly enlarged, the atmospheric temperature becomes the highest, and as the IGV opening degree is enlarged, the atmospheric temperature lowers. In an operation control parameter value of an atmospheric pressure in FIG. 17, even when the IGV opening degree is enlarged, the atmospheric pressure becomes constant. A control system, which calculates a performance value on the basis of the operation data as described above and can set the function value, is constructed.

Figure 18:
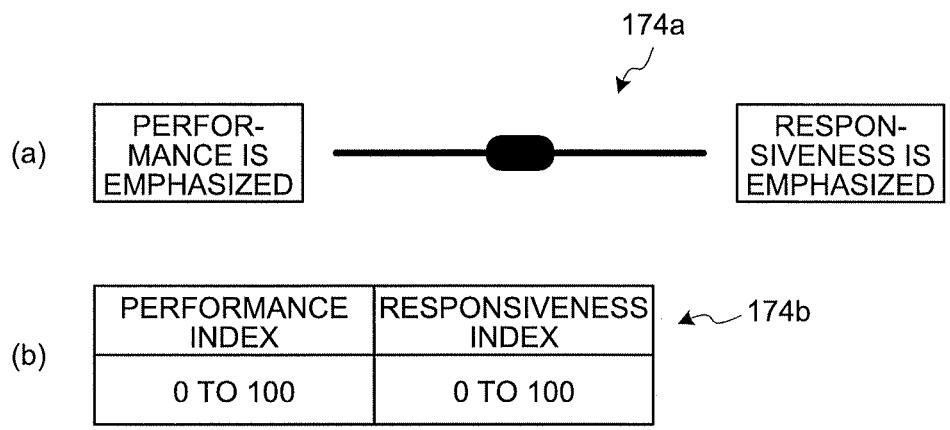
FIG. 18 is a view illustrating an operation unit of a control device.

The operation unit 163 has a configuration capable of setting the performance and the responsiveness of the gas turbine 110. The operation unit 163 is connected to the control unit 161, and outputs an operating signal to the control unit 161 based on the performance and the responsiveness of the gas turbine 110 which are set. For example, as illustrated in FIG. 18(*a*), the operation unit 163 includes an operation-mode operating bar 174*a* for setting to a predetermined operation mode based on the performance and the responsiveness of the gas turbine 110. The operation-mode operating bar 174*a* has a configuration capable of setting the performance and the responsiveness of the gas turbine 110 in conjunction with each other, and sets the performance of the gas turbine 110 to a value from 100% to 0%, and sets the responsiveness of the gas turbine 110 to a value from 0% to 100%. Furthermore, for example, as illustrated in FIG. 18(*b*), the operation unit 163 includes an operation mode setting input item 174*b* for setting to a predetermined operation mode based on a ratio between the performance and the responsiveness of the gas turbine 110. The operation mode setting input item 174*b* has a configuration capable of inputting a ratio of the performance of the gas turbine 110 and a ratio of responsiveness of the gas turbine 110. In this manner, the operation-mode operating bar 174*a* and the operation mode setting input item 174*b* function as a performance operation unit that sets the ratio of the performance of the gas turbine 110 and function as a responsiveness operation unit that sets a ratio of the responsiveness of the gas turbine 110. When the performance of the gas turbine 110 is set to be close to 100%, the operation mode becomes a performance-emphasizing operation mode. On the other hand, when the responsiveness of the gas turbine 110 is set to be close to 100%, the operation mode becomes a responsiveness-emphasizing operation mode. Furthermore, the operation unit 163 may be a so-called touch panel type operation display unit that is integral with a display unit (not illustrated), or may be an independent unit that is separate from the display unit without particular limitation.

The control unit 161 sets the performance and the responsiveness of the gas turbine 110 on the basis of the operation mode that is set by the operation unit 163. Specifically, the control unit 161 includes an operation mode setting unit (distributor) 175 that performs setting based on the performance and the responsiveness of the gas turbine 110.

Figure 19:
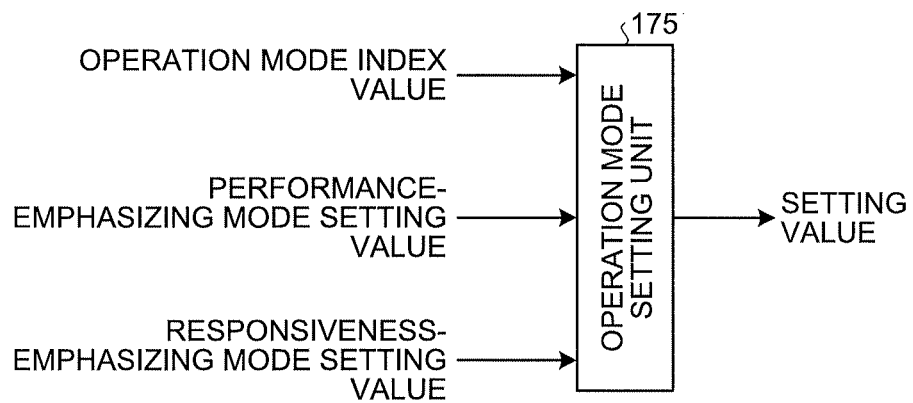
FIG. 19 is a view illustrating an operation mode setting unit of the control device.

As illustrated in FIG. 19, the ratio of the performance of the gas turbine 110 with regard to the operation mode set by the operation unit 163 is input to the operation mode setting unit 175 as an operation mode index value. In addition, the IGV opening degree, which is a value when the performance of the gas turbine 110 is 100% (the responsiveness of the gas turbine 110 is 0%) in the operation setting data 171, is input to the operation mode setting unit 175 as a performance-emphasizing mode setting value (performance parameter value). The IGV opening degree, which is a value when the responsiveness of the gas turbine 110 is 100% (the performance of the gas turbine 110 is 0%) in the operation setting data 171, is input to the operation mode setting unit 175 as a responsiveness-emphasizing mode setting value (responsiveness parameter value). In addition, the operation mode setting unit 175 outputs the setting value of the IGV opening degree which is set on the basis of the operation mode index value, the performance-emphasizing mode setting value, and the responsiveness-emphasizing mode setting value which are input.

Figure 20:
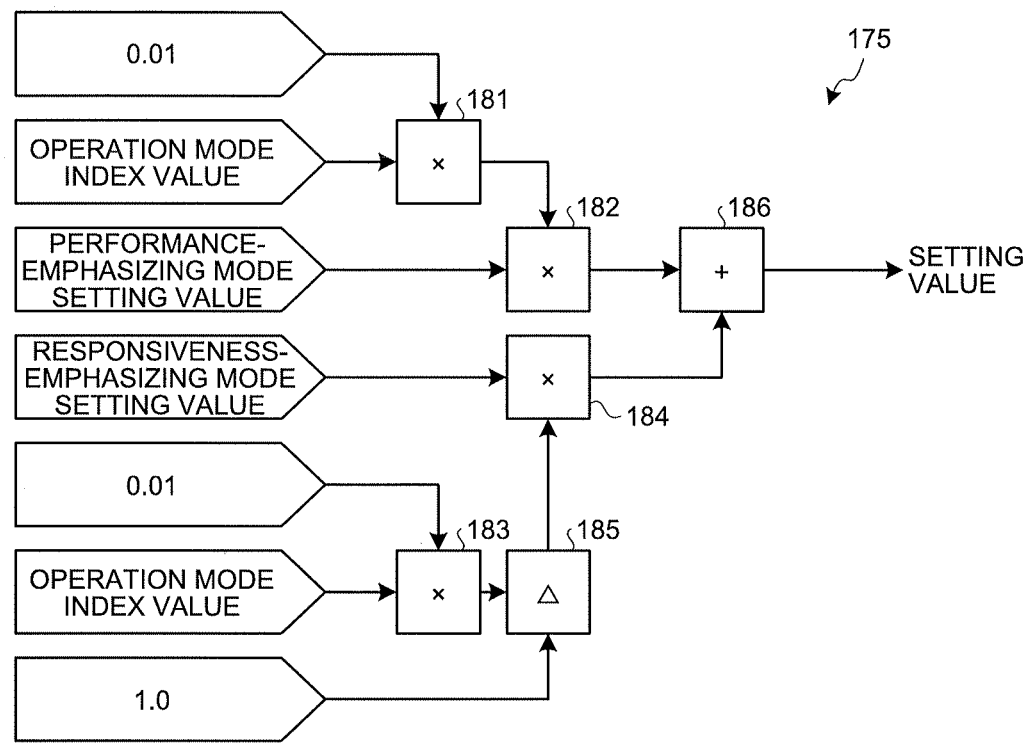
FIG. 20 is a schematic view illustrating a control circuit that constitutes the operation mode setting unit.

As illustrated in FIG. 20, the operation mode setting unit 175 is a distribution circuit including a first multiplier 181, a second multiplier 182, a third multiplier 183, a fourth multiplier 184, a subtractor 185, and an adder 186. Furthermore, there is no particular limitation to this logic as long as distribution is possible with the elements (logic).

The operation mode index value and a numerical value of "0.01" that is a numerical value for returning of a percentage are input to the first multiplier 181. The first multiplier 81 multiplies a ratio (0% to 100%) of the performance of the gas turbine, which is input as the operation mode index value, by 0.01, and outputs the resultant numerical value after multiplication to the second multiplier 182.

The performance-emphasizing mode setting value, and the numerical value output from the first multiplier 181 are input to the second multiplier 182. The second multiplier 182 multiplies the IGV opening degree θ1, which is input as the performance-emphasizing mode setting value, by a numerical value related to the ratio of the performance of the gas turbine 110, and outputs the resultant numerical value after multiplication to the adder 186.

As is the case with the first multiplier 181, the operation mode index value and the numerical value of "0.01" that is a numerical value for returning of a percentage are input to the third multiplier 183. The third multiplier 183 multiplies the ratio (0% to 100%) of the performance of the gas turbine, which is input as the operation mode index value, by 0.01, and outputs the resultant numerical value after multiplication to the subtractor 185.

A numerical value "1.0" that is a numerical value for conversion from the ratio of the performance of the gas turbine into the ratio of the responsiveness of the gas turbine 110, and the numerical value output from the third multiplier 183 are input to the subtractor 185. The subtractor 185 subtracts the ratio of the performance of the gas turbine 110 which is multiplied by 0.01 from "1.0", and output a numerical value after subtraction to the fourth multiplier 184.

The responsiveness-emphasizing mode setting value and the numerical value output from the subtractor 185 are input to the fourth multiplier 184. The fourth multiplier 184 multiplies the IGV opening degree θ2, which is input as the responsiveness-emphasizing mode setting value, by a numerical value related to the ratio of the responsiveness of the gas turbine 110, and outputs the resultant numerical value after multiplication to the adder 186.

The numerical value output from the second multiplier 182 and the numerical value output from the fourth multiplier 184 are input to the adder 186. The adder 186 outputs an IGV opening degree, which is obtained by adding the IGV opening degree θ1 based on the ratio of the performance of the gas turbine 110 and the IGV opening degree θ2 based on the ratio of the responsiveness of the gas turbine 110, as a setting value of an IGV opening degree corresponding to a predetermined operation mode set in the operation unit 163.

In addition, when the setting value is set in the operation mode setting unit 175, the control unit 161 sets the plurality of operation control parameters 172 on the basis of an IGV opening degree corresponding to the setting value. According to this, the control unit 161 executes load control and temperature adjustment control of the gas turbine 110 based on the performance and the responsiveness of the gas turbine 110 which are set in the operation unit 163.

As described above, according to the sixth embodiment, it is possible to allow the operation control parameter value 172 of the gas turbine 110 to correspond to a variation in the operation efficiency (performance) and the responsiveness of the gas turbine 110 at a predetermined load. Accordingly, since the operation efficiency and the responsiveness of the gas turbine 110 are set in correspondence with a use environment of the gas turbine 110, it is possible to set the operation control parameter values 172 in correspondence with the operation efficiency and the responsiveness which are set. That is, in a case where the performance in the operation of the gas turbine 110 is emphasized, it is possible to set the operation control parameter values 172 with which the operation efficiency of the gas turbine 110 at a predetermined load is enhanced. According to this, for example, it is possible to execute the temperature adjustment control of the gas turbine 110 in the partial load operation. On the other hand, in a case where the responsiveness in the operation of the gas turbine 110 is emphasized, it is possible to set the operation control parameter values 172 with which the responsiveness of the gas turbine 110 at a predetermined load is enhanced. According to this, for example, it is possible to execute load control without executing an operation in the vicinity of the temperature adjustment control of the gas turbine 110 in the partial load operation.

In addition, according to the sixth embodiment, it is possible to set the operation control parameter values 172 on the basis of the opening degree of the inlet guide vane 22. Accordingly, the operation mode setting unit 175 can set the operation control parameter values 172 by setting the IGV opening degree.

In addition, according to the sixth embodiment, it is possible to set the operation efficiency and the responsiveness of the gas turbine 110 by operating the operation unit 163, and it is possible to set the operation control parameter values 172 in correspondence with the operation efficiency and the responsiveness which are set. Accordingly, it is possible to simply set the operation control parameter values 172 in correspondence with the operation efficiency and the responsiveness of the gas turbine 110 only by operating the operation unit 163, and thus it is possible to realize a user-friendly configuration.

In addition, according to the sixth embodiment, it is possible to distribute the performance-emphasizing mode setting value and the responsiveness-emphasizing mode setting value on the basis of the ratio of the operation efficiency and the responsiveness, which are set by the operation unit 163, by using the operation mode setting unit 175, and it is possible to set optimal operation control parameter values 172 in correspondence with an operation mode.

In addition, according to the sixth embodiment, it is possible to set the operation efficiency and the responsiveness of the gas turbine 110 in correspondence with the operation environment of the gas turbine 110, and thus it is possible to enhance general-purpose properties.

Seventh Embodiment

Figure 21:
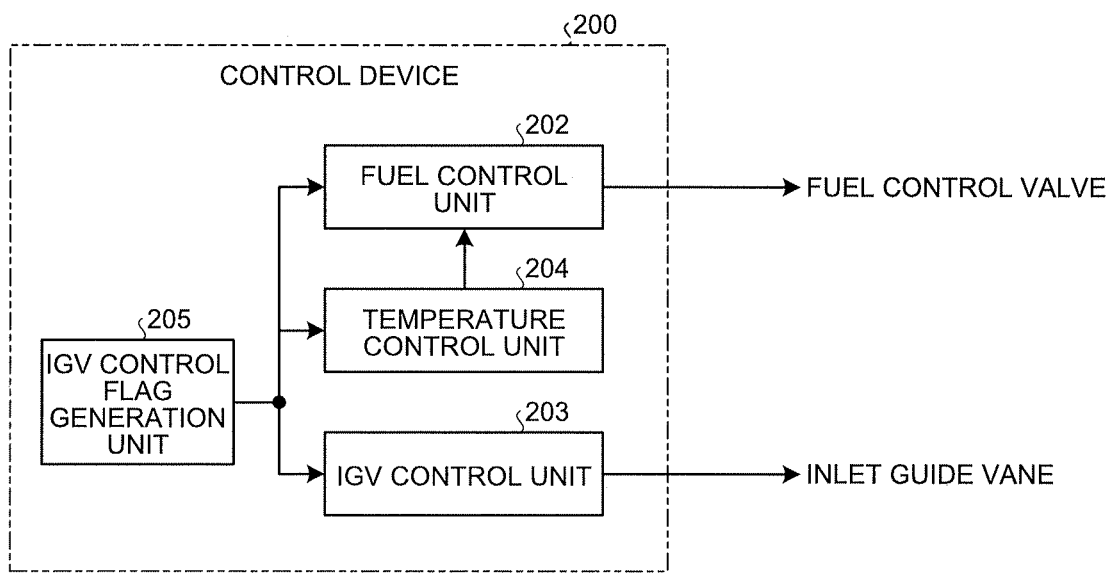
FIG. 21 is a block diagram illustrating a configuration of a control device of a seventh embodiment
Figure 22:
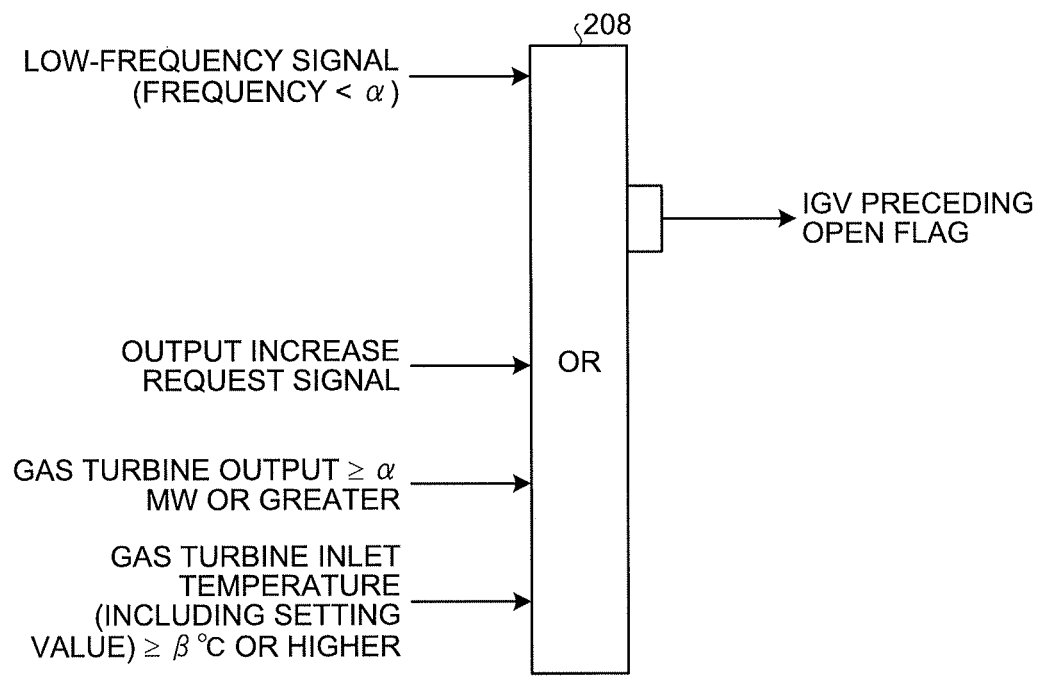
FIG. 22 is a configuration diagram of an IGV control flag generation unit of the seventh embodiment.
Figure 23:
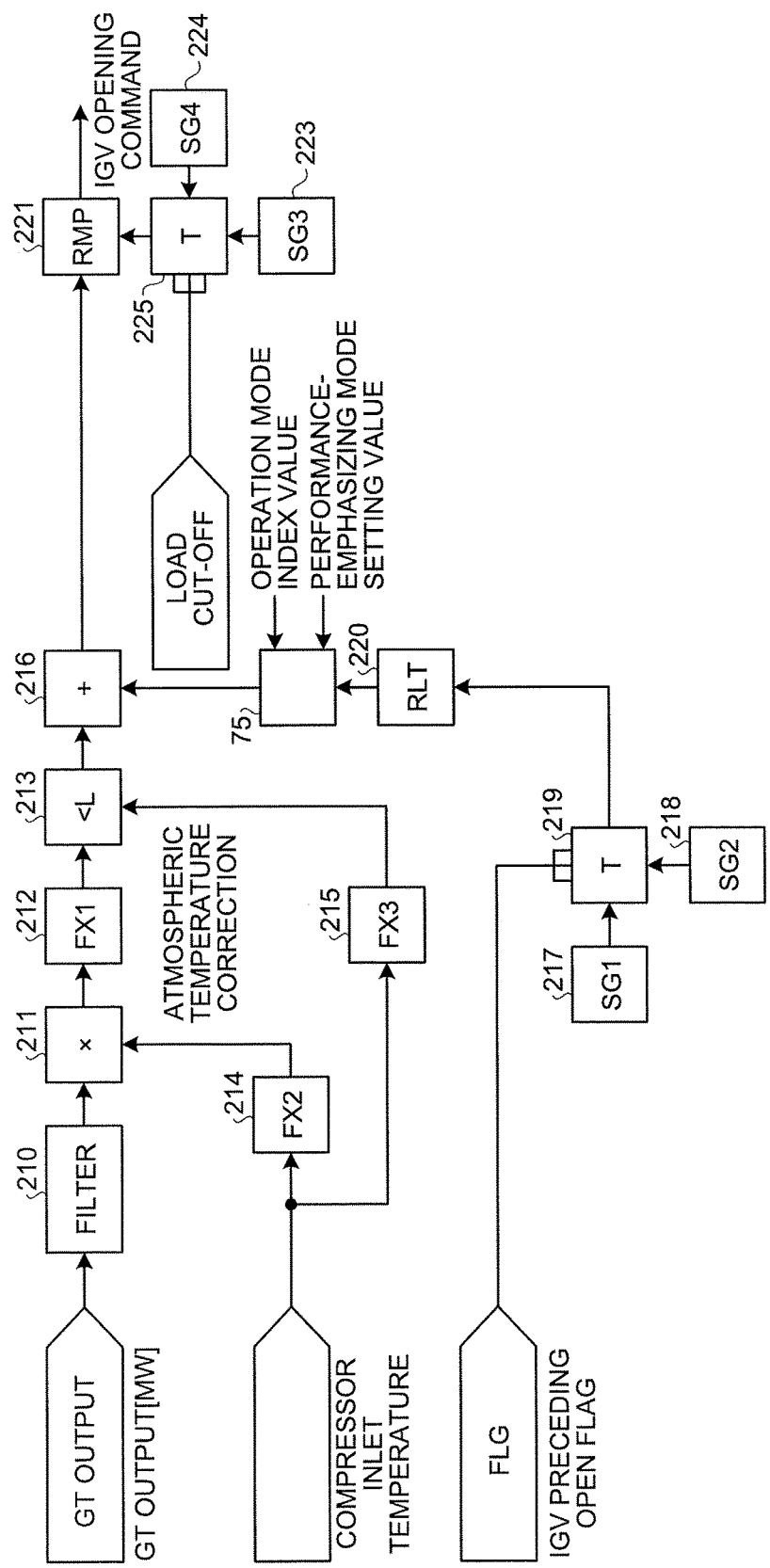
FIG. 23 is a configuration diagram of an IGV control unit of the seventh embodiment.
Figure 24A:
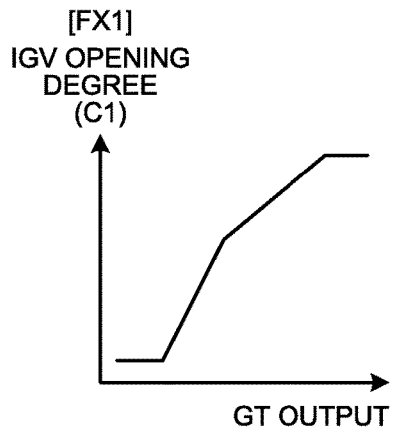
FIGS. 24($a$)-($c$) are views illustrating functions of various function units of the IGV control unit of the seventh embodiment.
Figure 24B:
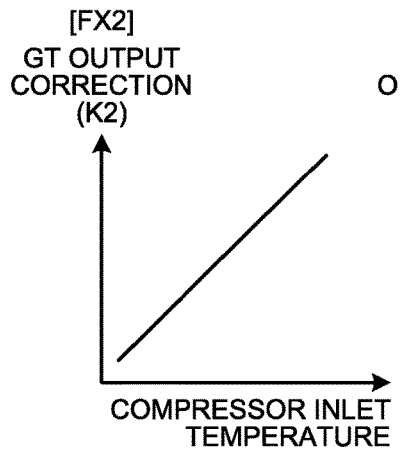
Figure 24C:
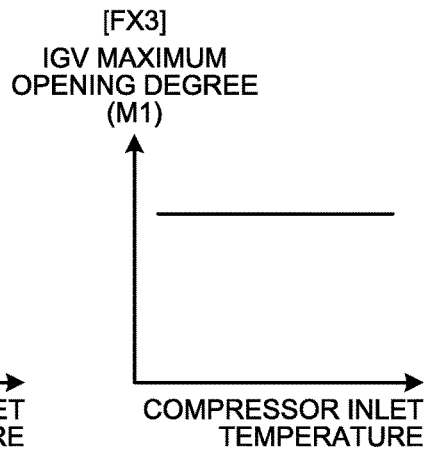
Figure 25:
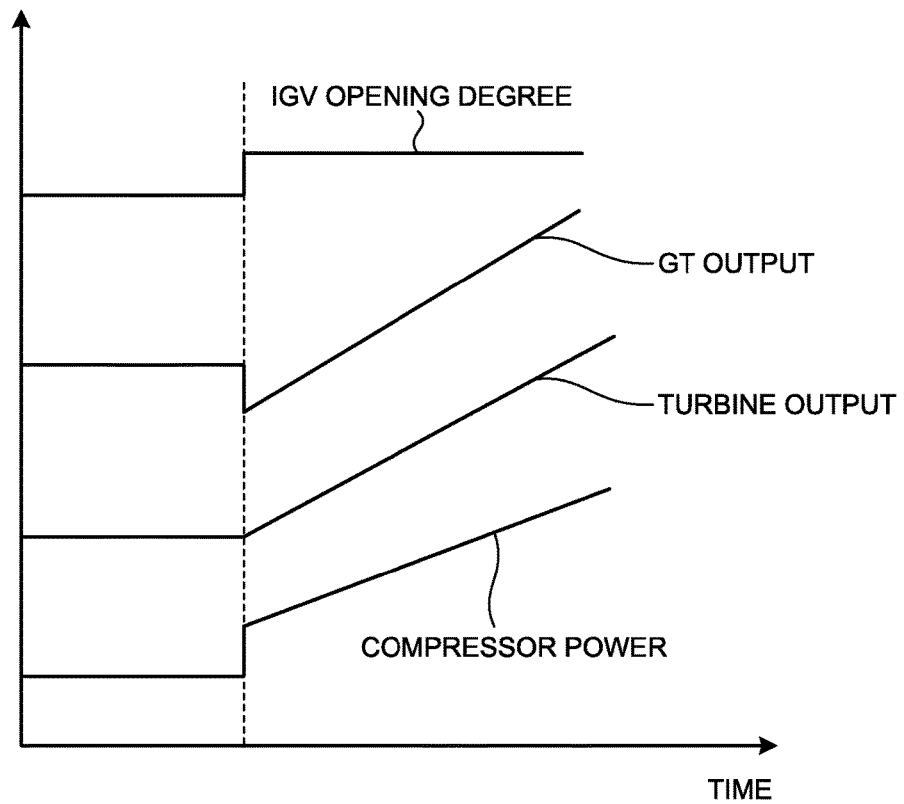
FIG. 25 is a view illustrating an example of a temporal variation of compressor power, a turbine output, and a GT output in a case where an inlet guide vane is rapidly opened.

Next, description will be given of a control device 200 according to a seventh embodiment with reference to FIGS. 21 to 25. FIG. 21 is a block diagram illustrating a configuration of a control device of the seventh embodiment. FIG. 22 is a configuration diagram of an IGV control flag generation unit of the seventh embodiment. FIG. 23 is a configuration diagram of an IGV control unit of the seventh embodiment. FIGS. 24(a)-(c) are views illustrating functions of various function units of the IGV control unit of the seventh embodiment. FIG. 25 is a view illustrating an example of a temporal variation of compressor power, a turbine output, and a GT output in a case where an inlet guide vane is rapidly opened.

Furthermore, in the seventh embodiment, description will be given of a portion different from that in the sixth embodiment to avoid redundant description, and the same reference numeral will be given to a portion having the same configuration as in the sixth embodiment. The control device 200 of the seventh embodiment executes IGV preceding open control of the inlet guide vane 22, and is provided with the operation mode setting unit 175 of the sixth embodiment.

As illustrated in FIG. 21, the control device 200 of the second embodiment includes a fuel control unit 202 that performs fuel control of controlling the fuel adjustment valve 35, a temperature control unit 204 that performs blade path temperature control and flue gas temperature control, an IGV control unit 203 that performs IGV control of the inlet guide vane 22, and an IGV control flag generation unit 205 that generates an IGV preceding open flag.

As illustrated in FIG. 22, in the case of increasing an output of the gas turbine 110, the IGV control flag generation unit 205 makes the IGV preceding open flag valid. For example, in a case where a system frequency is equal to or lower than a predetermined threshold value a and a low-frequency signal is input, or an output increase request signal that makes a request for an increase in the output of the gas turbine 110 is input, the IGV control flag generation unit 205 generates the IGV preceding open flag by making the IGV preceding open flag valid by an OR gate 208. Furthermore, in a case where a gas turbine output limit (gas turbine output≥α MW or greater) is input, or a gas turbine inlet temperature (gas turbine inlet temperature (including an estimated value)≥β° C. or higher) limit is input, the IGV control flag generation unit 205 may generate the IGV preceding open flag by making the IGV preceding open flag valid by the OR gate 208. Furthermore, in a case where the system frequency is equal to or lower than the predetermined threshold value α, the gas turbine 110 increases an output to raise the system frequency.

As illustrated in FIG. 23, the IGV control unit 203 includes a multiplier 211, a table function unit (FX1) 212, a limiter 213, a correction function unit (FX2) 214, and a limiting function unit (FX3) 215. In the IGV control unit 203, a value of a GT output value is input to the multiplier 211 through a filter 210. The IGV control unit 203 sets the IGV opening degree in accordance with a function illustrated in FIG. 24(a) in correspondence with a power generator output (GT output). In addition, the IGV control unit 203 generates a GT output correction coefficient K2 on the basis of a relationship corresponding to a compressor inlet temperature as illustrated in FIG. 24(b) by using the correction function unit (FX2) 214, and multiplies the GT output by the GT output correction coefficient K2 by using the multiplier 211 so as to correct a GT output value that refers to a table function. In addition, the IGV control unit 203 generates an IGV maximum opening degree (rated opening degree) M1 on the basis of a relationship corresponding to the compressor inlet temperature as illustrated in FIG. 24(c) by using the limiting function unit (FX3) 215, and limits the IGV opening degree, which is generated by the table function unit (FX1) 212, with the limiter 213 so as not to exceed the IGV maximum opening degree M1.

In addition, the IGV control unit 203 is provided with a configuration of adding an addition amount based on the IGV preceding open flag with respect to an IGV opening degree command that is output from the limiter 213, a configuration of limiting a variation rate of the IGV opening degree, and the operation mode setting unit 175.

In the configuration of adding the addition amount, signal generators (SG1) 217 and (SG2) 218 are switched from each other by a signal switching unit 219 in response to the IGV preceding open flag, and performs addition to the IGV opening degree command during normal operation by using an adder 216 through a rate limiter 220.

According to this, in a case where the IGV preceding open flag becomes valid, the opening degree of the inlet guide vane 22 is set to be further enlarged in comparison to a current opening degree. For example, in a state in which "0" is set to the signal generator (SG1) 217, and a predetermined value is set to the signal generator (SG2) 218, when the IGV preceding open flag becomes valid, the predetermined value of the signal generator (SG2) 218 is added to the IGV opening degree command during normal operation to further enlarge the opening degree of the inlet guide vane 22 in comparison to a typical case.

Here, the operation mode setting unit 175 is provided between the rate limiter 220 and the adder 216. The operation mode setting unit 175 adjusts the IGV opening degree output from the rate limiter 220, on the basis of a ratio between the performance and the responsiveness of the gas turbine 110 which are set in the operation unit 163. Specifically, the IGV opening degree, which is output from the rate limiter 220, is input to the operation mode setting unit 175 as a responsiveness-emphasizing mode setting value. Furthermore, a performance-emphasizing mode setting value, at which the IGV opening degree becomes "0", is input to the operation mode setting unit 175. In addition, an operation mode index value, which is set in the operation unit 163, is input to the operation mode setting unit 175.

The operation mode setting unit 175 adjusts the IGV opening degree output to the adder 216 on the basis of the values which are input. For examples, in a case where the performance of the gas turbine 110 is 100%, the operation mode setting unit 175 sets the ratio of the IGV opening degree, which is output from the rate limiter 220, to 0%, and outputs the IGV opening degree "0", which is the performance-emphasizing mode setting value, to the adder 216. On the other hand, for example, in a case where the responsiveness of the gas turbine 110 is 100%, the operation mode setting unit 175 sets the ratio of the IGV opening degree, which is output from the rate limiter 220, to 100%, and outputs the IGV opening degree without change, which is output from the rate limiter 220, to the adder 216.

In addition, the configuration of limiting the variation rate of the IGV opening degree is a configuration in which signal generators (SG3) 223 and (SG4) 224 are switched from each other by a signal switching unit 225 in response to a load cut-off flag, and this is supplied to a variation rate limiter 221 to change a variation rate limiting value of the IGV opening degree. Here, a typical variation rate limiting value (for example, 400 [%/minute]) is set to the signal generator (SG3) 223, and a variation rate limiting value during load cut-off (for example, 3000 [%/minute]) is set to the signal generator (SG4) 224.

Next, description will be given of an operation control by the control device 200 of the gas turbine 110 according to the seventh embodiment. In a case where the system frequency becomes equal to or lower than the predetermined threshold value a in a state in which the gas turbine 110 is operated at a partial load, or in a case where an output increase of the gas turbine 110 is request in a state in which the gas turbine 110 is operated at the partial load, the IGV preceding open flag is made to be valid by the IGV control flag generation unit 205. Furthermore, in a case where the gas turbine output limit (gas turbine output≥α MW or greater) is input, or in a case where a gas turbine inlet temperature (gas turbine inlet temperature (including an estimated value)≥β ° C. or higher) limit is input, the IGV control flag generation unit 205 may generate the IGV preceding open flag by making the IGV preceding open flag valid by the OR gate 208.

In the IGV control unit 203, the opening degree of the inlet guide vane 22 is adjusted in correspondence with the ratio of the performance and the responsiveness of the gas turbine 110 which are set by an operation unit 63. For example, in a case where the responsiveness of the gas turbine 110 is emphasized, in the IGV control unit 203, the opening degree of the inlet guide vane 22 is set to be enlarged in comparison to a current opening degree, and the inlet guide vane 22 enters a state in which the opening degree is further enlarged in comparison to a typical case.

Typically, the turbine inlet temperature is proportional to a fuel-air ratio (a ratio of the amount of fuel/the amount of combustion air). Accordingly, when the IGV opening degree is allowed to vary in a direction in which the inlet guide vane 22 is opened, the intake amount of the compressor 11 increases, and the amount of combustion air increases. Accordingly, the fuel-air ratio, that is, the turbine inlet temperature lowers. That is, when the IGV preceding open flag becomes valid, and the responsiveness of the gas turbine 110 is emphasized, the inlet guide vane 22 enters a state of being further opened in comparison to a typical setting. Accordingly, the intake amount of the compressor 11 increases in comparison to a typical case. Accordingly, the gas turbine 110 can be operated in a state in which the turbine inlet temperature is further lowered in comparison to a typical case, and thus it is possible to increase a turbine output due to an increase in air quantity. For example, the opening degree of the inlet guide vane 22 is enlarged by 10% to 20% to increase the air quantity in comparison to the rated flow rate by 5% to 10%.

Specifically, a relationship of "turbine output=turbine-passing flow rate×turbine heat drop×efficiency" is established. Accordingly, when the IGV opening degree is allowed to vary in a direction in which the inlet guide vane 22 is opened, the intake amount of the compressor 11 increases, and thus the turbine-passing flow rate also increases. Accordingly, when the turbine-passing flow rate increases by a certain degree equal to or greater than the heat drop due to the turbine inlet temperature lowering, the output of the power generator 15 increases. In addition, the intake amount of the compressor 11 increases, and thus the turbine inlet temperature lowers. Accordingly, a relatively great amount of fuel can be supplied to the combustor 12, and thus it is also possible to increase the turbine output by the fuel supply.

Furthermore, when the inlet guide vane 22 is opened, the intake amount of the compressor 11 increases, and thus the power of the compressor 11 increases. Accordingly, as illustrated in an example of FIG. 25, when the inlet guide vane 22 is rapidly opened, the power of the compressor 11 rapidly increases in comparison to an increase in the turbine output. As a result, there is a possibility that the GT output (power generator output) may temporarily decreases. Accordingly, in the rate limiter 220, a variation rate is set so that the increase in the turbine output becomes faster than the increase in the power of the compressor 11. According to this, it is possible to suppress a temporal decrease in the GT output in accordance with the increase in the power of the compressor 11 due to the opening of the inlet guide vane 22.

As described above, in the control device 200 of the gas turbine 110 according to the seventh embodiment, in a case where the system frequency becomes equal to or lower than the predetermined threshold value a or an output increase of the gas turbine 110 is request, the IGV preceding open flag is made to be valid. In addition, in a case where the IGV preceding open flag is valid and the responsiveness of the gas turbine 110 is emphasized, the opening degree of the inlet guide vane 22 is set to be enlarged in comparison to a current opening degree. Accordingly, in a case where the responsiveness of the gas turbine 110 is emphasized, an increase in an output is possible without raising the turbine inlet temperature regardless of an operation state of the gas turbine 110. Furthermore, in a case where the performance of the gas turbine 110 is emphasized, setting is not performed to enlarge the opening degree of the inlet guide vane 22.

Furthermore, in the seventh embodiment, the IGV opening degree which becomes a predetermined value is set in the signal generator (SG2) 218, but the opening degree of the inlet guide vane 22 which corresponds to a load variation rate may be set as the IGV opening degree which becomes the predetermined value. According to this configuration, it is possible to set the opening degree of the inlet guide vane 22 to be enlarged in conformity to a load, and thus it is possible to improve conformity of a load.

Eighth Embodiment

Figure 26:
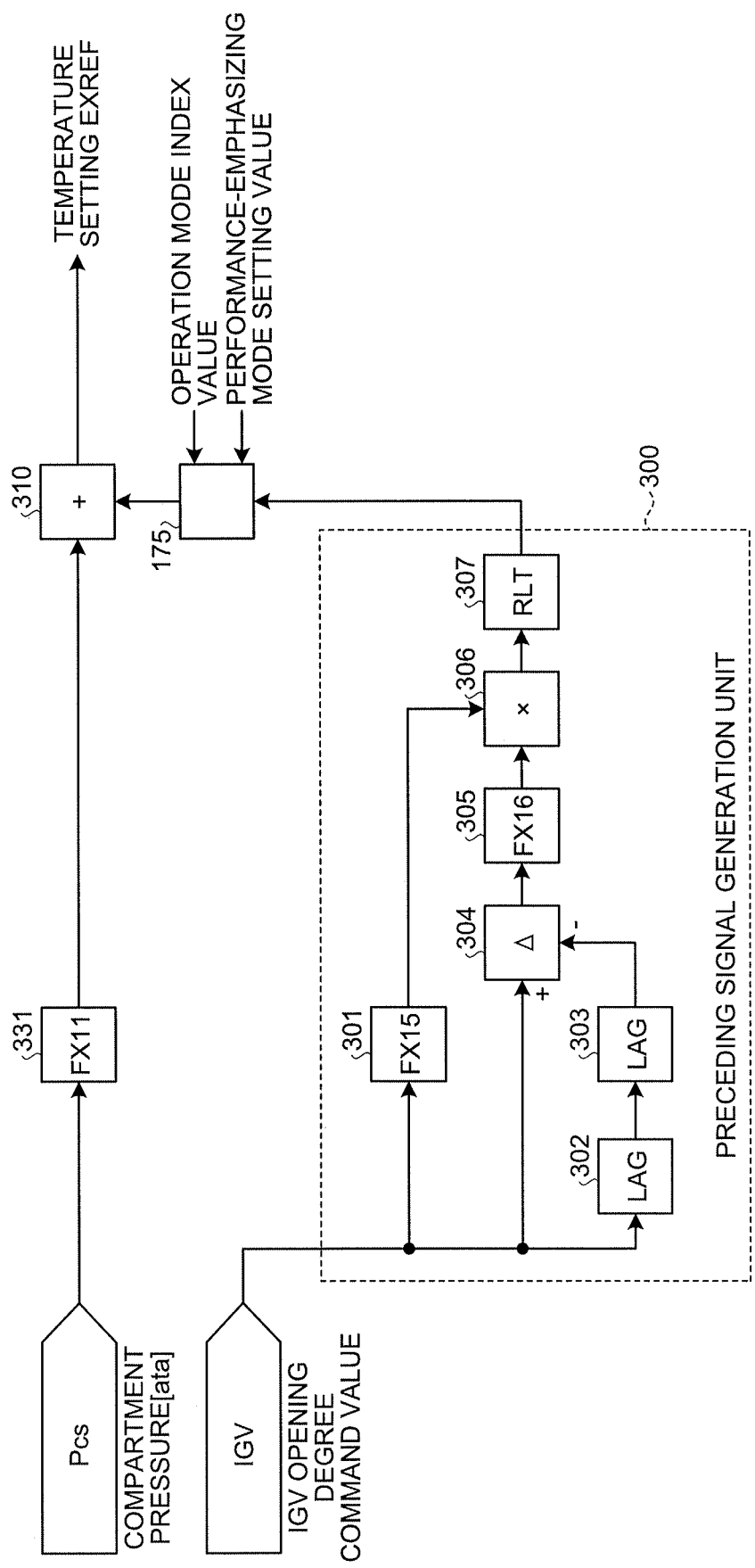
FIG. 26 is a configuration diagram of a section which generates a temperature adjustment setting in a temperature control unit according to an eighth embodiment.
Figure 27A:
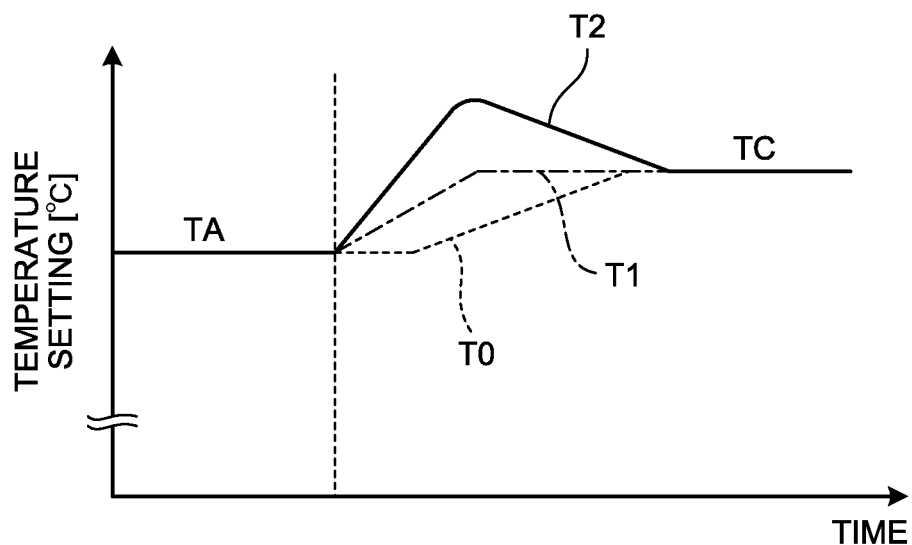
FIGS. 27($a$)-($b$) are views illustrating switching of the temperature adjustment setting according to the eighth embodiment.
Figure 27B:
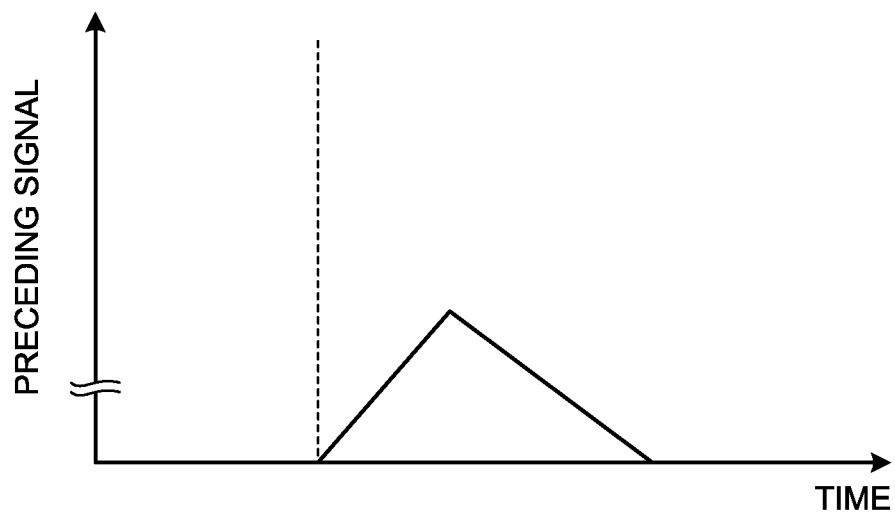

Next, description will be given of a control device according to an eighth embodiment with reference to FIGS. 26 and 27(a)-(b). FIG. 26 is a configuration diagram of a section, which generates a temperature adjustment setting, of a temperature control unit according to the eighth embodiment. FIGS. 27(a)-(b) are views illustrating switching of the temperature adjustment setting according to the eighth embodiment.

Furthermore, in the eighth embodiment, description will also be given of a portion different from that in the sixth and seventh embodiments to avoid redundant description, and the same reference numeral will be given to a portion having the same configuration as in the sixth and seventh embodiments. The control device of the eighth embodiment executes IGV preceding open control of the inlet guide vane 22 in the temperature adjustment control, and is provided with the operation mode setting unit 175 of the sixth embodiment.

The control device of the eighth embodiment performs load adjustment by performing opening degree control of the fuel adjustment valve 35 by a control signal from the fuel control unit 202 and executing fuel control. In the fuel control unit 202, among a blade path temperature setting value BPCSO in blade path temperature control, a flue gas temperature setting value EXCSO in flue gas temperature control, a governor setting value GVCSO in governor control, and a load limit setting value LDCSO in load limit control, the lowest value thereof is used as a final control signal with respect to the fuel adjustment valve 35.

In the blade path temperature control by the temperature control unit 204, a blade path temperature (a flue gas temperature immediately after a final stage of the turbine 13) is measured, and the measured temperature and a target value based on the temperature adjustment setting are compared with each other, and the blade path temperature setting value BPCSO is generated by proportional integral (PI) control. In addition, in the flue gas temperature control, a flue gas temperature (a flue gas temperature at an exhaust duct downstream of the final stage of the turbine 13) is measured, and the measured temperature and a target value based on the temperature adjustment setting are compared with each other, and the flue gas temperature setting value EXCSO is generated by the proportional integral (PI) control.

As illustrated in FIG. 26, the section, which generates the temperature adjustment setting EXREF, of the temperature control unit 204 includes a function unit (FX11) 331, an adder 310, a preceding signal generation unit 300, and the operation mode setting unit 175.

In the function unit (FX11) 331, a function, which represents a relationship between a compartment pressure and the temperature adjustment setting during normal operation, is set. That is, during normal operation in which an IGV opening degree command value of the inlet guide vane 22 is, for example, 0[°] or higher, the temperature adjustment setting EXREF based on the function unit (FX11) 331 is generated.

In addition, the preceding signal generation unit 300 includes primary delay filters 302 and 303, a subtractor 304, a function unit (FX16) 305, a function unit (FX15) 301, a multiplier 306, and a rate limiter 307. The primary delay filters 302 and 303 may be provided in a number of one (for example, only 302), or in a number of three. The subtractor 304, and the primary delay filters 302 and 303 are configured to calculate a variation rate, and there is no limitation to this configuration as long as the variation rate can be detected.

In the preceding signal generation unit 300, first, a deviation between a signal obtained by delaying an IGV opening degree command value with the primary delay filters 302 and 303 and a signal that is not delayed is obtained by the subtractor 304, and this deviation is obtained as a variation rate (pseudo differential value) of the IGV opening degree command value. In addition, in the function unit (FX16) 305, a correction amount (preceding signal) with respect to the temperature adjustment setting EXREF is set in correspondence with the magnitude (pseudo differential value) of the variation rate of the IGV opening degree command value.

In addition, the function unit (FX15) 301 sets an operation range of the preceding signal generation unit 300 to only a case where the opening degree of the inlet guide vane 22 is in a predetermined range. For example, a function, in which an opening degree range of the IGV opening degree at a partial load is set to "1" and an opening degree at full open is set to "0", is used as the function FX15, and "1" or "0" is used in multiplication by the multiplier 306. According to this, correction (preceding signal) by the preceding signal generation unit 300 can be made to be valid only in a state in which the gas turbine 110 is operated at a partial load.

In addition, the rate limiter 307 limits a correction amount with respect to the temperature adjustment setting EXREF that is obtained, that is, a temporal variation rate of a preceding signal. According to this, a correction amount through the rate limiter 307 is added by the adder 310 through the operation mode setting unit 175, and the temperature adjustment setting EXREF is generated.

A temporal transition of the temperature adjustment setting EXREF at this time is as indicated by T1 in FIG. 27(a), but an actual blade path temperature or flue gas temperature shows a slow variation as indicated by T0 in FIG. 27(a) due to occurrence of a temperature measurement delay. Here, in the eighth embodiment, the temperature transition of the temperature adjustment setting EXREF is allowed to be shown as indicated by T2 in FIG. 27(a) through addition of a correction amount (preceding signal) by the preceding signal generation unit 300 as illustrated in FIG. 27(b) so as to make conformity of the actual blade path temperature or flue gas temperature relatively faster.

Here, the operation mode setting unit 175 is provided between the rate limiter 307 and the adder 310. The operation mode setting unit 175 adjusts the IGV opening degree, which is output from the rate limiter 307, on the basis of a ratio between the performance and the responsiveness of the gas turbine 110 which are set in the operation unit 163. Specifically, the IGV opening degree, which is output from the rate limiter 307, is input to the operation mode setting unit 175 as a responsiveness-emphasizing mode setting value. In addition, a performance-emphasizing mode setting value, at which the IGV opening degree becomes "0", is input to the operation mode setting unit 175. In addition, an operation mode index value, which is set in the operation unit 163, is input to the operation mode setting unit 175.

The operation mode setting unit 175 adjusts the IGV opening degree, which is output to the adder 310, on the basis of these inputs. For example, in a case where the performance of the gas turbine 110 is 100%, the operation mode setting unit 175 sets the ratio of the IGV opening degree, which is output from the rate limiter 307, to 0%, and outputs the IGV opening degree of "0", which is the performance-emphasizing mode setting value, to the adder 310. On the other hand, for example, in a case where the ratio of the responsiveness of the gas turbine 110 is 100%, the operation mode setting unit 175 sets the ratio of the IGV opening degree, which is output from the rate limiter 307, to 100%, and outputs the IGV opening degree without change, which is output from the rate limiter 307, to the adder 310.

In this manner, in the eighth embodiment, in a case where the responsiveness of the gas turbine 110 is emphasized, since a variation rate of the opening degree of the inlet guide vane 22 is calculated by the preceding signal generation unit 300 to calculate a correction amount in correspondence with the variation rate, and the temperature adjustment setting EXREF is corrected. Accordingly, the conformity of the blade path temperature setting value or flue gas temperature setting value is made fast, and thus it is possible to make a temporal variation of the temperature setting fast, and it is possible to improve immediate responsiveness of a load with respect to a variation of the system frequency. Furthermore, in a case where the performance of the gas turbine 110 is emphasized, correction of the opening degree of the inlet guide vane 22 by the preceding signal generation unit 300 is not performed.

Ninth Embodiment

Figure 28:
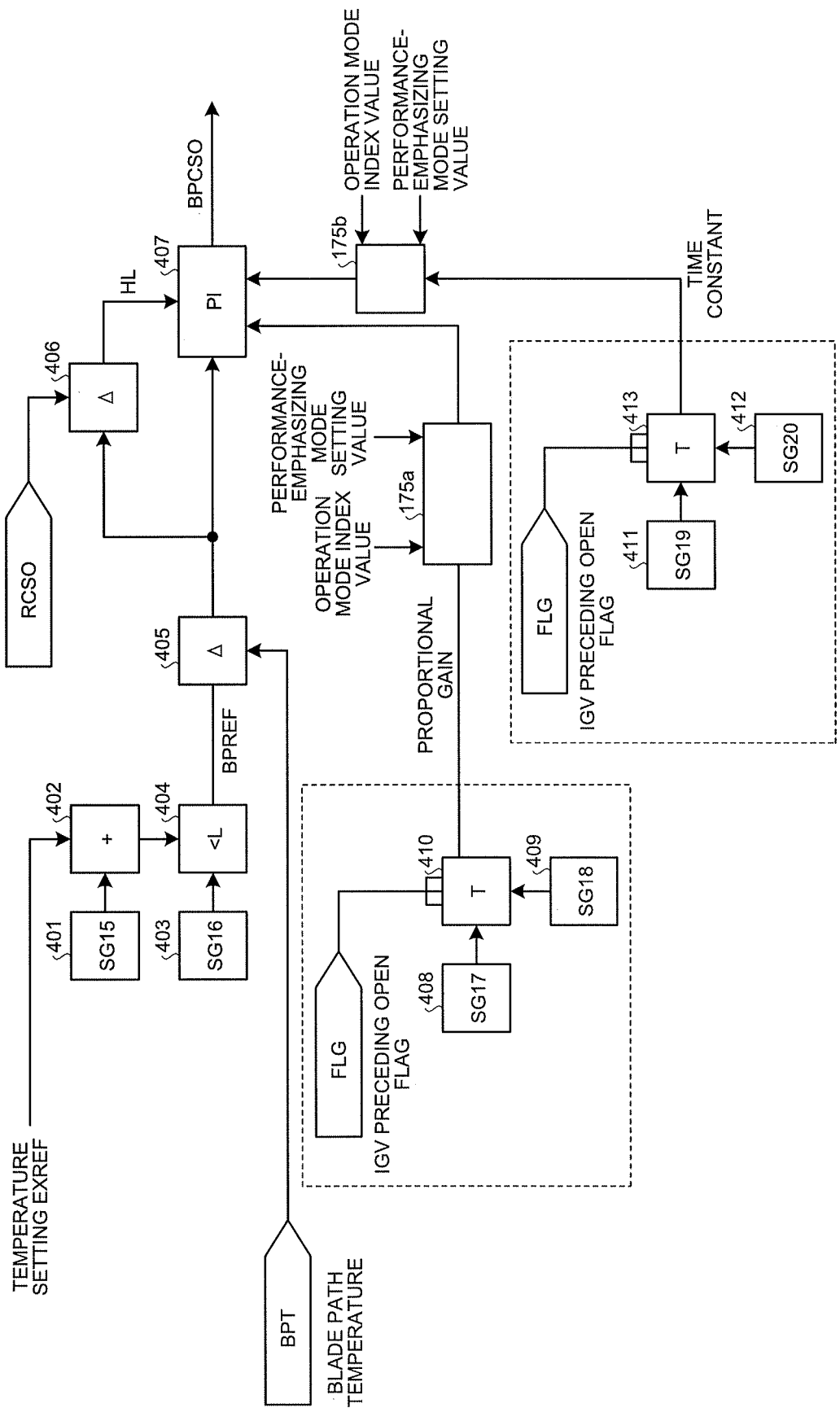
FIG. 28 is a configuration diagram of a blade path temperature control unit in a temperature control unit according to a ninth embodiment.

Next, description will be given of a control device according to a ninth embodiment with reference to FIG. 28. FIG. 28 is a configuration diagram of a blade path temperature control unit in a temperature control unit according to the ninth embodiment. Furthermore, in the ninth embodiment, description will also be given of a portion different from that in the sixth to eighth embodiments to avoid redundant description, and the same reference numeral will be given to a portion having the same configuration as in the sixth to eighth embodiments. The control device of the ninth embodiment is provided with the operation mode setting unit 175 of the sixth embodiment. Furthermore, with regard to a section that generates the temperature adjustment setting EXREF, the configuration according to the eighth embodiment is used, and thus description thereof will be omitted. In addition, the configuration of the gas turbine 110 and the IGV control unit 203 according to the ninth embodiment is the same as in the second embodiment, and thus description of respective constituent elements will be omitted.

In the control device of the ninth embodiment, the temperature control unit 204 includes a blade path temperature control unit (not illustrated), and the blade path temperature control unit includes signal generators (SG15) 401, (SG16) 403, (SG17) 408, (SG18) 409, (SG19) 411, and (SG20) 412, signal switching units 410 and 413, an adder 402, subtractors 405 and 406, a low value selector 404, and a PI controller 407. In addition, the blade path temperature control unit includes a first operation mode setting unit 175a, and a second operation mode setting unit 175b.

A low value between a value obtained by adding a predetermined value SG15 to the temperature adjustment setting EXREF by the adder 402, and a predetermined value SG16 is selected by the low value selector 404, and the selected value is set as a target value BPREF. A deviation between the target value BPREF, and a blade path temperature measurement value BPT from the blade path thermometer 153 is obtained by the subtractor 405, and proportional integral control based on the deviation is performed by the PI controller 407 to generate a blade path temperature setting value BPCSO.

The upper limit in the PI controller 407 is set to a deviation between the deviation obtained by the subtractor 405 and a standby value RCSO. In addition, the blade path temperature control unit according to the ninth embodiment has a characteristic that in a case where the IGV preceding open flag is valid, and the responsiveness of the gas turbine 110 is emphasized, an operation control parameter 72 in the PI controller 407 is set to a value that is set in advance.

However, here, a proportional gain and a time constant are subjected to switching setting in accordance with the IGV preceding open flag.

That is, the proportional gain is generated by switching the signal generator (SG17) 408 and (SG18) 409 by the signal switching unit 410 in correspondence with the IGV preceding open flag. Here, a proportional gain in a typical use is set to the signal generator (SG17) 408, and a proportional gain at the time of IGV preceding open is set to the signal generator (SG18) 409.

Here, the first operation mode setting unit 175a is provided between the signal switching unit 410 and the PI controller 407. The first operation mode setting unit 175a adjusts a proportional gain, which is one of operation control parameters output from the signal switching unit 410, on the basis of the ratio between the performance and the responsiveness of the gas turbine 110 which are set in the operation unit 63. Specifically, a proportional gain, which is output from the signal switching unit 410, is input to the first operation mode setting unit 175a as a responsiveness-emphasizing mode setting value. In addition, a performance-emphasizing mode setting value, at which a proportional gain is set to "0", is input to the first operation mode setting unit 175a. In addition, an operation mode index value, which is set in the operation unit 163, is input to the first operation mode setting unit 175a.

The first operation mode setting unit 175a adjusts a proportional gain, which is output to the PI controller 407, on the basis of these inputs. For example, in a case where the performance of the gas turbine 110 is 100%, the first operation mode setting unit 175a sets a ratio of the proportional gain, which is output from the signal switching unit 410, to 0%, and outputs the proportional gain of "0", which is a performance-emphasizing mode setting value, to the PI controller 407. On the other hand, for example, in a case where the responsiveness of the gas turbine 110 is 100%, the first operation mode setting unit 175a sets a ratio of the proportional gain, which is output from the signal switching unit 410, to 100%, and outputs the proportional gain without change, which is output from the signal switching unit 410, to the PI controller 407.

In addition, a time constant is generated by switching the signal generator (SG19) 411 and (SG20) 412 by the signal switching unit 413 in accordance with the IGV preceding open flag. Here, a time constant in a typical use is set to the signal generator (SG19) 411, and a time constant at the time of IGV preceding open is set to the signal generator (SG20) 412.

Here, the second operation mode setting unit 175b is provided between the signal switching unit 413 and the PI controller 407. The second operation mode setting unit 175b adjusts a time constant, which is one of operation control parameters output from the signal switching unit 413, on the basis of a ratio between the performance and the responsiveness of the gas turbine 110 which are set in the operation unit 63. Specifically, a time constant, which is output from the signal switching unit 413, is input to the second operation mode setting unit 175b as a responsiveness-emphasizing mode setting value. In addition, a performance-emphasizing mode setting value, at which the time constant becomes "0", is input to the second operation mode setting unit 175b. In addition, an operation mode index value, which is set in the operation unit 163, is input to the second operation mode setting unit 175b.

The second operation mode setting unit 175b adjusts a time constant, which is output to the PI controller 407, on the basis of these inputs. For example, in a case where the performance of the gas turbine 110 is 100%, the second operation mode setting unit 175b sets a ratio of the time constant, which is output from the signal switching unit 413, to 0%, and outputs a time constant of "0", which is a performance-emphasizing mode setting value, to the PI controller 407. On the other hand, for example, in a case where the responsiveness of the gas turbine 110 is 100%, the second operation mode setting unit 175b sets the ratio of the time constant, which is output from the signal switching unit 413, to 100%, and outputs the time constant without change, which is output from the signal switching unit 413, to the PI controller 407.

Furthermore, it is preferable that the proportional gain and the time constant are set to a relatively small value from the viewpoint of stability. However, in a case where the system frequency is equal to or lower than the predetermined threshold value α, an output increase of the gas turbine 110 is requested, and the responsiveness of the gas turbine 110 is emphasized, it is preferable that a priority is given to the conformity in emergency, and the proportional gain and the time constant are set to a value that is greater in comparison to a typical use.

In this manner, in the blade path temperature control unit (also true of the flue gas control unit) in the temperature control unit 204 according to the ninth embodiment, the blade path temperature setting value BPCSO of the turbine 13 is generated by performing the proportional integral control by the PI controller 407 on the basis of the deviation between the target value BPREF based on the temperature adjustment setting EXREF, and the measured blade path temperature measurement value BPT. However, in a case where the IGV preceding open flag is valid, and the responsiveness of the gas turbine 110 is emphasized, the operation control parameter (the proportional gain and the time constant) 172 in the PI controller 407 is set to a value that is set in advance. Accordingly, it is possible to make movement of the blade path temperature setting value BPCSO faster in a preceding manner. As a result, it is possible to improve immediate responsiveness of a load with respect to a variation of the system frequency or a load increase.

Tenth Embodiment

Figure 29:
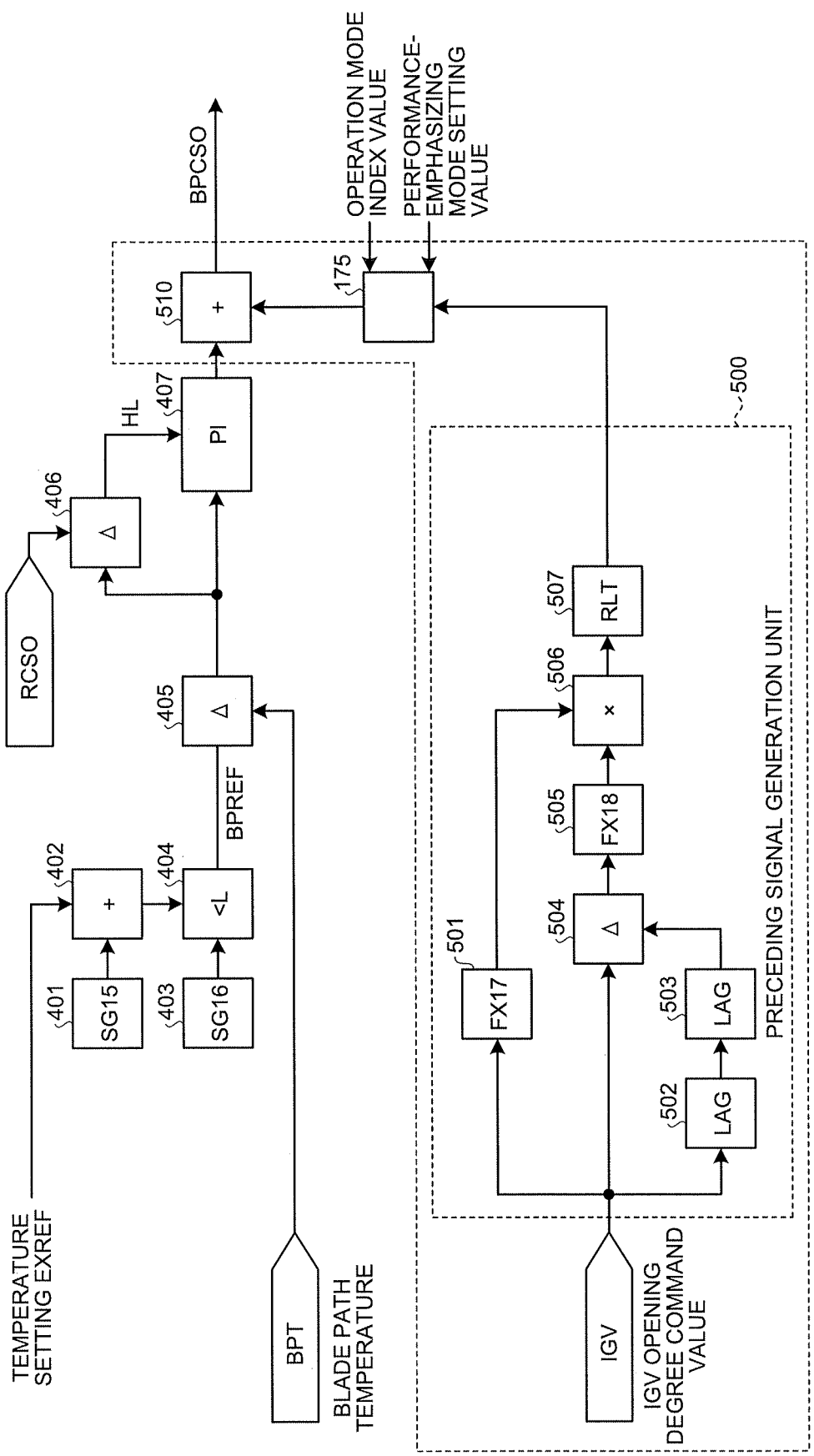
FIG. 29 is a configuration diagram of a blade path temperature control unit in a temperature control unit according to a tenth embodiment.

Next, description will be given of a control device according to a tenth embodiment with reference to FIG. 29. FIG. 29 is a configuration diagram of a blade path temperature control unit in a temperature control unit according to the tenth embodiment. In addition, in the tenth embodiment, description will also be given of a portion different from that in the sixth to ninth embodiments to avoid redundant description, and the same reference numeral will be given to a portion having the same configuration as in the sixth to ninth embodiments. The control device of the tenth embodiment is provided with the operation mode setting unit 175 of the sixth embodiment. Furthermore, with regard to a section that generates the temperature adjustment setting EXREF, the configuration according to the eighth embodiment is used, and thus description thereof will be omitted. In addition, the configuration of the gas turbine 110 and the IGV control unit 203 according to the tenth embodiment is the same as in the seventh embodiment, and thus description of respective constituent elements will be omitted.

As illustrated in FIG. 29, the temperature control unit 204 according to the tenth embodiment includes a blade path temperature control unit (not illustrated), and the blade path temperature control unit includes signal generators (SG15) 401 and (SG16) 403, adders 402 and 510, subtractors 405 and 406, a low value selector 404, a PI controller 407, a preceding signal generation unit 500, and the operation mode setting unit 175.

A low value between a value obtained by adding a predetermined value SG15 to the temperature adjustment setting EXREF by the adder 402, and a predetermined value SG16 is selected by the low value selector 404, and the selected value is set as a target value BPREF. A deviation between the target value BPREF, a blade path temperature measurement value BPT from the blade path thermometer 53 is obtained by the subtractor 405, and proportional integral control based on the deviation is performed by the PI controller 407 to generate a blade path temperature setting value BPCSO. Furthermore, the upper limit in the PI controller 407 is set to a deviation between the deviation obtained by the subtractor 405 and a standby value RCSO.

The blade path temperature control unit in the temperature control unit 204 of the tenth embodiment has a characteristic provided with the preceding signal generation unit 500 which calculates a variation rate of the opening degree of the inlet guide vane 22 to calculate a correction amount in correspondence with the variation rate, and corrects the blade path temperature setting value BPCSO that is generated on the basis of the temperature adjustment setting EXREF.

The preceding signal generation unit 500 includes primary delay filters 502 and 503, a subtractor 504, a function unit (FX18) 505, a function unit (FX17) 501, a multiplier 506, and a rate limiter 507. The primary delay filters may be provided in a number of one or three. The subtractor 504, and the primary delay filters 502 and 503 are configured to calculate a variation rate, and there is no limitation to this configuration as long as the variation rate can be detected.

In the preceding signal generation unit 500, first, a deviation between a signal obtained by delaying an IGV opening degree command value with the primary delay filters 502 and 503, and a signal that is not delayed is obtained by the subtractor 504, and this deviation is obtained as a variation rate (pseudo differential value) of the IGV opening degree command value. In addition, in the function unit (FX18) 505, a correction amount (preceding signal) with respect to the blade path temperature setting value BPCSO is set in correspondence with the magnitude (pseudo differential value) of the variation rate of the IGV opening degree command value.

In addition, the function unit (FX17) 501 sets an operation range of the preceding signal generation unit 500 to only a case where the opening degree of the inlet guide vane 22 is in a predetermined range. For example, a function, in which an opening degree range of the IGV opening degree at a partial load is set to "1" and an opening degree at full open is set to "0", is used as the function FX17, and "1" or "0" is used in multiplication by the multiplier 506. According to this, correction (preceding signal) by the preceding signal generation unit 500 can be made to be valid only in a state in which the gas turbine 110 is operated at a partial load.

In addition, the rate limiter 507 limits a correction amount with respect to the blade path temperature setting value BPCSO, that is, a temporal variation rate of a preceding signal. According to this, a correction amount through the rate limiter 507 is added by the adder 510, and the blade path temperature setting value BPCSO is generated.

Here, the operation mode setting unit 175 is provided between the rate limiter 507 and the adder 510. The operation mode setting unit 175 adjusts the correction amount with respect to the blade path temperature setting value BPCSO, which is output from the rate limiter 507, on the basis of a ratio between the performance and the responsiveness of the gas turbine 110 which are set in the operation unit 163. Specifically, the correction amount, which is output from the rate limiter 507, is input to the operation mode setting unit 175 as a responsiveness-emphasizing mode setting value. In addition, a performance-emphasizing mode setting value, at which the correction amount becomes "0", is input to the operation mode setting unit 175. In addition, an operation mode index value, which is set in the operation unit 163, is input to the operation mode setting unit 175.

The operation mode setting unit 175 adjusts the correction amount, which is output to the adder 510, on the basis of these inputs. For example, in a case where the performance of the gas turbine 110 is 100%, the operation mode setting unit 175 sets a ratio of the correction amount, which is output from the rate limiter 507, to 0%, and outputs the correction amount of "0", which is the performance-emphasizing mode setting value, to the adder 510. On the other hand, for example, in a case where the responsiveness of the gas turbine 110 is 100%, the operation mode setting unit 175 sets the ratio of the correction amount, which is output from the rate limiter 507, to 100%, and outputs the correction amount without change, which is output from the rate limiter 507, to the adder 510.

In this manner, in the tenth embodiment, in a case where the responsiveness of the gas turbine 110 is emphasized, a variation rate of the opening degree of the inlet guide vane 22 is calculated by the preceding signal generation unit 500 to calculate a correction amount of in correspondence with the variation rate, and correction is made by directly adding the correction amount (preceding signal) to the blade path temperature setting value BPCSO. Accordingly, movement of the blade path temperature setting value BPCSO is directly made to precede, and the conformity is made to be relatively fast. Accordingly, it is possible to make a temporal variation of temperature setting fast, and it is possible to improve immediate responsiveness of a load with respect to a variation of the system frequency or a load increase. Furthermore, in a case where the performance of the gas turbine 110 is emphasized, correction of the blade path temperature setting value BPCSO by the preceding signal generation unit 500 is not executed.

Eleventh Embodiment

Figure 30:
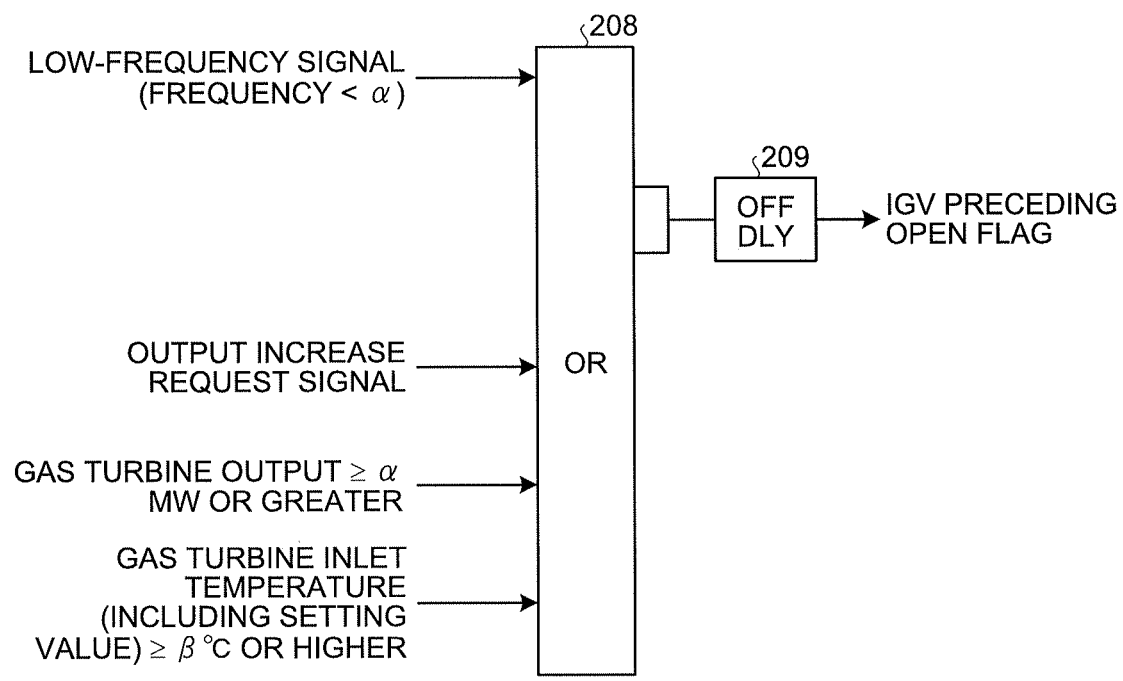
FIG. 30 is a configuration diagram of an IGV control flag generation unit according to an eleventh embodiment.

Next, description will be given of a control device according to an eleventh embodiment with reference to FIG. 30. FIG. 30 is a configuration diagram of an IGV control flag generation unit according to the eleventh embodiment. In addition, in the eleventh embodiment, description will also be given of a portion different from that in the sixth to tenth embodiments to avoid redundant description, and the same reference numeral will be given to a portion having the same configuration as in the sixth to tenth embodiments. Furthermore, the overall configuration of the control device of the gas turbine 110 is the same as in the seventh embodiment, and thus description of respective constituent elements will be omitted.

As illustrated in FIG. 30, as is the case with the seventh embodiment, an IGV control flag generation unit 205 according to the eleventh embodiment makes an IGV preceding open flag valid in a case where the system frequency is equal to or lower than the predetermined threshold value a, or an output increase of the gas turbine 110 is requested. The IGV control flag generation unit 205 has a configuration in which an OFF delay 209 is added to an output of the OR gate 208.

It is possible to make the IGV preceding open flag invalid with a constant delay when the IGV preceding open flag is switched from "valid" to "invalid" due to the OFF delay 209. Furthermore, for example, delay time due to the OFF delay 209 is an approximately boiler time constant, and 5 minutes to 10 minutes as an example.

Here, even in a case where the system frequency does not vary, in a gas turbine combined cycle (GTCC), immediate responsiveness (conformity) of a load at a high load during load rising has been poor due to delay of an output (ST output) of a steam turbine and the upper limit, which is caused by a temperature adjustment operation, of the output of the power generator 15 during load rising. Accordingly, when the inlet guide vane 22 is operated to be open in a constant amount with the IGV preceding open flag to raise the conformity of a load. However, a condition (arrival of a desired load) is established, the inlet guide vane 22 is operated to be closed immediately, and thus opening and closing operations of the inlet guide vane 22 are frequently occur, and thus it is necessary to prevent such frequent occurrence from the viewpoints of performance and an operational lifespan of components.

Here, in the eleventh embodiment, the OFF delay 209 is added to the IGV control flag generation unit 205. Accordingly, even after a frequency setting signal or an output increase request signal is off during load rising, the IGV preceding open flag is maintained to be valid for a constant period. According to this, it is possible to prevent frequent occurrence of the opening and closing operations of the inlet guide vane 22 from the viewpoint of the performance and the operational lifespan of components.

Twelfth Embodiment

Figure 31:
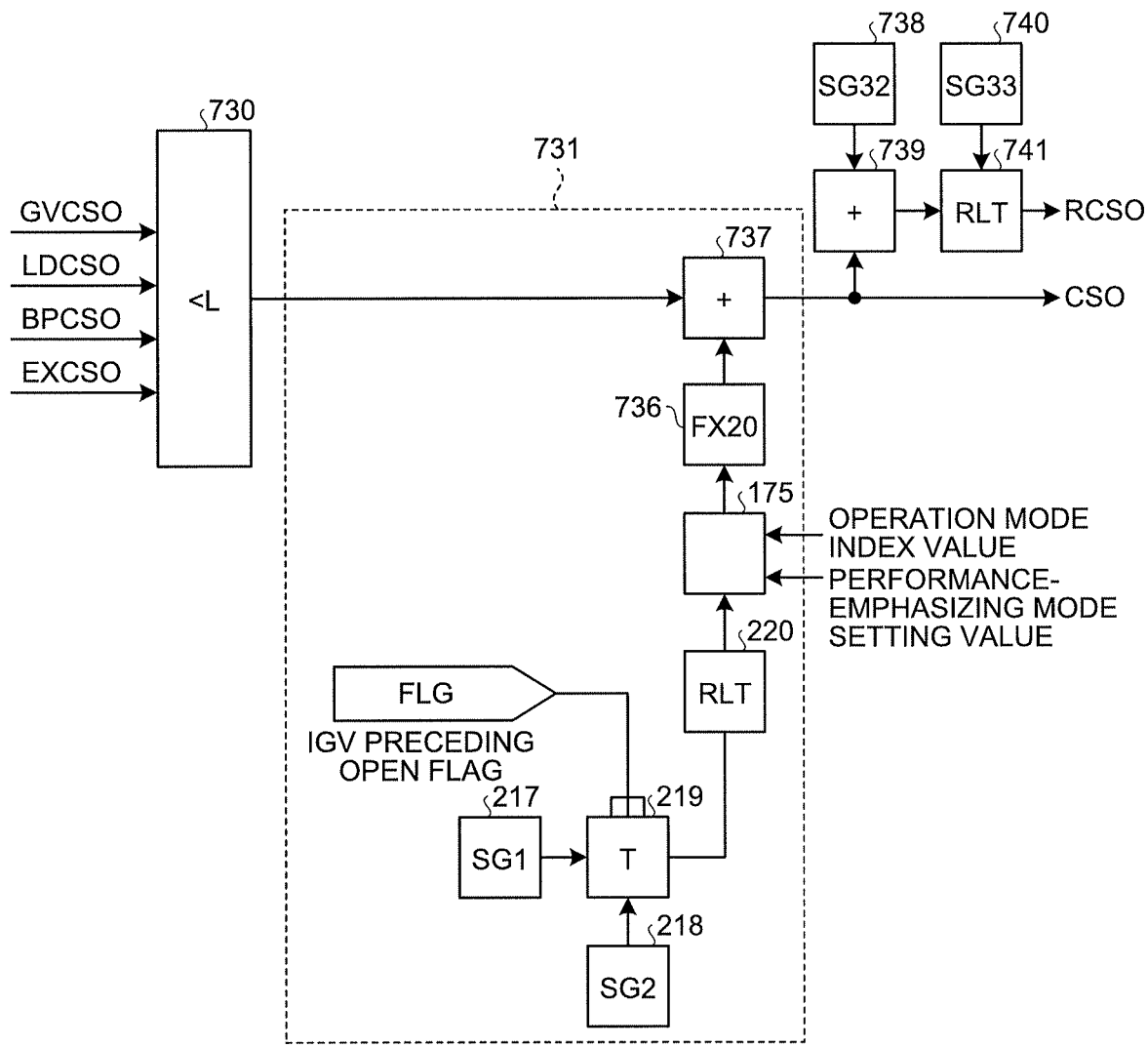
FIG. 31 is a configuration diagram of a fuel control unit according to a twelfth embodiment.

Next, description will be given of a control device according to a twelfth embodiment with reference to FIG. 31. FIG. 31 is a configuration diagram of a fuel control unit according to the twelfth embodiment. Furthermore, in the twelfth embodiment, description will also be given of a portion different from that in the sixth to eleventh embodiments to avoid redundant description, and the same reference numeral will be given to a portion having the same configuration as in the sixth to eleventh embodiments. Furthermore, the overall configuration of the control device of the gas turbine 110 is the same as in the seventh to eleventh embodiments, and thus description of respective constituent elements will be omitted.

As illustrated in FIG. 31, in a case where the IGV preceding open flag becomes valid, the fuel control unit 202 in the control device of the twelfth embodiment increases a fuel flow rate in correspondence with the opening degree of the inlet guide vane 22.

The fuel control unit 202 includes a CSO correction unit 731 that corrects CSO that is output from a low value selection unit 730.

As an example, the governor setting value GVCSO, the load limit setting value LDCSO, the blade path temperature setting value BPCSO, and the flue gas temperature setting value EXCSO are input to the low value selection unit 730, and the low value selection unit 730 outputs the minimum CSO among these setting values.

The CSO correction unit 731 includes a signal generator (SG1) 217, a signal generator (SG2) 218, a signal switching unit 219, a rate limiter 220, a correction function unit (FX20) 736, an adder 737, and an operation mode setting unit 175.

For example, the signal generator (SG1) 217 generates a first signal of "0", the signal generator (SG2) 218 generates a second signal representing a predetermined value, and the signal switching unit 219 switches the signal generator (SG1) 217 and the signal generator (SG2) 218 in correspondence with whether the IGV preceding open flag is valid or invalid. The rate limiter 220 limits a temporal variation rate of the signal transmitted from the signal switching unit 219, and the correction function unit (FX20) 736 calculates a correction value of a fuel flow rate (CSO) in correspondence with an increase in an air flow rate that is set by the IGV preceding open flag. The adder 737 adds the correction value output from the correction function unit (FX20) 736 to CSO output from the low value selection unit 730, and outputs the resultant value as CSO after correction.

According to this configuration, in a case where the IGV preceding open flag is invalid, the first signal of the signal generator (SG1) 217 is selected by the signal switching unit 219, and the correction value corresponding to the first signal is added to CSO output from the low value selection unit 730. At this time, the first signal is set to "0". Accordingly, in a case where the IGV preceding open flag is invalid, CSO selected by the low value selection unit 730 is output without change, as CSO after correction.

On the other hand, in a case where the IGV preceding open flag is valid, the second signal of the signal generator (SG2) 218 is selected by the signal switching unit 219, and a correction value corresponding to the second signal is added to CSO output from the low value selection unit 730. According to this, in a case where the IGV preceding open flag is valid, the correction value is added to CSO selected by the low value selection unit 730, and is output as CSO after correction. According to this, in a case where the IGV preceding open flag becomes valid, the fuel flow rate to be supplied to the combustor 12 increases.

Here, the operation mode setting unit 175 is provided between the rate limiter 220 and the correction function unit 736. The operation mode setting unit 175 adjusts the IGV opening degree, which is output from the rate limiter 220, on the basis of a ratio between the performance and the responsiveness of the gas turbine 110 which are set in the operation unit 163. Specifically, the IGV opening degree, which is output from the rate limiter 220, is input to the operation mode setting unit 175 as a responsiveness-emphasizing mode setting value. In addition, a performance-emphasizing mode setting value, at which the IGV opening degree becomes "0", is input to the operation mode setting unit 175. In addition, an operation mode index value, which is set in the operation unit 163, is input to the operation mode setting unit 175.

The operation mode setting unit 175 adjusts the IGV opening degree, which is output to the correction function unit 736, on the basis of these inputs. For example, in a case where the performance of the gas turbine 110 is 100%, the operation mode setting unit 175 sets the ratio of the IGV opening degree, which is output from the rate limiter 220, to 0%, and outputs the IGV opening degree of "0", which is the performance-emphasizing setting value, to the correction function unit 736. On the other hand, for example, in a case where the responsiveness of the gas turbine 110 is 100%, the operation mode setting unit 175 sets the ratio of the IGV opening degree, which is output from the rate limiter 220, to 100%, and outputs the IGV opening degree, which is output from the rate limiter 220, to the correction function unit 736 without change.

Furthermore, a value, which is output from a signal generator (SG32) 738, is added to CSO output from the adder 737 by an adder 739 to calculate the standby value RCSO through a rate limiter 741 in accordance with a variation rate (decrease rate) that is output from a signal generator (SG33) 740.

In the case of increasing a load when the inlet guide vane 22 is not fully opened, if the opening degree of the inlet guide vane 22 enters a state of being relatively further opened in comparison to a typical case so as to improve load conformity, there is a concern that the turbine inlet temperature excessively lowers. In the control device of the gas turbine 110 according to the twelfth embodiment, it is possible to increase a fuel flow rate in correspondence with an increase in an air flow rate due to a state in which the opening degree of the inlet guide vane 22 is relatively opened, and thus it is possible to prevent the turbine inlet temperature from excessively lowering.

Thirteenth Embodiment

Figure 32:
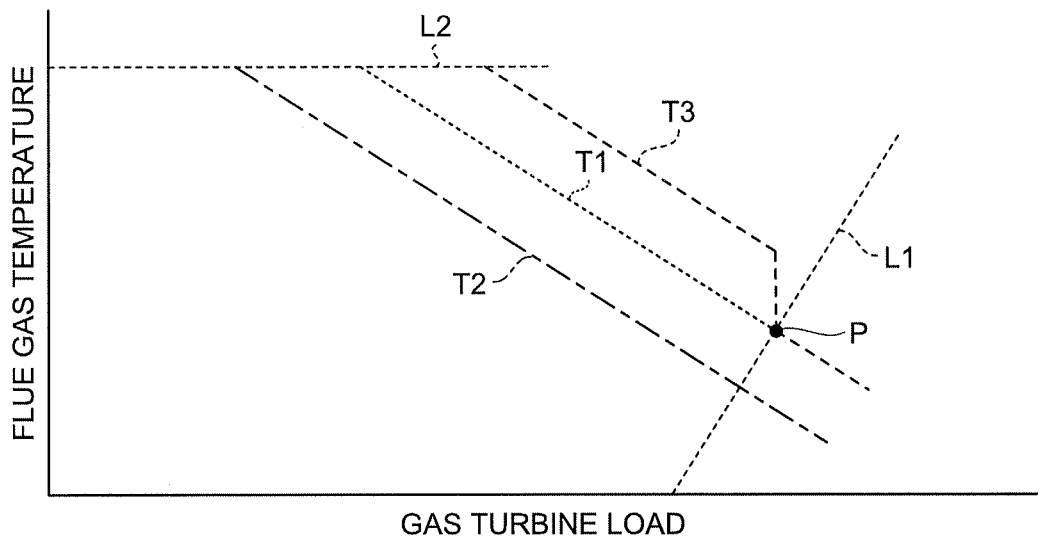
FIG. 32 is a graph illustrating a temperature adjustment line in which a flue gas temperature varies in response to the load of the gas turbine that is used in the control device according to a thirteenth embodiment.

Next, description will be given of a control device according to a thirteenth embodiment with reference to FIG. 32. FIG. 32 is a graph illustrating a temperature adjustment line in which a flue gas temperature varies in response to the load of the gas turbine that is used in the control device according to the thirteenth embodiment. Furthermore, in the thirteenth embodiment, description will also be given of a portion different from that in the sixth to twelfth embodiments to avoid redundant description, and the same reference numeral will be given to a portion having the same configuration as in the sixth to twelfth embodiments.

As illustrated in FIG. 32, a control unit 161 in the control device of the thirteenth embodiment performs temperature adjustment control by using a rated temperature adjustment line T1, a preceding setting line T2, and a limit temperature adjustment line T3 as illustrated in FIG. 32. In the graph of FIG. 32, the horizontal axis represents a gas turbine load, and the vertical axis represents a flue gas temperature. Furthermore, the rated temperature adjustment line T1, the preceding setting line T2, and the limit temperature adjustment line T3 are functions which are defined by the flue gas temperature and the pressure ratio of the compressor 11. Accordingly, the control unit 161 derives the pressure ratio of the compressor 11 on the basis of a measurement result of the compartment pressure gauge 151, and derives a flue gas temperature (a rated flue gas temperature, a preceding flue gas temperature, a limit flue gas temperature which are described later) from the derived pressure ratio on the basis of the rated temperature adjustment line T1, the preceding setting line T2, and the limit temperature adjustment line T3.

As illustrated in FIG. 32, the rated temperature adjustment line T1, the preceding setting line T2, and the limit temperature adjustment line T3 are lines in which as the gas turbine load (more specifically, a pressure ratio) increases, the flue gas temperature lowers. Hereinafter, the rated temperature adjustment line T1, the preceding setting line T2, and the limit temperature adjustment line T3 will be described in detail.

The rated temperature adjustment line T1 is set to a rated flue gas temperature corresponding to the gas turbine load so that the performance of the gas turbine 110 at a predetermined gas turbine load becomes the rated performance. At this time, the rated flue gas temperature of the rated temperature adjustment line T1 is set to a flue gas temperature at which the turbine inlet temperature does not exceed an upper limit temperature that is set in advance. Furthermore, the rated performance is performance at which the operation efficiency of the gas turbine 110 is optimized when a predetermined load is applied to the gas turbine 110 from the power generator 15. The rated temperature adjustment line T1 is a line in which in the partial load operation or correction of the full load operation, a flue gas temperature (flue gas measurement temperature) measured by the flue gas thermometer 154 becomes the rated flue gas temperature of the rated temperature adjustment line T1. That is, the control unit 161 subjects the operation of the gas turbine 110 to feedback control (for example, PI control) so that the flue gas measurement temperature becomes the rated flue gas temperature.

Here, an IGV rated angle line L1, in which the inlet guide vane 22 has a rated opening degree, is illustrated in FIG. 32. Accordingly, a gas turbine load at an intersection at which the rated temperature adjustment line T1 and the IGV rated angle line L1 intersect each other is an intersection (rated point P) that becomes the full load of the gas turbine 110, and a gas turbine output corresponding to the gas turbine load of the rated point P is set to a rated output of the gas turbine 110.

The preceding setting line T2 is a line for setting of the flue gas temperature at a predetermined gas turbine load to a preceding flue gas temperature that becomes lower in precedence to the rated flue gas temperature. Accordingly, the preceding flue gas temperature at a predetermined gas turbine load is lower than the rated flue gas temperature. Specifically, the preceding setting line T2 is a line for enlargement of the opening degree of the inlet guide vane 22 in precedence to the rated temperature adjustment line T1. Accordingly, when the operation control point of the gas turbine 110 is allowed to vary in conformity to the preceding setting line T2, the control unit 161 controls the inlet guide vane 22 to obtain an opening degree greater than the opening degree of the inlet guide vane 22 that is set on the basis of the rated temperature adjustment line T1.

The limit temperature adjustment line T3 is a line in which the flue gas temperature at a predetermined gas turbine load does not exceed the limit flue gas temperature. That is, the limit flue gas temperature at a predetermined gas turbine load becomes higher than the rated flue gas temperature, and is set to a flue gas temperature that is permissible even though the turbine inlet temperature is higher than the upper limit temperature (even though the turbine inlet temperature is overshot). Accordingly, the control unit 161 controls the operation of the gas turbine 110 so that the flue gas temperature (flue gas measurement temperature) measured by the flue gas thermometer 154 does not exceed the limit flue gas temperature. Furthermore, the limit temperature adjustment line T3 is a line in which the limit flue gas temperature is equal to the rated flue gas temperature of the rated temperature adjustment line T1 in the full load operation.

In addition, a flue gas temperature limiting line L2, which becomes a limiting value of the flue gas temperature, is illustrated in FIG. 32. The flue gas temperature limiting line L2 is set to a temperature at which a member disposed on an exhaust side of the turbine 13 can endure a thermal load. The control unit 161 controls the operation of the gas turbine 110 so as not to reach the flue gas temperature limiting line L2.

The operation mode setting unit 175 sets the preceding flue gas temperature of the preceding setting line T2 on the basis of the operation mode index value. Specifically, in the case of setting the preceding flue gas temperature of the preceding setting line T2, the rated flue gas temperature of the rated temperature adjustment line T1 is input to the operation mode setting unit 175 as a performance-emphasizing mode setting value, and the preceding flue gas temperature of the preceding setting line T2 is input to the operation mode setting unit 175 as a responsiveness-emphasizing mode setting value. In addition, an operation mode index value, which is set in the operation unit 163, is input to the operation mode setting unit 175.

The operation mode setting unit 175 adjusts the preceding flue gas temperature of the preceding setting line T2 on the basis of these inputs. For example, in a case where the performance of the gas turbine 110 is 100%, the operation mode setting unit 175 sets the rated flue gas temperature, which is the performance-emphasizing mode setting value, as the preceding flue gas temperature of the preceding setting line T2. That is, in a case where the performance of the gas turbine 110 is 100%, the operation mode setting unit 175 sets the preceding setting line T2 to conform to the rated temperature adjustment line T1. On the other hand, for example, in a case where the responsiveness of the gas turbine 110 is 100%, the operation mode setting unit 175 sets the preceding flue gas temperature, which is the responsiveness-emphasizing mode setting value, as the preceding flue gas temperature of the preceding setting line T2. That is, in a case where the responsiveness of the gas turbine 110 is 100%, the operation mode setting unit 175 sets the preceding setting line T2 to the same state.

As described above, in the thirteenth embodiment, in a case where the responsiveness of the gas turbine 110 is emphasized, and the preceding setting line T2 is set to the same state. In addition, in a case where the performance of the gas turbine 110 is emphasized, it is possible to allow the preceding setting line T2 to conform to the rated temperature adjustment line T1.

Furthermore, in the thirteenth embodiment, the limit flue gas temperature of the limit temperature adjustment line T3 may be set on the basis of the operation mode index value similar to the preceding setting line T2. That is, the rated flue gas temperature of the rated temperature adjustment line T1 is input to the operation mode setting unit 175 as the performance-emphasizing mode setting value, and the limit flue gas temperature of the limit temperature adjustment line T3 is input to the operation mode setting unit 175 as the responsiveness-emphasizing mode setting value. In addition, the operation mode index value, which is set in the operation unit 163, is input to the operation mode setting unit 175.

The operation mode setting unit 175 adjusts the limit flue gas temperature of the limit temperature adjustment line T3 on the basis of these inputs. For example, in a case where the performance of the gas turbine 110 is 100%, the operation mode setting unit 175 sets the rated flue gas temperature, which is the performance-emphasizing mode setting value, as the limit flue gas temperature of the limit temperature adjustment line T3. That is, in a case where the performance of the gas turbine 110 is 100%, the operation mode setting unit 175 sets the limit temperature adjustment line T3 to conform to the rated temperature adjustment line T1. On the other hand, for example, in a case where the responsiveness of the gas turbine 110 is 100%, the operation mode setting unit 175 sets the limit flue gas temperature, which is the responsiveness-emphasizing mode setting value, as the limit flue gas temperature of the limit temperature adjustment line T3. That is, in a case where the responsiveness of the gas turbine 110 is 100%, the operation mode setting unit 175 sets the limit temperature adjustment line T3 to the same state.

Fourteenth Embodiment

Next, description will be given of a control device according to a fourteenth embodiment with reference to FIG. 33.

Figure 33:
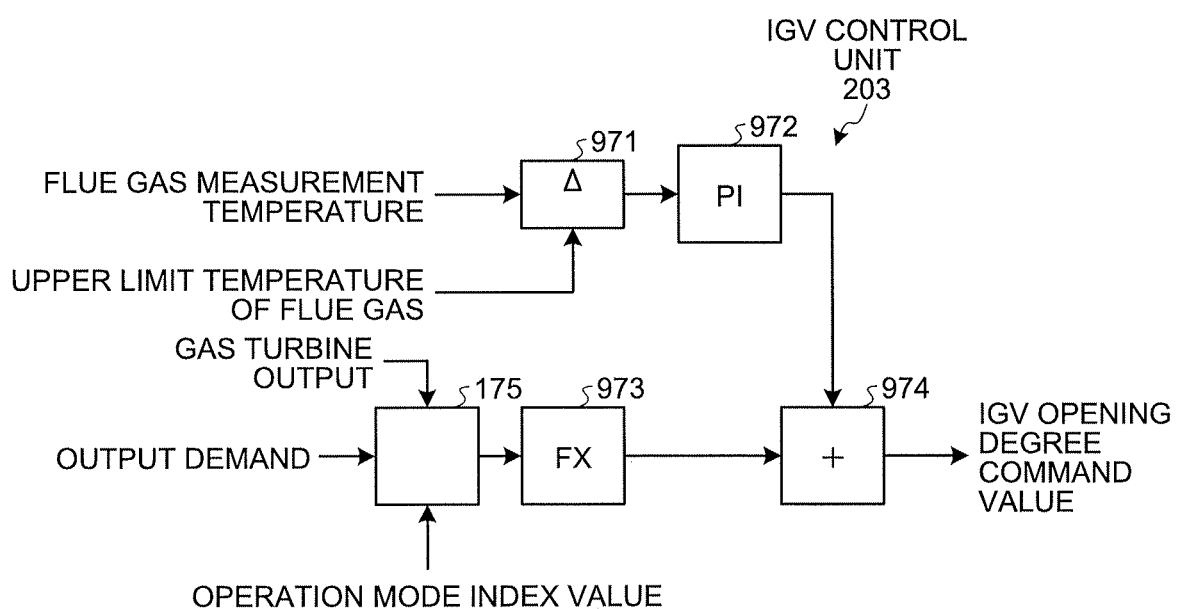
FIG. 33 is a configuration diagram of an IGV control unit of the control device according to a fourteenth embodiment.

FIG. 33 is a configuration diagram of an IGV control unit of the control device according to the fourteenth embodiment. Furthermore, in the fourteenth embodiment, description will also be given of a portion different from that in the sixth to thirteenth embodiments to avoid redundant description, and the same reference numeral will be given to a portion having the same configuration as in the sixth to thirteenth embodiments.

As illustrated in FIG. 33, an IGV control unit 203 in the control device of the fourteenth embodiment includes a subtractor 971, a PI controller 972, a controller 973, an adder 974, and the operation mode setting unit 175. A gas turbine output, an output demand, and a flue gas measurement temperature are input to the IGV control unit 203. Furthermore, an intake temperature and a compartment pressure are also input to the IGV control unit 203, and the opening degree of the inlet guide vane 22 is controlled in correspondence with the input values. However, hereinafter, description of the intake temperature and the compartment pressure will be omitted for simplification of description. Furthermore, the gas turbine output is an actual measurement value of the gas turbine 110. In addition, the output demand is a request output value of the gas turbine 110 that is requested in correspondence with the load of the gas turbine 110.

The subtractor 971 generates a deviation Δ between the flue gas measurement temperature and the upper limit temperature of the temperature adjustment line, and outputs the generated deviation Δ to the PI controller 972. The PI controller 972 generates IGV opening degree command value at which the deviation Δ becomes zero. The gas turbine output is input to the operation mode setting unit 175 as a performance-emphasizing mode setting value, and the output demand is input to the operation mode setting unit 175 as a responsiveness-emphasizing mode setting value. In addition, the operation mode index value, which is set in the operation unit 163, is input to the operation mode setting unit 175.

The operation mode setting unit 175 adjusts an output value of the gas turbine 110, which is output to the controller 973, on the basis of these inputs. For example, in a case where the performance of the gas turbine 110 is 100%, the operation mode setting unit 175 sets the gas turbine output, which is the performance-emphasizing mode setting value, as the output value of the gas turbine 110. On the other hand, for example, in a case where the responsiveness of the gas turbine 110 is 100%, the operation mode setting unit 175 sets the output demand, which is the responsiveness-emphasizing mode setting value, as the output value of the gas turbine 110.

The controller 973 generates an IGV opening degree command value from the output value of the gas turbine 110 which is input on the basis of a function in which the output value of the gas turbine 110 and the IGV opening degree are correlated to each other. The adder 974 adds the IGV opening degree command value that is generated by the PI controller 972, and the IGV opening degree command value that is generated by the controller 973 to each other, and output the resultant value to an IGV operation unit 22b.

Accordingly, in a case where the responsiveness of the gas turbine 110 is emphasized, the control device can control the opening degree of the inlet guide vane 22 by the IGV control unit 203 on the basis of the output demand, and thus the control device can perform IGV control based on the output demand in precedence to the IGV control based on the gas turbine output. In addition, in a case where the performance of the gas turbine 110 is emphasized, the control device can control the opening degree of the inlet guide vane 22 by the IGV control unit 203 on the basis of the gas turbine output, and thus the control device can execute the IGV control based on the gas turbine output. That is, the gas turbine output is an actually measured value. Accordingly, in the IGV control based on the gas turbine output, the opening degree of the inlet guide vane 22 is controlled after combustion of fuel, and thus a fuel-air ratio transitions to a higher side. On the other hand, in the IGV control based on the output demand, the opening degree of the inlet guide vane 22 is controlled before combustion of fuel, and thus the fuel-air ratio can transition to a lower side.

As described above, in the fourteenth embodiment, in a case where the responsiveness of the gas turbine 110 is emphasized, the control device executes the IGV control unit 203 on the basis of the output demand, and thus it is possible to transition the fuel-air ratio a lower side, and it is possible to lower the turbine inlet temperature. On the other hand, in a case where the performance of the gas turbine 110 is emphasized, the IGV control unit 203 is executed on the basis of the gas turbine output, and thus it is possible to transition the fuel-air ratio to a higher side, and it is possible to raise the turbine inlet temperature.

Furthermore, in the sixth to fourteenth embodiments, application is made to the gas turbine 110 that performs power generation, but application can be made to a gas engine of an aircraft without particular limitation.

REFERENCE SIGNS LIST

1 GAS TURBINE
11 COMPRESSOR
12 COMBUSTOR
13 TURBINE
14 CONTROL DEVICE
15 POWER GENERATOR
18 ROTOR
22 INLET GUIDE VANE
22a VANE MAIN BODY
22b IGV OPERATION UNIT
34 FUEL SUPPLY LINE
35 FUEL ADJUSTMENT VALVE
51 PRESSURE GAUGE
52 FLUE GAS THERMOMETER
52a BLADE PATH THERMOMETER
52b EXHAUST SECTION THERMOMETER
110 GAS TURBINE
151 COMPARTMENT PRESSURE GAUGE
152 INTAKE-AIR STATE DETECTOR
153 BLADE PATH THERMOMETER
154 FLUE GAS THERMOMETER
161 CONTROL UNIT
162 STORAGE UNIT
163 OPERATION UNIT
171 OPERATION SETTING DATA
172 OPERATION CONTROL PARAMETER
174a OPERATION-MODE OPERATING BAR
174b OPERATION MODE SETTING INPUT ITEM
175 OPERATION MODE SETTING UNIT
181 FIRST MULTIPLIER
182 SECOND MULTIPLIER
183 THIRD MULTIPLIER
184 FOURTH MULTIPLIER
185 SUBTRACTOR
186 ADDER
200 CONTROL DEVICE
202 FUEL CONTROL UNIT
203 IGV CONTROL UNIT
204 TEMPERATURE CONTROL UNIT
205 IGV CONTROL FLAG GENERATION UNIT
208 OR GATE
209 OFF DELAY
211 MULTIPLIER
212 TABLE FUNCTION UNIT (FX1)
213 LIMITER
214 CORRECTION FUNCTION UNIT (FX2)
215 LIMITING FUNCTION UNIT (FX3)
216 ADDER
217 SIGNAL GENERATOR (SG1)
218 SIGNAL GENERATOR (SG2)
219 SIGNAL SWITCHING UNIT
220 RATE LIMITER
221 VARIATION RATE LIMITER
223 SIGNAL GENERATOR (SG3)
224 SIGNAL GENERATOR (SG4)
225 SIGNAL SWITCHING UNIT
300 PRECEDING SIGNAL GENERATION UNIT
301 FUNCTION UNIT (FX15)
302, 303 PRIMARY DELAY FILTER
304 SUBTRACTOR
305 FUNCTION UNIT (FX16)
306 MULTIPLIER
307 RATE LIMITER
310 ADDER
331 FUNCTION UNIT (FX11)
401 SIGNAL GENERATOR (SG15)
402 ADDER
403 SIGNAL GENERATOR (SG16)
404 LOW VALUE SELECTOR
405 SUBTRACTOR
406 SUBTRACTOR
407 PI CONTROL
408 SIGNAL GENERATOR (SG17)
409 SIGNAL GENERATOR (SG18)
410 SIGNAL SWITCHING UNIT
411 SIGNAL GENERATOR (SG19)
412 SIGNAL GENERATOR (SG20)
413 SIGNAL SWITCHING UNIT
500 PRECEDING SIGNAL GENERATION UNIT
501 FUNCTION UNIT (FX17)
502, 503 PRIMARY DELAY FILTER
504 SUBTRACTOR
505 FUNCTION UNIT (FX18)
506 MULTIPLIER
507 RATE LIMITER
510 ADDER
730 LOW VALUE SELECTION UNIT
731 CSO CORRECTION UNIT
736 CORRECTION FUNCTION UNIT (FX20)
737 ADDER
738 SIGNAL GENERATOR (SG32)
739 ADDER
740 SIGNAL GENERATOR (SG33)
741 RATE LIMITER
971 SUBTRACTOR
972 PI CONTROLLER
973 CONTROLLER
974 ADDER
A AIR
F FUEL
A1 COMPRESSED AIR
T1 RATED TEMPERATURE ADJUSTMENT LINE
T2 PRECEDING SETTING LINE
T3 LIMIT TEMPERATURE ADJUSTMENT LINE
L1 IGV RATED ANGLE LINE

L2 FLUE GAS TEMPERATURE LIMITING LINE
P RATED POINT
θ1 IGV OPENING DEGREE
θ2 IGV OPENING DEGREE

The invention claimed is:

1. A control device of a system in which intake-air is configured to be compressed into compressed air by a compressor, fuel supplied from a combustor and the compressed air are configured to be mixed and a resultant mixture is configured to be combusted to generate a combustion gas, and a turbine is configured to be operated by the combustion gas that is generated,
   wherein the control device is configured to execute load control of causing an operation control point for operation control of the system to vary in response to a load of the system;
   wherein the operation of the system is configured to be controlled based on:
      a rated temperature adjustment line for temperature adjustment control of a flue gas temperature at a predetermined load to a rated flue gas temperature at which performance of the system becomes rated performance;
      a preceding setting line for setting of the flue gas temperature at the predetermined load to a preceding flue gas temperature that becomes lower than the rated flue gas temperature; and
      a limit temperature adjustment line defining a limit flue gas temperature that is higher than the rated flue gas temperature;
   wherein the control device is configured such that:
   during load raising in which the load rises, the operation control point is caused to vary so that the flue gas temperature becomes lower than the preceding flue gas temperature of the preceding setting line;
   when the flue gas temperature reaches the preceding flue gas temperature, the control device is configured to perform temperature adjustment control such that the operation control point conforms to the preceding setting line; and
   when the load reaches a target load that is targeted, the operation control point is transitioned to the rated temperature adjustment line; and
   wherein:
   the limit flue gas temperature of the limit temperature adjustment line is defined by a function of a pressure ratio of the compressor;
   the flue gas temperature is a flue gas measurement temperature that is measured by a flue gas thermometer; and
   during the load raising in which the load rises, in a case where the flue gas measurement temperature is higher than the limit flue gas temperature of the limit temperature adjustment line and satisfies a setting condition that is set in advance, the limit flue gas temperature of the limit temperature adjustment line is set to be higher than the flue gas measurement temperature.

2. The control device according to claim 1,
   wherein during a load variation in which the load varies, the operation control point is transitioned to the preceding setting line to cause the operation control point to vary in conformity with the preceding setting line.

3. The control device according to claim 1,
   wherein, in a case of performing load lowering in which the load lowers from a temperature adjustment control state in which the flue gas temperature becomes the rated flue gas temperature of the rated temperature adjustment line, an opening degree of an inlet guide vane at the limit temperature adjustment line is changed to be an opening degree of the inlet guide vane at the rated temperature adjustment line, and the operation control point is transitioned from the rated temperature adjustment line to the preceding setting line.

4. The control device according to claim 1, wherein:
   the compressor includes an inlet guide vane that is on an intake side and is capable of adjusting an opening degree; and
   the operation control point is caused to vary through adjustment of the opening degree of the inlet guide vane.

5. The control device according to claim 1, wherein:
   the compressor includes an inlet guide vane that is on an intake side and is capable of adjusting an opening degree; and
   the setting condition includes at least one condition among:
      a first condition in which the flue gas temperature does not conform to the rated flue gas temperature of the rated temperature adjustment line, and the operation control point transitions to the preceding setting line;
      a second condition in which the opening degree of the inlet guide vane is enlarged so that the flue gas temperature becomes lower than the preceding flue gas temperature of the preceding setting line; and
      a third condition in which a pressure ratio of the compressor increases.

6. A control method of a system in which intake-air is compressed into compressed air by a compressor, fuel that is supplied and the compressed air are mixed and a resultant mixture is combusted to generate a combustion gas, and a turbine is operated by the combustion gas that is generated,
   the method comprising:
   executing load control of causing an operation control point for operation control of the system to vary in response to a load of the system; and
   controlling the operation of the system based on:
      a rated temperature adjustment line for temperature adjustment control of a flue gas temperature at a predetermined load to a rated flue gas temperature at which performance of the system becomes rated performance;
      a preceding setting line for setting of the flue gas temperature at the predetermined load to a preceding flue gas temperature that becomes lower than the rated flue gas temperature; and
      a limit temperature adjustment line defining a limit flue gas temperature that is higher than the rated flue gas temperature,
   wherein during load raising in which the load rises, the operation control point is caused to vary so that the flue gas temperature becomes lower than the preceding flue gas temperature of the preceding setting line;
   when the flue gas temperature reaches the preceding flue gas temperature, the control device performs temperature adjustment control such that the operation control point conforms to the preceding setting line; and
   when the load reaches a target load that is targeted, the operation control point is transitioned to the rated temperature adjustment line; and
   wherein:
   the limit flue gas temperature of the limit temperature adjustment line is defined by a function of a pressure ratio of the compressor;

the flue gas temperature is a flue gas measurement temperature that is measured by a flue gas thermometer; and during the load raising in which the load rises, in a case where the flue gas measurement temperature is higher than the limit flue gas temperature of the limit temperature adjustment line and satisfies a setting condition that is set in advance, the limit flue gas temperature of the limit temperature adjustment line is set to be higher than the flue gas measurement temperature.

\* \* \* \* \*